(12) United States Patent
Zedlitz et al.

(10) Patent No.: US 11,255,722 B2
(45) Date of Patent: Feb. 22, 2022

(54) INFRARED CLOUD DETECTOR SYSTEMS AND METHODS

(71) Applicant: View, Inc., Milpitas, CA (US)

(72) Inventors: Jason David Zedlitz, Rancho Cordova, CA (US); Yuyang Ying, San Jose, CA (US); Jue Wang, San Jose, CA (US); Stephen Clark Brown, San Mateo, CA (US)

(73) Assignee: View, Inc., Milpitas, CA (US)

( * ) Notice: Subject to any disclaimer, the term of this patent is extended or adjusted under 35 U.S.C. 154(b) by 50 days.

(21) Appl. No.: 16/335,222

(22) PCT Filed: Oct. 6, 2017

(86) PCT No.: PCT/US2017/055631
§ 371 (c)(1),
(2) Date: Mar. 20, 2019

(87) PCT Pub. No.: WO2018/067996
PCT Pub. Date: Apr. 12, 2018

(65) Prior Publication Data
US 2019/0250029 A1      Aug. 15, 2019

Related U.S. Application Data

(63) Continuation-in-part of application No. 15/287,646, filed on Oct. 6, 2016, now Pat. No. 10,533,892, and
(Continued)

(51) Int. Cl.
*G01J 1/42*       (2006.01)
*E06B 3/67*       (2006.01)
(Continued)

(52) U.S. Cl.
CPC .......... *G01J 1/4228* (2013.01); *E06B 3/6715* (2013.01); *E06B 9/68* (2013.01); *G01J 1/0271* (2013.01);
(Continued)

(58) Field of Classification Search
CPC ......... G01W 1/12; G01W 1/06; G01J 1/0271; G01J 1/0407; G01J 1/4228; G01J 5/10; E06B 3/6715; E06B 9/68
(Continued)

(56) References Cited

U.S. PATENT DOCUMENTS 3,675,023 A    7/1972   Kunke et al.
4,171,911 A   10/1979   Aberle et al.
(Continued)

FOREIGN PATENT DOCUMENTS

CH     707305 A1    6/2014
CN    1333807 A     1/2002
(Continued)

OTHER PUBLICATIONS

Smith et al., Measuring Cloud Cover and Brightness Temperature with a Gound-Based Thermal Infrared Camera, Feb. 2008, American Meterological Society, vol. 47, pp. 683-693 (Year: 2008).*
(Continued)

*Primary Examiner* — Nimeshkumar D Patel
*Assistant Examiner* — Jean F Morello
(74) *Attorney, Agent, or Firm* — Weaver Austin Villeneuve & Sampson, LLP; Brian D. Griedel

(57) ABSTRACT

The present disclosure generally relates to infrared cloud detector systems and methods for detecting cloud cover conditions. The infrared cloud detector system comprises an infrared sensor, an ambient temperature sensor, and logic. The infrared sensor is configured to measure sky temperature based on infrared radiation received within its field-of-
(Continued)

view. The ambient temperature sensor is configured to measure an ambient temperature. And the logic is configured to determine a cloud condition based on a difference between the measured sky temperature and the measured ambient temperature.

33 Claims, 18 Drawing Sheets

Related U.S. Application Data a continuation-in-part of application No. PCT/US2016/055709, filed on Oct. 6, 2016, which is a continuation-in-part of application No. 14/998,019, filed on Oct. 6, 2015, now Pat. No. 10,690,540, said application No. 15/287,646 is a continuation-in-part of application No. 14/998,019, filed on Oct. 6, 2015, now Pat. No. 10,690,540.

(60) Provisional application No. 62/453,407, filed on Feb. 1, 2017.

(51) Int. Cl.
| | |
|---|---|
| *E06B 9/68* | (2006.01) |
| *G01W 1/12* | (2006.01) |
| *G01J 1/04* | (2006.01) |
| *G01J 5/10* | (2006.01) |
| *G01W 1/06* | (2006.01) |
| *G01J 1/02* | (2006.01) |

(52) U.S. Cl.
CPC .............. *G01J 1/0407* (2013.01); *G01J 5/10* (2013.01); *G01W 1/06* (2013.01); *G01W 1/12* (2013.01)

(58) Field of Classification Search
USPC .............................. 73/170.27; 250/340, 352
See application file for complete search history.

(56) References Cited

U.S. PATENT DOCUMENTS

| | | |
|---|---|---|
| D256,787 S | 9/1980 | Peterson |
| D258,871 S | 4/1981 | Rajotte, Jr. et al. |
| 4,355,896 A | 10/1982 | Laue et al. |
| 4,491,727 A | 1/1985 | Appelbaum et al. |
| D278,132 S | 3/1985 | Powell |
| 4,628,206 A | 12/1986 | Astheimer |
| 4,690,553 A | 9/1987 | Fukamizu et al. |
| 4,742,236 A | 5/1988 | Kawakami et al. |
| 5,124,833 A | 6/1992 | Barton et al. |
| 5,170,108 A | 12/1992 | Peterson et al. |
| 5,204,778 A | 4/1993 | Bechtel |
| 5,220,317 A | 6/1993 | Lynam et al. |
| 5,290,986 A | 3/1994 | Colon et al. |
| 5,353,148 A | 10/1994 | Eid et al. |
| 5,365,365 A | 11/1994 | Ripoche et al. |
| 5,379,146 A | 1/1995 | Defendini |
| 5,384,578 A | 1/1995 | Lynam et al. |
| 5,402,144 A | 3/1995 | Ripoche |
| 5,451,822 A | 9/1995 | Bechtel et al. |
| 5,489,777 A | 2/1996 | Stedman et al. |
| 5,598,000 A | 1/1997 | Popat |
| 5,606,393 A | 2/1997 | Schoenherr et al. |
| 5,621,526 A | 4/1997 | Kuze |
| 5,656,807 A | 8/1997 | Packard |
| 5,663,621 A | 9/1997 | Popat |
| 5,670,774 A | 9/1997 | Hill |
| 5,673,028 A | 9/1997 | Levy |
| 5,694,144 A | 12/1997 | Lefrou et al. |
| 5,760,558 A | 6/1998 | Popat |
| 5,764,402 A | 6/1998 | Thomas et al. |
| 5,822,107 A | 10/1998 | Lefrou et al. |
| 5,838,432 A | 11/1998 | Tokuhashi et al. |
| 5,900,720 A | 5/1999 | Kallman et al. |
| 5,956,012 A | 9/1999 | Turnbull et al. |
| 5,973,818 A | 10/1999 | Sjursen et al. |
| 5,973,819 A | 10/1999 | Pletcher et al. |
| 5,978,126 A | 11/1999 | Sjursen et al. |
| 6,002,511 A | 12/1999 | Varaprasad et al. |
| 6,039,390 A | 3/2000 | Agrawal et al. |
| 6,039,850 A | 3/2000 | Schulz et al. |
| 6,055,089 A | 4/2000 | Schulz et al. |
| 6,064,949 A | 5/2000 | Werner et al. |
| 6,084,231 A | 7/2000 | Popat |
| 6,084,700 A | 7/2000 | Knapp et al. |
| 6,104,513 A | 8/2000 | Bloom |
| 6,130,448 A | 10/2000 | Bauer et al. |
| 6,130,772 A | 10/2000 | Cava |
| D439,532 S | 3/2001 | Off et al. |
| 6,222,177 B1 | 4/2001 | Bechtel et al. |
| 6,262,831 B1 | 7/2001 | Bauer et al. |
| 6,269,763 B1 | 8/2001 | Woodland |
| 6,386,713 B1 | 5/2002 | Turnbull et al. |
| 6,398,118 B1 | 6/2002 | Rosen |
| 6,407,468 B1 | 6/2002 | LeVesque et al. |
| 6,407,847 B1 | 6/2002 | Poll et al. |
| 6,417,500 B1 | 7/2002 | Wood |
| 6,449,082 B1 | 9/2002 | Agrawal et al. |
| 6,466,312 B1 | 10/2002 | Li |
| 6,471,360 B2 | 10/2002 | Rukavina et al. |
| 6,493,128 B1 | 12/2002 | Agrawal et al. |
| 6,535,126 B2 | 3/2003 | Lin et al. |
| 6,567,708 B1 | 5/2003 | Bechtel et al. |
| 6,614,577 B1 | 9/2003 | Yu et al. |
| 6,795,226 B2 | 9/2004 | Agrawal et al. |
| 6,819,367 B1 | 11/2004 | Cava |
| 6,829,511 B2 | 12/2004 | Bechtel et al. |
| 6,856,444 B2 | 2/2005 | Ingalls et al. |
| 6,897,936 B1 | 5/2005 | Li et al. |
| 6,940,627 B2 | 9/2005 | Freeman et al. |
| 6,965,813 B2 | 11/2005 | Granqvist et al. |
| 7,049,602 B2 | 5/2006 | Tokhtuev et al. |
| 7,079,944 B2 | 7/2006 | Litchfield et al. |
| 7,085,609 B2 | 8/2006 | Bechtel et al. |
| 7,105,800 B1 | 9/2006 | Staerzl |
| 7,111,952 B2 | 9/2006 | Veskovic |
| 7,133,181 B2 | 11/2006 | Greer |
| 7,215,318 B2 | 5/2007 | Turnbull et al. |
| 7,277,215 B2 | 10/2007 | Greer |
| 7,304,787 B2 | 12/2007 | Whitesides et al. |
| 7,417,397 B2 | 8/2008 | Berman et al. |
| 7,472,590 B2 | 1/2009 | Solheim et al. |
| 7,542,809 B2 | 6/2009 | Bechtel et al. |
| 7,548,833 B2 | 6/2009 | Ahmed |
| 7,562,928 B1 | 7/2009 | Morazan |
| 7,567,183 B2 | 7/2009 | Schwenke |
| 7,587,289 B1 | 9/2009 | Sivertsen |
| 7,588,067 B2 | 9/2009 | Veskovic |
| 7,610,910 B2 | 11/2009 | Ahmed |
| 7,714,290 B2 | 5/2010 | Kudoh |
| 7,800,812 B2 | 9/2010 | Moskowitz |
| 7,817,326 B1 | 10/2010 | Rennig et al. |
| 7,822,490 B2 | 10/2010 | Bechtel et al. |
| 7,873,490 B2 | 1/2011 | MacDonald |
| 7,941,245 B1 | 5/2011 | Popat |
| 7,950,827 B2 | 5/2011 | Veskovic |
| 7,963,675 B2 | 6/2011 | Veskovic |
| 7,972,021 B2 | 7/2011 | Scherer |
| 7,977,904 B2 | 7/2011 | Berman et al. |
| 7,990,603 B2 | 8/2011 | Ash et al. |
| 8,004,739 B2 | 8/2011 | Letocart |
| 8,018,644 B2 | 9/2011 | Gustavsson et al. |
| 8,102,586 B2 | 1/2012 | Albahri |
| 8,213,074 B1 | 7/2012 | Shrivastava et al. |
| 8,254,013 B2 | 8/2012 | Mehtani et al. |
| 8,270,059 B2 | 9/2012 | Friedman et al. |
| 8,288,981 B2 | 10/2012 | Zaharchuk et al. |
| 8,292,228 B2 | 10/2012 | Mitchell et al. |
| 8,300,298 B2 | 10/2012 | Wang et al. |
| 8,432,603 B2 | 4/2013 | Wang et al. |

(56) References Cited

U.S. PATENT DOCUMENTS

| | | |
|---|---|---|
| 8,456,729 B2 | 6/2013 | Brown et al. |
| 8,547,624 B2 | 10/2013 | Ash et al. |
| 8,582,193 B2 | 11/2013 | Wang et al. |
| 8,681,073 B1 | 3/2014 | Robbins et al. |
| 8,705,162 B2 | 4/2014 | Brown et al. |
| 8,723,467 B2 | 5/2014 | Berman et al. |
| 8,754,983 B2 | 6/2014 | Sutton |
| 8,764,950 B2 | 7/2014 | Wang et al. |
| 8,764,951 B2 | 7/2014 | Wang et al. |
| D712,759 S | 9/2014 | Forsberg et al. |
| 8,836,263 B2 | 9/2014 | Berman et al. |
| 8,864,321 B2 | 10/2014 | Mehtani et al. |
| 8,902,486 B1 | 12/2014 | Chandrasekhar |
| 8,934,170 B2 | 1/2015 | Takeda et al. |
| D723,600 S | 3/2015 | Nauli et al. |
| D725,284 S | 3/2015 | Karlsson et al. |
| 8,976,440 B2 | 3/2015 | Berland et al. |
| D727,467 S | 4/2015 | Batiste |
| 9,016,630 B2 | 4/2015 | Mitchell et al. |
| 9,030,725 B2 | 5/2015 | Pradhan et al. |
| 9,078,299 B2 | 7/2015 | Ashdown |
| 9,081,246 B2 | 7/2015 | Rozbicki |
| 9,081,247 B1 | 7/2015 | Pradhan et al. |
| 9,128,346 B2 | 9/2015 | Shrivastava et al. |
| 9,164,002 B2 | 10/2015 | Anderson |
| 9,226,366 B2 | 12/2015 | Orillard et al. |
| D747,988 S | 1/2016 | Matsumiya et al. |
| D748,508 S | 2/2016 | Park et al. |
| 9,261,751 B2 | 2/2016 | Pradhan et al. |
| 9,298,203 B2 | 3/2016 | Wenzel |
| 9,341,912 B2 | 5/2016 | Shrivastava et al. |
| 9,348,192 B2 | 5/2016 | Brown et al. |
| D761,135 S | 7/2016 | Allen, Sr. et al. |
| 9,404,793 B2 | 8/2016 | Yang et al. |
| 9,406,028 B2 | 8/2016 | Humann |
| 9,423,664 B2 | 8/2016 | Brown et al. |
| 9,454,055 B2 | 9/2016 | Brown et al. |
| 9,506,802 B2 | 11/2016 | Chu et al. |
| 9,523,902 B2 | 12/2016 | Parker |
| 9,546,515 B2 | 1/2017 | Hall et al. |
| 9,574,934 B2 | 2/2017 | Verbeek et al. |
| D780,612 S | 3/2017 | Alexander et al. |
| 9,638,978 B2 | 5/2017 | Brown et al. |
| 9,645,465 B2 | 5/2017 | Brown et al. |
| 9,664,974 B2 | 5/2017 | Kozlowski et al. |
| 9,668,315 B2 | 5/2017 | Shearer et al. |
| 9,674,924 B2 | 6/2017 | Lashina et al. |
| 9,709,869 B2 | 7/2017 | Baumann et al. |
| 9,746,181 B2 | 8/2017 | Mori |
| 9,807,857 B2 | 10/2017 | Huang |
| 9,927,674 B2 | 3/2018 | Brown et al. |
| 9,938,765 B2 | 4/2018 | Berman et al. |
| D816,518 S | 5/2018 | Brown et al. |
| 10,048,561 B2 | 8/2018 | Brown et al. |
| 10,063,815 B1 | 8/2018 | Spivey et al. |
| 10,234,596 B2 * | 3/2019 | Frank .................. G01J 1/1626 |
| 10,254,618 B2 | 4/2019 | Parker et al. |
| 10,520,784 B2 | 12/2019 | Brown et al. |
| 10,533,892 B2 | 1/2020 | Brown et al. |
| 10,539,456 B2 | 1/2020 | Klawuhn et al. |
| 10,539,854 B2 | 1/2020 | Brown et al. |
| 10,605,970 B2 | 3/2020 | Blair et al. |
| 10,690,540 B2 | 6/2020 | Brown et al. |
| 10,712,627 B2 | 7/2020 | Brown et al. |
| 10,732,028 B2 | 8/2020 | Klawuhn et al. |
| 10,802,372 B2 | 10/2020 | Brown |
| 10,895,498 B2 | 1/2021 | Klawuhn et al. |
| 10,921,675 B2 | 2/2021 | Barnum et al. |
| 10,982,487 B2 | 4/2021 | Ramirez |
| 2002/0075472 A1 | 6/2002 | Holton |
| 2002/0135881 A1 | 9/2002 | Rukavina et al. |
| 2002/0152298 A1 | 10/2002 | Kikta et al. |
| 2003/0076480 A1 | 4/2003 | Burbulla |
| 2003/0142140 A1 | 7/2003 | Brown et al. |
| 2003/0191546 A1 | 10/2003 | Bechtel et al. |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0043760 A1 | 3/2004 | Rosenfeld et al. |
| 2004/0047518 A1 | 3/2004 | Tiana |
| 2004/0108191 A1 | 6/2004 | Su et al. |
| 2004/0135989 A1 | 7/2004 | Klebe |
| 2004/0160322 A1 | 8/2004 | Stilp |
| 2005/0046920 A1 | 3/2005 | Freeman et al. |
| 2005/0063036 A1 | 3/2005 | Bechtel et al. |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0038983 A1 | 2/2006 | Bickel et al. |
| 2006/0107616 A1 | 5/2006 | Rani et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0238860 A1 | 10/2006 | Baun et al. |
| 2006/0245024 A1 | 11/2006 | Greer |
| 2007/0002007 A1 | 1/2007 | Tam |
| 2007/0012349 A1 | 1/2007 | Gaudiana et al. |
| 2007/0055757 A1 | 3/2007 | Mairs et al. |
| 2007/0067048 A1 | 3/2007 | Bechtel et al. |
| 2007/0145252 A1 | 6/2007 | Litchfield et al. |
| 2007/0162233 A1 | 7/2007 | Schwenke |
| 2007/0285759 A1 | 12/2007 | Ash et al. |
| 2008/0018979 A1 | 1/2008 | Mahe et al. |
| 2008/0043316 A2 | 2/2008 | Moskowitz |
| 2008/0128586 A1 | 6/2008 | Johnson et al. |
| 2008/0173818 A1 | 6/2008 | Staerzl |
| 2008/0174455 A1 | 7/2008 | Staerzl |
| 2009/0020233 A1 | 1/2009 | Berman et al. |
| 2009/0027759 A1 | 1/2009 | Albahri |
| 2009/0066157 A1 | 3/2009 | Tarng et al. |
| 2009/0079349 A1 | 3/2009 | Sibalich et al. |
| 2009/0139669 A1 | 6/2009 | Robin |
| 2009/0143141 A1 | 6/2009 | Wells et al. |
| 2009/0187287 A1 | 7/2009 | Bruhnke et al. |
| 2009/0204269 A1 | 8/2009 | Bechtel et al. |
| 2009/0231092 A1 | 9/2009 | Maegawa et al. |
| 2009/0243732 A1 | 10/2009 | Tarng et al. |
| 2009/0243802 A1 | 10/2009 | Wolf et al. |
| 2009/0254222 A1 | 10/2009 | Berman et al. |
| 2009/0281820 A1 | 11/2009 | Sarkar et al. |
| 2009/0296188 A1 | 12/2009 | Jain et al. |
| 2009/0316671 A1 | 12/2009 | Rolf et al. |
| 2009/0323160 A1 | 12/2009 | Egerton et al. |
| 2009/0326709 A1 | 12/2009 | Hooper et al. |
| 2010/0039410 A1 | 2/2010 | Becker et al. |
| 2010/0066484 A1 | 3/2010 | Hanwright et al. |
| 2010/0071856 A1 | 3/2010 | Zaharchuk et al. |
| 2010/0082081 A1 | 4/2010 | Niessen et al. |
| 2010/0100324 A1 | 4/2010 | Caminiti et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0243427 A1 | 9/2010 | Kozlowski et al. |
| 2010/0245972 A1 | 9/2010 | Wright |
| 2010/0245973 A1 | 9/2010 | Wang et al. |
| 2010/0294330 A1 | 11/2010 | Huang et al. |
| 2010/0296081 A1 | 11/2010 | Granqvist |
| 2010/0315693 A1 | 12/2010 | Lam et al. |
| 2011/0035061 A1 | 2/2011 | Altonen et al. |
| 2011/0046810 A1 | 2/2011 | Bechtel et al. |
| 2011/0063708 A1 | 3/2011 | Letocart |
| 2011/0066302 A1 | 3/2011 | McEwan |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |

(56) References Cited

U.S. PATENT DOCUMENTS

| | | |
|---|---|---|
| 2011/0255142 A1 | 10/2011 | Ash et al. |
| 2011/0266137 A1 | 11/2011 | Wang et al. |
| 2011/0266138 A1 | 11/2011 | Wang et al. |
| 2011/0266419 A1 | 11/2011 | Jones et al. |
| 2011/0267674 A1 | 11/2011 | Wang et al. |
| 2011/0267675 A1 | 11/2011 | Wang et al. |
| 2011/0292488 A1 | 12/2011 | McCarthy et al. |
| 2011/0304898 A1 | 12/2011 | Letocart |
| 2011/0304899 A1 | 12/2011 | Kwak et al. |
| 2011/0308318 A1 | 12/2011 | Magnussen |
| 2012/0006110 A1 | 1/2012 | Niemann et al. |
| 2012/0007507 A1 | 1/2012 | Niemann et al. |
| 2012/0190386 A1 | 1/2012 | Anderson |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0070071 A1 | 3/2012 | Rankin et al. |
| 2012/0089257 A1 | 4/2012 | Holger |
| 2012/0095601 A1 | 4/2012 | Abraham et al. |
| 2012/0133315 A1 | 5/2012 | Berman et al. |
| 2012/0147449 A1 | 6/2012 | Bhatnagar et al. |
| 2012/0188627 A1 | 7/2012 | Chen et al. |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0261078 A1 | 10/2012 | Adams et al. |
| 2012/0268803 A1 | 10/2012 | Greer |
| 2012/0275008 A1 | 11/2012 | Pradhan et al. |
| 2012/0293855 A1 | 11/2012 | Shrivastava et al. |
| 2012/0323382 A1 | 12/2012 | Kamel et al. |
| 2013/0021659 A1 | 1/2013 | Friedman et al. |
| 2013/0057157 A1 | 3/2013 | Nackaerts et al. |
| 2013/0057937 A1 | 3/2013 | Berman et al. |
| 2013/0158790 A1 | 6/2013 | McIntyre, Jr. et al. |
| 2013/0242370 A1 | 9/2013 | Wang |
| 2013/0263510 A1 | 10/2013 | Gassion |
| 2013/0264948 A1 | 10/2013 | Orillard et al. |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0321923 A1 | 12/2013 | Thuot et al. |
| 2014/0043667 A1 | 2/2014 | Bergh et al. |
| 2014/0055014 A1 | 2/2014 | Pan |
| 2014/0067733 A1 | 3/2014 | Humann |
| 2014/0104667 A1 | 4/2014 | Greer et al. |
| 2014/0117852 A1 | 5/2014 | Zhai et al. |
| 2014/0160550 A1 | 6/2014 | Brown et al. |
| 2014/0177028 A1 | 6/2014 | Shrivastava et al. |
| 2014/0236323 A1 | 8/2014 | Brown et al. |
| 2014/0259931 A1 | 9/2014 | Plummer |
| 2014/0262057 A1 | 9/2014 | Chambers et al. |
| 2014/0268287 A1 | 9/2014 | Brown et al. |
| 2014/0300945 A1 | 10/2014 | Parker |
| 2014/0303788 A1 | 10/2014 | Sanders et al. |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0035440 A1 | 2/2015 | Spero |
| 2015/0049378 A1 | 2/2015 | Shrivastava et al. |
| 2015/0060648 A1 | 3/2015 | Brown et al. |
| 2015/0070190 A1 | 3/2015 | Wai Fong et al. |
| 2015/0070745 A1 | 3/2015 | Pradhan |
| 2015/0092259 A1 | 4/2015 | Greer et al. |
| 2015/0116811 A1 | 4/2015 | Shrivastava et al. |
| 2015/0122474 A1 | 5/2015 | Peterson |
| 2015/0161515 A1 | 6/2015 | Matsuoka |
| 2015/0177415 A1 | 6/2015 | Bing |
| 2015/0185581 A1 | 7/2015 | Pradhan et al. |
| 2015/0219975 A1 | 8/2015 | Phillips et al. |
| 2015/0293422 A1 | 10/2015 | Pradhan et al. |
| 2015/0316473 A1 | 11/2015 | Kester et al. |
| 2015/0338713 A1 | 11/2015 | Brown |
| 2015/0368967 A1 | 12/2015 | Lundy et al. |
| 2016/0054633 A1 | 2/2016 | Brown et al. |
| 2016/0054634 A1 | 2/2016 | Brown et al. |
| 2016/0090098 A1 | 3/2016 | Kim et al. |
| 2016/0124283 A1 | 5/2016 | Brown et al. |
| 2016/0127642 A1 | 5/2016 | Schechner et al. |
| 2016/0154290 A1 | 6/2016 | Brown et al. |
| 2016/0202589 A1 | 7/2016 | Nagel et al. |
| 2016/0203403 A1 | 7/2016 | Nagel et al. |
| 2016/0277688 A1 | 9/2016 | Gaskamp et al. |
| 2016/0282589 A1 | 9/2016 | Chen |
| 2016/0283774 A1 | 9/2016 | Buchanan et al. |
| 2017/0031056 A1 | 2/2017 | Vega-Avila et al. |
| 2017/0053068 A1 | 2/2017 | Pillai et al. |
| 2017/0075183 A1 | 3/2017 | Brown |
| 2017/0097259 A1 | 4/2017 | Brown et al. |
| 2017/0122802 A1 | 5/2017 | Brown et al. |
| 2017/0123286 A1 | 5/2017 | Parker |
| 2017/0125875 A1 | 5/2017 | Courtney et al. |
| 2017/0130523 A1 | 5/2017 | Shrivastava et al. |
| 2017/0168368 A1 | 6/2017 | Brown et al. |
| 2017/0219907 A1 | 8/2017 | Brown et al. |
| 2017/0276542 A1 | 9/2017 | Klawuhn et al. |
| 2017/0279876 A1 | 9/2017 | Prasad et al. |
| 2017/0293049 A1 | 10/2017 | Frank et al. |
| 2017/0365908 A1 | 12/2017 | Hughes et al. |
| 2018/0073712 A1 | 3/2018 | Baaijens et al. |
| 2018/0129172 A1 | 5/2018 | Shrivastava et al. |
| 2018/0157141 A1 | 6/2018 | Brown et al. |
| 2018/0231860 A1 | 8/2018 | Podbelski et al. |
| 2018/0284555 A1 | 10/2018 | Klawuhn et al. |
| 2018/0307114 A1 | 10/2018 | Brown et al. |
| 2018/0373111 A1 | 12/2018 | Brown |
| 2019/0025661 A9 | 5/2019 | Brown et al. |
| 2019/0171081 A1 | 6/2019 | Zedlitz et al. |
| 2019/0230776 A1 | 7/2019 | Casey et al. |
| 2019/0235129 A1 | 8/2019 | Frank et al. |
| 2019/0257143 A1 | 8/2019 | Nagel et al. |
| 2020/0057346 A1 | 2/2020 | Zedlitz et al. |
| 2020/0063490 A1* | 2/2020 | Hebeisen ............... H05B 47/11 |
| 2020/0072674 A1 | 3/2020 | Baker et al. |
| 2020/0096831 A1 | 3/2020 | Brown et al. |
| 2020/0200595 A1 | 6/2020 | Klawuhn et al. |
| 2020/0209057 A1 | 7/2020 | Brown et al. |
| 2020/0260556 A1 | 8/2020 | Rozbicki et al. |
| 2020/0278245 A1 | 9/2020 | Brown et al. |
| 2020/0355977 A1 | 11/2020 | Brown et al. |
| 2020/0363261 A1 | 11/2020 | Klawuhn et al. |
| 2020/0393733 A1 | 12/2020 | Brown |
| 2021/0003899 A1 | 1/2021 | Zedlitz et al. |
| 2021/0080319 A1 | 3/2021 | Brown et al. |
| 2021/0108960 A1 | 4/2021 | Klawuhn et al. |
| 2021/0190991 A1 | 6/2021 | Frank et al. |

FOREIGN PATENT DOCUMENTS

| | | |
|---|---|---|
| CN | 1359479 A | 7/2002 |
| CN | 1380482 A | 11/2002 |
| CN | 1097760 C | 1/2003 |
| CN | 2590732 Y | 12/2003 |
| CN | 1534413 A | 10/2004 |
| CN | 1659080 A | 8/2005 |
| CN | 1704556 A | 12/2005 |
| CN | 1822951 A | 8/2006 |
| CN | 200966026 Y | 10/2007 |
| CN | 201104273 Y | 8/2008 |
| CN | 101421558 A | 4/2009 |
| CN | 101501757 A | 8/2009 |
| CN | 101600604 A | 12/2009 |
| CN | 101678209 A | 3/2010 |
| CN | 101702036 A | 5/2010 |
| CN | 101707892 A | 5/2010 |
| CN | 101762920 A | 6/2010 |
| CN | 101969207 A | 2/2011 |
| CN | 102168517 A | 8/2011 |
| CN | 102183237 A | 9/2011 |
| CN | 102203370 A | 9/2011 |
| CN | 102330530 A | 1/2012 |
| CN | 202110359 U | 1/2012 |
| CN | 202230346 U | 5/2012 |

(56) References Cited

FOREIGN PATENT DOCUMENTS

| | | |
|---|---|---|
| CN | 102183237 B | 8/2012 |
| CN | 102749781 A | 10/2012 |
| CN | 202794021 U | 3/2013 |
| CN | 103168269 A | 6/2013 |
| CN | 103370192 A | 10/2013 |
| CN | 103370490 A | 10/2013 |
| CN | 103370649 A | 10/2013 |
| CN | 103370986 A | 10/2013 |
| CN | 203271490 U | 11/2013 |
| CN | 203870367 U | 1/2014 |
| CN | 103987909 A | 8/2014 |
| CN | 104181612 A | 12/2014 |
| CN | 104321497 A | 1/2015 |
| CN | 204155059 U | 2/2015 |
| CN | 104429162 A | 3/2015 |
| CN | 104685428 A | 6/2015 |
| CN | 204422071 U | 6/2015 |
| CN | 104781493 A | 7/2015 |
| CN | 105549293 A | 5/2016 |
| CN | 106462023 A | 2/2017 |
| DE | 10124673 A1 | 11/2002 |
| DE | 102014220818 A1 | 4/2016 |
| EP | 0067706 B1 | 2/1991 |
| EP | 0445314 A1 | 9/1991 |
| EP | 0869032 | 10/1998 |
| EP | 1078818 A2 | 2/2001 |
| EP | 1012633 B1 | 3/2002 |
| EP | 1441269 | 7/2004 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2161615 | 3/2010 |
| EP | 2357544 | 8/2011 |
| EP | 2518254 A1 | 10/2012 |
| EP | 2590095 A1 | 5/2013 |
| EP | 2764998 A1 | 8/2014 |
| EP | 3114903 A1 | 1/2017 |
| ES | 2308936 A1 | 12/2008 |
| GB | 2462754 A | 5/2004 |
| JP | S61-022897 U | 2/1986 |
| JP | S62-082194 A | 4/1987 |
| JP | 63-208830 | 8/1988 |
| JP | 02-132420 | 5/1990 |
| JP | H04-031833 A | 2/1992 |
| JP | H04-363495 A | 12/1992 |
| JP | 05-178645 | 7/1993 |
| JP | 10-063216 | 5/1998 |
| JP | H10159465 A | 6/1998 |
| JP | 2000-008476 A | 1/2000 |
| JP | 2000-096956 A | 4/2000 |
| JP | 2002-148573 A | 5/2002 |
| JP | 2004-170350 A | 6/2004 |
| JP | 2004-245985 | 9/2004 |
| JP | 2005054356 A | 3/2005 |
| JP | 2005-282106 A | 10/2005 |
| JP | 2005-314870 A | 11/2005 |
| JP | 2006-009281 A | 1/2006 |
| JP | 2006-029027 A | 2/2006 |
| JP | 2007-120090 A | 5/2007 |
| JP | 2007-308971 A | 11/2007 |
| JP | 2009-508387 A | 2/2009 |
| JP | 2010-101151 A | 5/2010 |
| JP | 2010-529488 | 8/2010 |
| JP | 4694816 B2 | 6/2011 |
| JP | 4799113 B2 | 10/2011 |
| JP | 2013-057975 A | 3/2013 |
| JP | 2014-062801 A | 4/2014 |
| JP | 2016516921 A | 6/2016 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 B1 | 6/2009 |
| KR | 10-0931183 | 12/2009 |
| KR | 10-2010-0034361 | 4/2010 |
| KR | 10-2011-0003698 | 1/2011 |
| KR | 10-2011-0052721 | 5/2011 |
| KR | 10-2011-0094672 | 8/2011 |
| KR | 10-2011-0118783 | 11/2011 |
| KR | 20130018527 A | 2/2013 |
| KR | 20140139894 A | 12/2014 |
| KR | 10-1815919 B1 | 1/2018 |
| RU | 29501 U1 | 5/2003 |
| TW | 200532346 A | 10/2005 |
| TW | 200920987 A | 5/2009 |
| TW | 201029838 A | 8/2010 |
| TW | 201215981 A | 4/2012 |
| TW | 201217999 A | 5/2012 |
| TW | 201243470 A1 | 11/2012 |
| TW | 201248286 A1 | 12/2012 |
| TW | 201403034 A | 1/2014 |
| TW | 201447089 A | 12/2014 |
| TW | 201231789 | 8/2021 |
| WO | WO1996/32560 A1 | 10/1996 |
| WO | WO1998/016870 | 4/1998 |
| WO | WO99/13359 A1 | 3/1999 |
| WO | WO02/09338 A2 | 1/2002 |
| WO | WO2002/013052 | 2/2002 |
| WO | WO2004/003649 | 1/2004 |
| WO | WO2005/052524 A1 | 6/2005 |
| WO | WO2005/098811 | 10/2005 |
| WO | WO2005/103807 | 11/2005 |
| WO | WO2007/016546 A2 | 2/2007 |
| WO | WO2007/146862 | 12/2007 |
| WO | WO2008/030018 | 3/2008 |
| WO | WO2008/048181 A1 | 4/2008 |
| WO | WO2008/147322 | 12/2008 |
| WO | WO2009/044330 A1 | 4/2009 |
| WO | WO2009/124647 | 10/2009 |
| WO | WO2010/079388 A1 | 7/2010 |
| WO | WO2010/120771 | 10/2010 |
| WO | WO2011/020478 | 2/2011 |
| WO | WO2011/087684 | 7/2011 |
| WO | WO2011/087687 | 7/2011 |
| WO | WO2011/124720 | 10/2011 |
| WO | WO2011/127015 | 10/2011 |
| WO | WO2012/079159 | 6/2012 |
| WO | WO2012/080589 | 6/2012 |
| WO | WO2012/080618 | 6/2012 |
| WO | WO2012/080656 | 6/2012 |
| WO | WO2012/080657 | 6/2012 |
| WO | WO2012/125332 A2 | 9/2012 |
| WO | WO2012/145155 | 10/2012 |
| WO | WO2013/059674 | 4/2013 |
| WO | WO2013/102932 A2 | 7/2013 |
| WO | WO2013/105244 A1 | 7/2013 |
| WO | WO2013/109881 | 7/2013 |
| WO | WO2013/130781 A1 | 9/2013 |
| WO | WO2013/155467 | 10/2013 |
| WO | WO2013/181408 A2 | 12/2013 |
| WO | WO2014/121863 | 8/2014 |
| WO | WO2014/130471 | 8/2014 |
| WO | WO2014/134451 | 9/2014 |
| WO | WO2014/150153 | 9/2014 |
| WO | WO2014/165692 A1 | 10/2014 |
| WO | WO2014/209812 A1 | 12/2014 |
| WO | WO2015/023842 A1 | 2/2015 |
| WO | WO2015/077097 A1 | 5/2015 |
| WO | WO2015/095615 A1 | 6/2015 |
| WO | WO2015/171886 A1 | 11/2015 |
| WO | WO2016/004109 A1 | 1/2016 |
| WO | WO2016/029156 A1 | 2/2016 |
| WO | WO2016/029165 A2 | 2/2016 |
| WO | WO2016/053960 | 4/2016 |
| WO | WO2016/054112 | 4/2016 |
| WO | WO2016/058695 A1 | 4/2016 |
| WO | WO2016/054112 A1 | 5/2016 |
| WO | WO2016/085964 | 6/2016 |
| WO | WO-2016094445 A1 | 6/2016 |
| WO | WO2016/191406 | 12/2016 |
| WO | WO2017/007942 | 1/2017 |
| WO | WO2017/059362 A1 | 4/2017 |

(56) References Cited

FOREIGN PATENT DOCUMENTS

| WO | WO2017/062592 | 4/2017 |
|---|---|---|
| WO | WO2017/075472 | 5/2017 |
| WO | WO2017/189437 | 11/2017 |
| WO | WO2017/189437 A1 | 11/2017 |
| WO | WO2017/210346 A1 | 12/2017 |
| WO | WO2018/034935 A1 | 2/2018 |
| WO | WO2018/034933 A1 | 3/2018 |
| WO | WO2018/038972 A1 | 3/2018 |
| WO | WO2018/039433 A1 | 3/2018 |
| WO | WO2018/067996 | 4/2018 |
| WO | WO2018/098089 A1 | 5/2018 |
| WO | WO2018/112095 | 6/2018 |
| WO | WO2018/140495 A1 | 8/2018 |
| WO | WO2018/157063 A1 | 8/2018 |
| WO | WO2019/183232 | 9/2019 |
| WO | WO2019/183289 | 9/2019 |
| WO | WO2021080879 | 4/2021 |

OTHER PUBLICATIONS

English translation of CN201104273 description form worldwide. espacenet.com.*
English translation of JP2004170350 description form worldwide. espacenet.com.*
U.S. Final Office Action dated Jul. 2, 2015 in U.S. Appl. No. 13/049,756.
U.S. Final Office Action dated Aug. 19, 2013 in U.S. Appl. No. 13/049,756.
U.S. Notice of Allowance dated Jan. 8, 2016 in U.S. Appl. No. 13/049,756.
U.S. Notice of Allowance dated Jun. 22, 2016 in U.S. Appl. No. 13/049,756.
U.S. Office Action dated Oct. 6, 2014 in U.S. Appl. No. 13/049,756.
U.S. Office Action dated Jan. 18, 2013 in U.S. Appl. No. 13/049,756.
U.S. Final Office Action dated Jun. 5, 2015 U.S. Appl. No. 13/968,258.
U.S. Office Action dated Oct. 6, 2014 in U.S. Appl. No. 13/968,258.
U.S. Office Action dated Aug. 28, 2017 in U.S. Appl. No. 14/932,474.
U.S. Notice of Allowance dated Jan. 12, 2018 in U.S. Appl. No. 14/932,474.
U.S. Office Action dated May 18, 2018 in U.S. Appl. No. 15/891,866.
U.S. Final Office Action dated Jan. 11, 2019 in U.S. Appl. No. 15/891,866.
U.S. Notice of Allowance dated May 8, 2012 in U.S. Appl. No. 13/049,750.
U.S. Final Office Action dated Apr. 30, 2012 in U.S. Appl. No. 13/049,750.
U.S. Office Action dated Feb. 3, 2012 in U.S. Appl. No. 13/049,750.
U.S. Final Office Action dated Feb. 26, 2015 in U.S. Appl. No. 13/479,137.
U.S. Final Office Action dated Jan. 27, 2014 in U.S. Appl. No. 13/479,137.
U.S. Notice of Allowance dated May 14, 2015 in U.S. Appl. No. 13/479,137.
U.S. Notice of Allowance (supplemental) dated Jun. 12, 2015 in U.S. Appl. No. 13/479,137.
U.S. Office Action dated Jul. 3, 2014 in U.S. Appl. No. 13/479,137.
U.S. Office Action dated Sep. 23, 2013 in U.S. Appl. No. 13/479,137.
U.S. Office Action dated Jan. 16, 2015 in U.S. Appl. No. 14/468,778.
U.S. Notice of Allowance dated Jul. 20, 2012 in U.S. Appl. No. 13/049,623.
U.S. Office Action dated Mar. 27, 2012 in U.S. Appl. No. 13/049,623.
U.S. Notice of Allowance dated Jun. 17, 2014 in U.S. Appl. No. 13/309,990.
U.S. Office Action dated Dec. 24, 2013 in U.S. Appl. No. 13/309,990.
U.S. Notice of Allowance dated Aug. 12, 2016 in U.S. Appl. No. 14/352,973.
U.S. Office Action dated Nov. 27, 2015 in U.S. Appl. No. 14/352,973.
U.S. Office Action dated Nov. 2, 2017 in U.S. Appl. No. 15/349,860.
U.S. Notice of Allowance dated Aug. 16, 2018 in U.S. Appl. No. 15/349,860.
U.S. Notice of Allowance dated Nov. 16, 2018 in U.S. Appl. No. 15/349,860.
U.S. Notice of Allowance dated Jan. 10, 2014 in U.S. Appl. No. 13/449,235.
U.S. Office Action dated Oct. 11, 2013 in U.S. Appl. No. 13/449,235.
U.S. Notice of Allowability (corrected) dated Jul. 28, 2016 in U.S. Appl. No. 14/163,026.
U.S. Notice of Allowance dated Jun. 8, 2016 in U.S. Appl. No. 14/163,026.
U.S. Office Action dated Apr. 14, 2016 in U.S. Appl. No. 14/163,026.
U.S. Office Action dated Feb. 24, 2015 in U.S. Appl. No. 14/163,026.
U.S. Office Action dated Nov. 27, 2015 in U.S. Appl. No. 14/163,026.
U.S. Notice of Allowance dated Apr. 4, 2016 in U.S. Appl. No. 14/535,080.
U.S. Office Action dated Feb. 22, 2016 in U.S. Appl. No. 14/535,080.
U.S. Office Action dated Nov. 19, 2015 in U.S. Appl. No. 14/535,080.
U.S. Office Action dated Mar. 8, 2017 in U.S. Appl. No. 14/993,822.
U.S. Office Action dated Oct. 11, 2017 in U.S. Appl. No. 14/993,822.
U.S. Notice of Allowance dated May 3, 2018 in U.S. Appl. No. 14/993,822.
U.S. Office Action dated Sep. 14, 2018 in U.S. Appl. No. 14/993,822.
U.S. Office Action dated Mar. 27, 2019 in U.S. Appl. No. 14/993,822.
U.S. Notice of Allowance dated Jan. 27, 2017 in U.S. Appl. No. 14/931,390.
U.S. Office Action dated Jun. 6, 2017 in U.S. Appl. No. 15/442,509.
U.S. Office Action dated Jan. 5, 2018 in U.S. Appl. No. 15/442,509.
U.S. Notice of Allowance dated Sep. 25, 2018 in U.S. Appl. No. 15/442,509.
U.S. Office Action dated Mar. 5, 2019 in U.S. Appl. No. 15/442,509.
U.S. Final Office Action dated May 16, 2014 in U.S. Appl. No. 13/449,248.
U.S. Office Action dated Nov. 29, 2013 in U.S. Appl. No. 13/449,248.
U.S. Office Action dated Sep. 29, 2014 in U.S. Appl. No. 13/449,248.
U.S. Final Office Action dated May 15, 2014 in U.S. Appl. No. 13/449,251.
U.S. Office Action dated Jun. 3, 2015 in U.S. Appl. No. 13/449,251.
U.S. Office Action dated Oct. 28, 2014 in U.S. Appl. No. 13/449,251.
U.S. Office Action dated Nov. 29, 2013 in U.S. Appl. No. 13/449,251.
U.S. Notice of Allowance dated Jan. 22, 2015 in U.S. Appl. No. 13/682,618.
U.S. Office Action dated Sep. 15, 2014 in U.S. Appl. No. 13/682,618.
U.S. Notice of Allowance dated Apr. 13, 2015 in U.S. Appl. No. 14/657,380.
U.S. Final Office Action dated Jul. 29, 2016 in U.S. Appl. No. 13/772,969.
U.S. Notice of Allowance dated Dec. 22, 2016 in U.S. Appl. No. 13/772,969.
U.S. Office Action dated Jan. 5, 2016 in U.S. Appl. No. 13/772,969.
U.S. Notice of Allowance dated Jan. 22, 2018 in U.S. Appl. No. 15/464,837.
U.S. Office Action dated May 30, 2018 in U.S. Appl. No. 15/464,837.
U.S. Office Action dated Mar. 12, 2019 in U.S. Appl. No. 15/464,837.
U.S. Notice of Allowance dated Mar. 20, 2018 in U.S. Appl. No. 15/347,677.
Letter dated Dec. 1, 2014 re Prior Art re U.S. Appl. No. 13/772,969 from Ryan D. Ricks representing MechoShade Systems, Inc.
Third-Party Submission dated Feb. 2, 2015 and Feb. 18, 2015 PTO Notice re Third-Party Submission for U.S. Appl. No. 13/772,969.
Chinese Office Action dated Apr. 5, 2016 in Chinese Application No. 201280023631.4.
Chinese Office Action dated Dec. 1, 2016 in Chinese Application No. 201280023631.4.
Chinese Office Action dated Jun. 26, 2015 in Chinese Application No. 201280023631.4.
European Search Report dated Aug. 11, 2014 in European Application No. 12757877.1.
European Extended Search Report dated Jun. 18, 2019 in EP Application No. 19165771.7.
Taiwanese Office Action dated Jan. 11, 2016 in TW Application No. 101108958.
Taiwanese Office Action dated Nov. 23, 2016 in TW Application No. 105129854.

(56) References Cited

OTHER PUBLICATIONS

Taiwanese Office Action dated Oct. 17, 2017 in TW Application No. 106115702.
Taiwanese Office Action dated May 8, 2019 in TW Application No. 107122055.
International Preliminary Report on Patentability dated Sep. 26, 2013, issued in PCT/US2012/027828.
International Search Report and Written Opinion dated Sep. 26, 2012, issued in PCT/US2012/027828.
European Search Report dated Jul. 29, 2014 in European Application No. 12758250.0.
International Preliminary Report on Patentability dated Sep. 26, 2013, issued in PCT/US2012/027909.
International Search Report and Written Opinion dated Sep. 24, 2012, issued in PCT/US2012/027909.
European Search Report dated Jul. 23, 2014 in European Application No. 12756917.6.
International Preliminary Report on Patentability dated Sep. 26, 2013, issued in PCT/US2012/027742.
International Search Report and Written Opinion dated Sep. 24, 2012, issued in PCT/US2012/027742.
Chinese Office Action dated Mar. 26, 2015 in Chinese Application No. 2015032301101560.
Chinese Office Action dated Nov. 27, 2015 in Chinese Application No. 2015032301101560.
Chinese Office Action dated Dec. 25, 2018 in CN Application No. 201710111979.3.
European Office Action dated May 15, 2017 in EP Application No. EP 12841714.4.
European Search Report dated Mar. 5, 2015 in European Application No. 12841714.4.
European Office Action dated Dec. 2, 2015 in EP Application No. 12841714.4.
International Preliminary Report on Patentability dated May 1, 2014 in PCT/US2012/061137.
International Search Report and Written Opinion dated Mar. 28, 2013 in PCT/US2012/061137.
Australian Examination Report dated Sep. 9, 2016 in AU Application No. 2013249621.
Australian Examination Report dated Dec. 19, 2018 in AU Application No. 2017270472.
Chinese Office Action dated Oct. 10, 2015 in CN Application No. 201380026428.7.
Chinese Office Action dated Dec. 19, 2018 in CN Application No. 201610645398.3.
European Search Report dated May 11, 2016 in EP Application No. 13777540.9.
European Office Action dated Jul. 15, 2019 in EP Application No. 13777540.9.
Russian Office Action dated Apr. 13, 2017 in RU Application No. 2014144632.
Russian Office Action dated Nov. 22, 2017 in RU Application No. 2014144632.
Singapore Supplementary Examination Report dated Dec. 7, 2016 in SG Application No. 11201406676Q.
International Preliminary Report on Patentability dated Oct. 30, 2014 issued in PCT/US2013/036235.
International Search Report and Written Opinion dated Jul. 23, 2013, issued in PCT/US2013/036235.
International Preliminary Report on Patentability dated Oct. 23, 2014 issued in PCT/US2013/036456.
International Search Report and Written Opinion dated Jul. 26, 2013, issued in PCT/US2013/036456.
International Preliminary Report on Patentability dated Oct. 30, 2014 issued in PCT/US2013/034998.
International Search Report and Written Opinion dated Jul. 11, 2013, issued in PCT/US2013/034998.
International Preliminary Report on Patentability dated Feb. 19, 2015 issued in PCT/US2013/053625.
International Search Report and Written Opinion dated Dec. 26, 2013, issued in PCT/US2013/053625.
Australian Examination Report dated Mar. 31, 2017 in AU Application No. 2014219076.
Australian Examination Report dated Feb. 21, 2019 in AU Application No. 2018201341.
Chinese Office Action dated Jun. 27, 2016 in Chinese Application No. 201480022064.X.
Chinese Office Action dated May 15, 2017 in Chinese Application No. 201480022064.X.
Chinese Office Action dated Feb. 9, 2018 in CN Application No. 201480022064.X.
EP Invitation to Indicate Search dated Jun. 22, 2016 in EP Application No. 14753897.9.
European Extended Search Report dated Oct. 12, 2016 in EP Application No. 14753897.9.
European Office Action dated Dec. 12, 2017 in EP Application No. 14753897.9.
EPO Communication dated Sep. 2, 2015 in EP Application No. 14753897.9 re Third-Party Observations.
European Extended Search Report dated Jan. 18, 2019 in EP Application No. 18208971.4.
Japanese Office Action dated Feb. 6, 2018 in JP Application No. 2015-558909.
Japanese Decision of Rejection dated Oct. 24, 2018 in JP Application No. JP 2015-558909.
Russian Decision to Grant with Search Report dated Feb. 28, 2018 in RU Application No. 2015139884.
Taiwanese Office Action dated Aug. 22, 2017 in TW Application No. 103105957.
International Preliminary Report on Patentability dated Sep. 3, 2015, issued in PCT/US2014/016974.
International Search Report and Written Opinion dated May 26, 2014 in PCT/US2014/016974.
Communication re Third-Party Observation dated Dec. 4, 2014 and Third-Party Observation dated Dec. 3, 2014 in PCT/US2014/016974.
Australian Office Action dated Jul. 1, 2019 in AU Application No. 2015255913.
Chinese Office Action dated Jan. 14, 2019 in CN Application No. 201580035315.2.
Extended European Search Report dated Apr. 3, 2018 in EP Application No. 15789108.6.
Partial EP Supplemental Search Report dated Nov. 29, 2017 in EP Application No. 15789108.6.
Japanese Office Action dated Apr. 2, 2019 in JP Application No. 2016-567021.
Russian Office Action dated Dec. 7, 2018 in RU Application No. 2016148196.
Taiwanese Office Action dated Jan. 30, 2019 in TW Application No. 104114812.
International Search Report and Written Opinion dated Jul. 23, 2015 in PCT/US2015/029675.
International Preliminary Report on Patentability dated Nov. 24, 2016 in PCT/US2015/029675.
International Search Report and Written Opinion dated Mar. 30, 2018 in PCT/US2017/066198.
International Preliminary Report on Patentability dated Jun. 17, 2019 in PCT/US2017/066198.
International Search Report and Written Opinion dated Oct. 16, 2014, issued in PCT/US2014/043514.
EP Partial Supplemental Search Report dated Apr. 12, 2019 in EP Application No. 16852784.4.
EP Extended Search Report dated May 16, 2019 in EP Application No. 16852784.4.
International Preliminary Report on Patentability dated Apr. 12, 2018, issued in PCT/US16/55005.
International Search Report and Written Opinion dated Dec. 13, 2016, issued in PCT/US16/55005.
European Extended Search Report dated Jan. 17, 2019 in EP Application No. 16821984.8.
International Preliminary Report on Patentability dated Jan. 18, 2018 in PCT/US2016/041344.

(56) References Cited

OTHER PUBLICATIONS

International Search Report and Written Opinion dated Oct. 13, 2016, issued in PCT/US2016/041344.
International Search Report and Written Opinion dated Jan. 25, 2018 in PCT/US17/55631.
International Preliminary Report on Patentability dated Apr. 18, 2019 in PCT/US17/55631.
International Preliminary Report on Patentability dated Dec. 13, 2018 in PCT/US17/35290.
International Search Report and Written Opinion dated Sep. 8, 2017, issued in PCT/US17/35290.
International Search Report and Written Opinion (ISA: KIPO) dated Jun. 11, 2018 issued in PCT/US2018/019737.
"How Cleantech wants to make a 2012 comeback" http://mountainview.patch.com/articles/how-cleantech-wants-to-make-a-2012-comeback, Jan. 23, 2012.
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
"Remote Sensing: Clouds," Department of Atmospheric and Ocean Science, University of Maryland, (known as of Sep. 3, 2014) [http://www.atmos.umd.edu/~pinker/remote_sensing_clouds.htm].
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
APC by Schneider Electric, Smart-UPS 120V Product Brochure, 2013, 8 pp.
Benson D. K. et al., "Design goals and challenges for a photovoltaic-powered electrochromic window covering", Solar Energy Materials and Solar Cells, vol. 39, No. 2/04, Dec. 1995, pp. 203-211.
Duchon, Claude E. et al., "Estimating Cloud Type from Pyranometer Observations," Journal of Applied Meteorology, vol. 38, Jan. 1999, pp. 132-141.
Graham, Steve, "Clouds & Radiation," Mar. 1, 1999. [http://earthobservatory.nasa.gov/Features/Clouds/].
Haby, Jeff, "Cloud Detection (IR v. VIS)," (known as of Sep. 3, 2014) [http://theweatherprediction.com/habyhints2/512/].
Hoosier Energy, "How do they do that? Measuring Real-Time Cloud Activity" Hoosier Energy Current Connections, (known as of Sep. 3, 2014). (http://members.questline.com/Article.aspx?articleID=18550&accountID=196000&nl=11774).
Kipp & Zonen, "Solar Radiation" (known as of Sep. 3, 2014) [http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
National Aeronautics & Space Administration, "Cloud Radar System (CRS)," (known as of Sep. 3, 2014) [http://har.gsfc.nasa.gov/index.php?section=12].
National Aeronautics & Space Administration, "Cloud Remote Sensing and Modeling," (known as of Sep. 3, 2014) [http://atmospheres.gsfc.nasa.gov/climate/index.php?section=134].
Science and Technology Facilities Council. "Cloud Radar: Predicting the Weather More Accurately." ScienceDaily, Oct. 1, 2008. [www.sciencedaily.com/releases/2008/09/080924085200.htm].
American Chemical Society, "Solar smart window could offer privacy and light control on demand (video)," EurakAlert! Pub Release, Nov. 16, 2016 [https://www.eurekalert.org/pub_releases/2016-11/acs-ssw111616.php].
Selkowitz, S. et al., "Dynamic, Integrated Façade Systems for Energy Efficiency and Comfort," Journal of Buiding Enclosure Design, Summer 2006, pp. 11-17.

Idso, Sherwood B., "Humidity measurement by infrared thermometry," Remote Sensing of Environment, vol. 12, 1982, pp. 87-91.
Maghrabi, A., et al., "Design and development of a simple infrared monitor for cloud detection," Energy Conversion and Management, vol. 50, 2009, pp. 2732-2737.
Maghrabi, A., et al., "Precipitable water vapour estimation on the basis of sky temperatures measured by a single-pixel IE detector and screen temperatures under clear skies," Meteorological Applications, vol. 17, 2010, pp. 279-286.
Morris, V.R. et al., "Deployment of an infrared thermometer network at the atmospheric radiation measurement program southern great plains climate research facility," Sixteenth ARM Science Team Meeting Proceedings, Albuquerque, NM, Mar. 27-31, 2006, 11 pp.
Thompson, Marcus, "Boltwood cloud sensor," Cloudynights.com, Nov. 25, 2005, 6 pp. [online], [retrieved Dec. 15, 2016]. Retrieved from the internet <URL http://www.cloudynights.com/page/articles/cat/user-reviews/photography/photography-accessories/boltwood-cloud-sensor-r1222>.
Werner, Christian, "Automatic cloud cover indicator system," Journal of Applied Meteorology, vol. 12, Dec. 1973, pp. 1394-1400.
Boltwood Cloud Sensor II by Diffraction Limited, 2016, [online], [retrieved Dec. 15, 2016]. Retrieved from the internet <URL http://diffractionlimited.com/product/boltwood-cloud-sensor-ii/>.
Mims III, Forrest M., et al., "Measuring total column water vapor by pointing an infrared thermometer at the sky," Bulletin of the American Meteorological Society, Oct. 2011, pp. 1311-1320.
Melexis "MLX90614 family Datasheet" (3901090614, Rev. 004), Jul. 30, 2008, 42 pp.
Preliminary Amendment dated Feb. 20, 2018 in U.S. Appl. No. 15/287,646.
U.S. Office Action dated May 5, 2017 in Design U.S. Appl. No. 29/560,076.
U.S. Notice of Allowance dated Dec. 12, 2017 in Design U.S. Appl. No. 29/560,076.
U.S. Office Action dated Aug. 2, 2017 in U.S. Appl. No. 14/998,019.
U.S. Office Action dated Jun. 8, 2018 in U.S. Appl. No. 14/998,019.
U.S. Final Office Action dated Jan. 17, 2019 in U.S. Appl. No. 14/998,019.
U.S. Office Action dated Jun. 14, 2019 in U.S. Appl. No. 14/998,019.
U.S. Office Action dated Aug. 9, 2018 in U.S. Appl. No. 15/287,646.
U.S. Final Office Action dated Feb. 21, 2019 in U.S. Appl. No. 15/287,646.
U.S. Office Action dated Jan. 22, 2018 in U.S. Appl. No. 15/514,480.
U.S. Final Office Action dated Sep. 26, 2018 in U.S. Appl. No. 15/514,480.
U.S. Notice of Allowance dated Jan. 24, 2019 in U.S. Appl. No. 15/514,480.
U.S. Notice of Allowance dated May 23, 2019 in U.S. Appl. No. 15/514,480.
U.S. Office Action dated Jun. 29, 2018 in U.S. Appl. No. 15/513,535.
U.S. Notice of Allowance dated Nov. 1, 2018 in U.S. Appl. No. 15/513,535.
Canadian Office Action dated Apr. 11, 2017 in CA Design Application No. 170770.
Canadian Office Action dated Nov. 15, 2017 in CA Design Application No. 170770.
Chinese Office Action dated Apr. 27, 2017 in CN Design Application No. 201630492174.4.
Chinese Office Action dated Apr. 3, 2018 in CN Application No. 201580059148.5.
Chinese Office Action dated Feb. 2, 2019 in CN Application No. 201580059148.5.
Extended European Search Report dated May 3, 2018 in EP Application No. 15848030.1.
Russian Office Action & Search Report dated Apr. 1, 2019 in RU Application No. 2017114996.
International Preliminary Report on Patentability dated Apr. 13, 2017 in PCT/US2015/052822.
International Search Report and Written Opinion dated Jan. 14, 2016 in PCT/US2015/052822.
Chinese Office Action dated Mar. 25, 2019 in CN Application No. 201580052861.7.

(56) References Cited

OTHER PUBLICATIONS

Extended European Search Report dated Apr. 26, 2018 in EP Application No. 15845648.3.
European Office Action dated Feb. 21, 2019 in EP Application No. 15845648.3.
International Preliminary Report on Patentability dated Apr. 13, 2017 in PCT/US2015/053041.
International Search Report and Written Opinion dated Dec. 18, 2015 in PCT/US2015/053041.
Australian Examination Report dated May 31, 2019 in AU Application No. 2016334038.
European Examination Report dated Jul. 11, 2019 in EP Application No. 16854302.3.
International Preliminary Report on Patentability dated Apr. 19, 2018 in PCT/US2016/055709.
International Search Report and Written Opinion dated Dec. 15, 2016 in PCT/US2016/055709.
International Preliminary Report on Patentability dated Dec. 12, 2018 in PCT/US17/35290.
Clay, R.W., et al., "A cloud monitoring system for remote sites," Publications of the Astronomical Society of Australia, vol. 15, No. 3, Jan. 1998, pp. 332-335.
Sloan, Raymond, et al., "Infrared Emission Spectrum of the Atmosphere," Journal of the Optical Society of America, vol. 45, No. 6, Jun. 1955, pp. 455-460.
SurroundVideo Series, "Pioneering Multi-Sensor IP Megapixel Cameras," [webpage] 10 pp. [retrieved Jul. 24, 2015] <URL:http://web.archive.org/web/20150724235343/http://www.arecontvision.com/landing-pages/surround-video/overview.php>.
C-Bus Multi-Sensors, posted on clipsal.com. [online] <URL: https://www.clipsal.com/Trade/Products/Integrated-Systems/C-Bus-Control-and-Management-System/C-Bus-1 nput -Units/Sensors-and- Detectors#. WOf1 LvkrlmE>.
Gen5 Z-Wave Plus 6-in-1 Multisensor, posted on thesmartesthouse.com, Earliest review on Aug. 27, 2015. [online] <URL:https://www.thesmartesthouse.com/products/aeotec-by-aeon-Iabs-z-wave-5-in-1-multisensor#shopify-product-reviews>.
"Sky temperature" in Designing Buildings Wiki, Apr. 26, 2015, <https://www.designingbuildings.co.uk/wiki/Sky_temperature> [retrieved Jul. 19, 2019].
U.S. Appl. No. 16/013,770, filed Jun. 20, 2018, Brown et al.
U.S. Appl. No. 16/262,775, filed Jan. 30, 2019, Frank et al.
Preliminary Amendment dated Apr. 19, 2019 for U.S. Appl. No. 16/262,775.
Preliminary Amendment dated Mar. 12, 2020, in U.S. Appl. No. 16/695,057.
Preliminary Amendment dated May 8, 2020 in U.S. Appl. No. 16/696,887.
U.S. Notice of Allowance dated Jan. 23, 2020 in U.S. Appl. No. 14/998,019.
U.S. Notice of Allowance dated Apr. 29, 2020 in U.S. Appl. No. 14/998,019.
U.S. Office Action dated Dec. 10, 2020 in U.S. Appl. No. 16/871,976.
U.S. Notice of Allowance dated Sep. 9, 2019 in U.S. Appl. No. 15/287,646.
U.S. Office Action dated Dec. 9, 2020 in U.S. Appl. No. 16/696,887.
U.S. Notice of Allowance dated Sep. 6, 2019 in U.S. Appl. No. 15/514,480
U.S. Notice of Allowance dated Jun. 1, 2020 in U.S. Appl. No. 16/695,057.
U.S. Notice of Allowance dated Oct. 15, 2020 in U.S. Appl. No. 16/946,168.
U.S. Office Action dated Feb. 20, 2020 in U.S. Appl. No. 16/262,775.
U.S. Office Action dated Sep. 29, 2020 in U.S. Appl. No. 16/262,775.
U.S. Office Action dated Jun. 11, 2020 in U.S. Appl. No. 16/303,384.
Examination Report No. 1, dated May 7, 2020, for Australian Patent Application No. 2015324000 3 pages.
Chinese Office Action dated Aug. 1, 2019 in CN Application No. 201580059148.5.
Chinese Office Action dated May 6, 2020 in CN Application No. 201580059148.5.
Chinese Office Action dated Dec. 1, 2020 in CN Application No. 201580059148.5, with English Translation.
European Office Action dated Aug. 27, 2019 in EP Application No. 15848030.1.
Indian First Examination Report dated Sep. 17, 2020 in Indian Patent Application No. 201737011527.
Taiwanese Office Action dated Jun. 28, 2019 in TW Application No. 104131932.
Taiwanese Decision of Rejection dated Nov. 1, 2019 in TW Application No. 104131932.
Chinese Office Action dated Apr. 13, 2020 in CN Application No. 201580052861.7.
Chinese Office Action dated Dec. 10, 2020 in CN Application No. 201580052861.7.
Australian Examination Report dated Aug. 20, 2020 in AU Application No. 2016334038.
Chinese Office Action dated Nov. 20, 2019 in CN Application No. 201680062708.7 with Translation.
Chinese Office Action dated Aug. 17, 2020 in CN Application No. 201680062708.7 with Translation.
Taiwan Office Action dated Jul. 2, 2020 in Taiwan Patent Application No. 105132457 with Translation.
Chinese Office Action dated Jan. 12, 2021 in CN Application No. 201780065447.9 with Translation.
International Search Report and Written Opinion (ISA:EPO) dated Jul. 5, 2019 in PCT/US19/23186.
International Preliminary Report on Patentability dated Sep. 22, 2020 in PCT/US19/23186.
European (Partial) Search Report dated Dec. 17, 2019 in EP Application No. 17807428.2.
"Halio Rooftop Sensor Kit (Model SR500)," Product Data Sheet, Kinestral Technologies, 2020, 4 pp.
"SPN1 Sunshine Pyranometer," Product Overview, Specification, Accessories and Product Resources, Delta-T Devices, May 5, 2016, 9 pp. <<https://www.delta-t.co.uk/product/spn1/>> (downloaded Apr. 28, 2020).
Campbell-Burns, Peter, "Building a Cloud Sensor", Farnham Astronomical Society, (Apr. 15, 2013), Retrieved from the internet: URL: https://www.farnham-as.co.uk/2813/84/building-a-cloud-sensor/ [retrieved on 2828-84-24]
U.S. Preliminary Amendment dated Oct. 30, 2019 for U.S. Appl. No. 16/013,770.
U.S. Office Action dated Sep. 19, 2019 in U.S. Appl. No. 15/891,866.
U.S. Final Office Action dated Apr. 30, 2020 in U.S. Appl. No. 15/891,866.
U.S. Notice of Allowance dated Aug. 7, 2020 in U.S. Appl. No. 15/891,866.
U.S. Notice of Allowance dated Sep. 6, 2019 in U.S. Appl. No. 14/993,822.
U.S. Notice of Allowance dated Sep. 3, 2019 in U.S. Appl. No. 15/442,509.
U.S. Office Action dated Jan. 2, 2020 in U.S. Appl. No. 15/442,509.
U.S. Notice of Allowance dated May 27, 2020 in U.S. Appl. No. 15/442,509.
U.S. Notice of Allowance (corrected) dated Jun. 9, 2020 in U.S. Appl. No. 15/442,509.
U.S. Notice of Allowance dated Oct. 2, 2019 in U.S. Appl. No. 15/464,837.
U.S. Office Action dated Mar. 18, 2020 in U.S. Appl. No. 16/013,770.
U.S. Notice of Allowance dated Jul. 23, 2020 in U.S. Appl. No. 16/013,770.
U.S. Notice of Allowance dated Aug. 12, 2020 in U.S. Appl. No. 16/013,770.
U.S. Office Action dated Dec. 10, 2020 in U.S. Appl. No. 16/695,004.
U.S. Office Action dated Jan. 23, 2020 in U.S. Appl. No. 15/762,077.
U.S. Office Action dated Oct. 21, 2019 in U.S. Appl. No. 15/742,015.
U.S. Office Action dated Jun. 23, 2020 in U.S. Appl. No. 15/742,015.
U.S. Office Action dated Oct. 27, 2020 in U.S. Appl. No. 15/762,077.
European Office Action dated Oct. 2, 2020 in EP Application No. 13777540.9.

(56) References Cited

OTHER PUBLICATIONS

Indian Office Action dated Dec. 18, 2019 in IN Application No. 2371/KOLNP/2014.
Korean Office Action, dated Jun. 15, 2020, for Korean Patent Application No. 10-2020-7002032.
Singapore Search Report dated May 29, 2020 in SG Application No. 10201608572S.
Canadian Office Action dated Jan. 28, 2020 in Canadian Application No. 2,902,106.
Canadian Notice of Allowance dated Aug. 12, 2020 in Canadian Application No. 2,902,106.
Indian Office Action dated Sep. 3, 2019 in IN Application No. 3074/KOLNP/2015.
Chinese Notice of Allowance & Search Report dated Sep. 12, 2019 in CN Application No. 201580035315.2.
Extended European Search Report dated Oct. 15, 2020 in EP Application No. 20182982.7.
Indian Office Action dated Jul. 9, 2020 in IN Application No. 201637038970.
Taiwanese Office Action dated Sep. 11, 2020 in TW Application No. 109103256, with English Translation.
Chinese Office Action dated Aug. 23, 2019 in CN Application No. 201680063892.7.
Chinese Office Action dated Jul. 14, 2020 in CN Application No. 201680063892.7, with English Translation.
Chinese Office Action dated Dec. 16, 2020 in CN Application No. 201680063892.7, with English Translation.
Chinese Office Action dated Jun. 28, 2020 in CN Application No. 201680043725.6.
Taiwan Office Action dated Jul. 30, 2020 in ROC (Taiwan) Pat. Appln. No. 105121480, with English Translation.
International Preliminary Report on Patentability dated Sep. 6, 2019 issued in PCT/US2018/019737.
Chinese Office Action dated Feb. 3, 2020 in Chinese Application No. 201710600395.2, with English Translation.
Chinese Office Action dated Mar. 10, 2020 in CN Application No. 201610645398.3, with English Translation.
Notice of Allowance, dated Jun. 18, 2020 in CN Application No. 201610645398.3, No Translation.
Australian Examination Report No. 2 dated Feb. 12, 2020 in AU Application No. 2018201341.
Chinese Office Action dated Jan. 21, 2020 in Chinese Application No. 20181123277.4, with English Translation.
Japanese Office Action dated Mar. 10, 2020 in JP Application No. 2019-031229.
Korean Office Action dated Mar. 30, 2020 in KR Application No. KR 10-2015-7026041, no translation.
Taiwanese Office Action dated Apr. 21, 2020 in TW Application No. TW 107102210, no translation.
EP Extended Search Report dated Apr. 29, 2020 in EP Application No. 17881918.1.
European Office Action dated Mar. 20, 2020 in EP Application No. 16852784.4.
EP Extended Search Report dated May 12, 2020 in EP Application No. 17859286.1.
Invitation to Pay Fees and Communication Relating to the Result of the Partial International Search, dated Jul. 12, 2019, issued in PCT/US2019/023268.
International Search Report and Written Opinion dated Sep. 4, 2019, issued in PCT/US2019/023268.
International Preliminary Report on Patentability dated Sep. 22, 2020, issued in PCT/US2019/023268.
Chinese Office Action dated Nov. 3, 2020 in Chinese Application No. 201710600395.2, with English Translation.
European Intention to Grant, dated Sep. 21, 2020, in EP Application No. 19165771.7.
Taiwanese Office Action dated Sep. 16, 2020 in TW Application No. 108143706, with English Translation.
Australian Notice of Acceptance for Patent Application, dated Sep. 29, 2020, for Australian Patent Application No. 2015255913.
European Intention to Grant, dated Jul. 9, 2020, in EP Application No. 18208971.4.
Decision to Grant, dated Oct. 27, 2020, for Japanese Patent Application No. JP 2019-031229, with partial translation.
EP Extended Search Report dated Dec. 4, 2020 in EP Application No. 18756696.3.
"Smart Glazing: Making smart-tinting glazing even smarter", Daylighting: Design & Technology for Better Buildings, Issue 20 (Jan./Feb. 2020), 5 pages.
"Halio Smart-Tinting Glass System," Product Data Sheet, Kinestral Technologies, www.kinestral.com, copyright 2017, 4 pp.
U.S. Appl. No. 17/027,601, filed Sep. 21, 2020, Brown et al.
U.S. Appl. No. 63/080,899, filed Sep. 21, 2020, Makker et atl.
Preliminary Amendment dated Jan. 6, 2021, in U.S. Appl. No. 16/949,493.
Preliminary Amendment No. 2, dated Dec. 9, 2020 for U.S. Appl. No. 16/695,004.
Preliminary Amendment dated Jul. 10, 2020 for U.S. Appl. No. 15/929,958.
Preliminary Amendment dated Aug. 21, 2019 for U.S. Appl. No. 16/487,802.
Preliminary Amendment dated Nov. 9, 2020 for U.S. Appl. No. 17/008,342.
U.S. Notice of Allowance dated May 13, 2021 in U.S. Appl. No. 16/695,004.
U.S. Notice of Allowance dated May 12, 2021 in U.S. Appl. No. 15/762,077.
U.S. Notice of Allowance dated Mar. 31, 2021 in U.S. Appl. No. 15/742,015.
U.S. Notice of Allowance dated Apr. 22, 2021 in U.S. Appl. No. 15/742,015.
U.S. Office Action dated Mar. 3, 2021 in Application No. 16/303,384.
Chinese Office Action dated May 20, 2021 in Chinese Application No. 201710600395.2, with English Translation.
Canadian Office Action dated Feb. 11, 2021 in CA Application No. 2,870,627.
Chinese Office Action dated Aug. 19, 2019 in CN Application No. 201610645398.3.
Korean Office Action, dated Feb. 16, 2021, in Korean Patent Application No. 10-2020-7002032.
Korean Office Action, dated Feb. 16, 2021, in Korean Patent Application No. 10-2020-7002032, with English Translation.
Korean Office Action, dated Jun. 7, 2021, in Korean Patent Application No. 10-2020-7002032, with English Translation.
Australian Examination Report dated May 20, 2021, in AU Application No. 2020202135.
Canadian Notice of Allowance dated Jan. 18, 2021, in Canadian Application No. 2,902,106.
Indian Office Action dated Jun. 10, 2021, in IN Application No. 202038025893.
Korean Notice of First Refusal dated Feb. 18, 2021, in KR Application No. 10-2015-7026041.
Canadiain Office Action dated Jun. 10, 2021 in CA Application No.2,948,668.
Japanese Office Action dated Jan. 27, 2021 in JP Application No. 2019-232669.
Chinese Office Action dated Jun. 3, 2021 in CN Application No. 201680043725.6, No Translation.
Chinese Office Action dated Jan. 13, 2021 in Chinese Application No. 2018112377.4, with English Translation.
European Office Action dated May 3, 2021 in EP Application No. 17881918.1.
Taiwanese Office Action dated May 13, 2021 in TW Application No. TW 106134521, with English Translation.
EP Extended Search Report dated Mar. 23, 2020 in EP Application No. 17807428.2.
European Intention to Grant, dated Jan. 18, 2021, in EP Application No. 18208971.4.
European Intention to Grant, dated Mar. 23, 2021, in EP Application No. 18208971.4.
Chinese Office Action dated Feb. 2, 2021 in Chinese Application No. 201880022572.6, with English Translation.

(56) References Cited

OTHER PUBLICATIONS

Taiwanese Office Action dated Jun. 21, 2021 in TW Application No. TW 107106439, No translation.
Taiwanese Reissued Office Action dated Jul. 8, 2021 in TW Application No. TW 107106439, No translation.
Halio Automation Brochure, halioglass.com, dated Aug. 2019, 13 pages.
U.S. Appl. No. 17/249,595, filed Mar. 5, 2021, Frank et al.
Preliminary Amendment dated Mar. 8, 2021, in U.S. Appl. No. 17/249,595.
U.S. Notice of Allowance dated Jul. 15, 2021 in in U.S. Appl. No. 16/871,976.
U.S. Office Action dated Jul. 13, 2021 in U.S. Appl. No. 16/696,887.
U.S. Office Action dated Apr. 14, 2021 in U.S. Appl. No. 16/262,775.
Ex Parte Quayle Action, dated Feb. 2, 2021, in U.S. Appl. No. 16/335,222.
U.S. Notice of Allowance dated Apr. 14, 2021 in U.S. Appl. No. 16/335,222.
Chinese Rejection Decision dated Mar. 19, 2021 in CN Application No. 201580059148.5.
European Office Action dated Feb. 3, 2021 in EP Application No. 15848030.1.
Taiwanese Notice of Allowance, dated Jan. 25, 2021 in TW Application No. 104131932 No translation.
Chinese Office Action dated Apr. 13, 2020 in CN Application No. 201580052861.7 with Translation.
Australian Examination Report dated Jul. 9, 2021 in AU Application No. 2020250299.
Chinese Office Action dated Feb. 23, 2021 in CN Application No. 201680062708.7 with Translation.
Indian First Examination Report dated Mar. 15, 2021 in Indian Patent Application No. 201837010260.
Taiwan Notice of Allowance dated Mar. 4, 2021 in Taiwan Patent Application No. 105132457. No. translation.
Taiwan Notice of Allowance dated Jun. 29, 2021 in Taiwan Patent Application No. 110115755. with English translation.
Indian First Examination Report dated Jul. 7, 2021 in Indian Patent Application No. 201917013204.
Taiwan Office Action dated May 13, 2021 in Taiwan Patent Application No. 106134521 with English Translation.
International Search Report and Written Opinion (ISA:EPO) dated Feb. 22, 2021 in PCT/US2020/056164.
Merriam-Webster, Inc., "Pyrometer," Merriam-Webster's Collegiate Dictionary 10th Edition, 2001, Springfield, MA, p. 950 (4 pp.).
Korean Notice of Decsison to Grant dated Jun. 22, 2021 in KR Application No. KR10-2015-7026041, with English Translation.
Korean Notification of Provisional Rejection dated Jun. 22, 2021 in KR Application No. KR10-2016-7032512.
Chinese Office Action dated Jun. 23, 2021 in Chinese Application No. 20181123277.4, with English Translation.
U.S. Appl. No. 17/305,132, filed Jun. 3, 2021, Brown et al.
Preliminary Amendment dated Jul. 1, 2021, in U.S. Appl. No. 17/305,132.
AU Examination Report dated Aug. 28, 2021, in the AU Application No. 202020201.
Chinese Office Action dated Jul. 2, 2018 in Chinese Application No. 201710111979.3.
CN Office Action dated Aug. 4, 2021, in CN Application No. 201780039437.8 with English translation.
CN Office Action dated Aug. 17, 2021, in CN Application No. 201680063892.7 with English translation.
Extended European Search Report dated Jul. 16, 2021 in EP Application No. 21150305.7.
Indian Office Action dated Jul. 7, 2021, in IN Application No. 201917013204.
JP Decision to Grant a Patent dated Jul. 29, 2021, in JP Application No. 2019-232669.
U.S. Corrected Notice of Allowance dated Aug. 19, 2021 in U.S. Appl. No. 16/871,976.
U.S. Non-Final Office Action dated Sep. 13, 2021, in U.S. Appl. No. 17/027,601.
U.S. Notice of Allowance dated Aug. 19, 2021 in U.S. Appl. No. 15/742,015.
U.S. Office Action dated Sep. 16, 2021, in U.S. Appl. No. 16/469,851.
U.S. Office Action dated Sep. 21, 2021, in U.S. Appl. No. 16/487,802.
EP Office Action dated Oct. 1, 2021, in application No. EP17807428.2.
JP Office Action dated Oct. 12, 2021, in application No. JP2019531271 with Machine Translation.
Notice of Allowance dated Oct. 14, 2021 in U.S. Appl. No. 16/871,976.
TW Notice of Allowance dated Sep. 9, 2021, in application No. TW110106134.
U.S. Notice of Allowance dated Sep. 27, 2021 in U.S. Appl. No. 16/262,775.
AU Office Action dated Nov. 19, 2021, in Application No. AU2020250299.
CA Office Action dated Dec. 7, 2021, in Application No. CA2963096.
CN Notice of allowance dated Oct. 11, 2021, in application No. CN20158059148.5.
CN Office Action dated Nov. 8, 2021, in Application No. CN20188022572 with English translation.
CN Office Action dated Nov. 10, 2021, in Application No. CN201811232377.4 with English Translation.
CN office action dated Nov. 24, 2021, in application No. CN20178084583.
CN Office action dated Oct. 29, 2021 in CN Application No. CN201710600395.2 with English translation.
EP Search Report dated Nov. 25, 2021, in Application No. EP21171305.2.
Extended European Search Report dated Oct. 13, 2021, for EP Application No. EP21163294.8.
IN Office Action dated Dec. 17, 2021, in Application No. IN201917027304.
Notice of Allowance dated Nov. 29, 2021 in U.S. Appl. No. 16/696,887.
TW Office Action dated Oct. 26, 2021 in TW Application No. TW20170143996 with English translation.
U.S. Corrected Notice of Allowability dated Dec. 9, 2021 in U.S. Appl. No. 16/262,775.
U.S. Non-Final Office Action dated Oct. 18, 2021 in U.S. Appl. No. 16/949,493.
U.S Notice of Allowance dated Dec. 20, 2021, in U.S. Appl. No. 15/742,015.
CN Office Action dated Nov. 3, 2021, in Application No. CN20178065447 with English translation.

\* cited by examiner

INFRARED CLOUD DETECTOR SYSTEMS AND METHODS

CROSS-REFERENCES TO RELATED APPLICATIONS

This application is a national phase application under 35 U.S.C. § 371 of international PCT application PCT/US2017/055631 (designating the United States), tiled "INFRARED CLOUD DETECTOR SYSTEMS AND METHODS" and filed on Oct. 6, 2017, which claims benefit of and priority to U.S. provisional application 62/453,407, filed on Feb. 1, 2017 and titled "INFRARED CLOUD DETECTOR SYSTEMS AND METHODS; PCT/US2017/055631 is also a continuation-in-part of international PCT application PCT/US16/55709 (designating the United States), titled "MULTI-SENSOR" and filed on Oct. 6, 2016, which is a continuation-in-part of U.S. patent application Ser. No. 14/998,019, titled "MULTI-SENSOR" and filed on Oct. 6, 2015; PCT/US2017/055631 is also a continuation-in-part of U.S. patent application Ser. No. 15/287,646, titled "MULTI-SENSOR" and filed on Oct. 6, 2016, which is a continuation-in-part of U.S. patent application Ser. No. 14/998,019, titled "MULTI-SENSOR" and filed on Oct. 6, 2015; all of these applications are hereby incorporated by reference in their entireties and for all purposes.

FIELD

The present disclosure generally relates to arrangements of sensing elements for detecting cloud cover conditions, and in particular to, infrared cloud detector systems and methods of detecting cloud cover conditions thereof.

BACKGROUND

Detecting cloud cover can be an important part of making decisions about placing equipment into operation at, for example, a robotic observatory since astronomers may want to detect clouds that may interfere with their observations. Conventional methods of mapping the sky to detect cloud cover rely on expensive imaging devices that typically rely on visible light measurements.

SUMMARY

Certain aspects pertain to infrared cloud detector systems and methods of detecting cloud cover conditions thereof.

Certain aspects pertain to infrared cloud detector systems. In some aspects, an infrared cloud detector system comprises an infrared sensor configured to measure sky temperature based on infrared radiation received within its field-of-view, an ambient temperature sensor configured to measure an ambient temperature, and logic configured to determine a cloud condition based on a difference between the measured sky temperature and the measured ambient temperature.

In some aspects, an infrared cloud detector system comprises an infrared sensor configured to measure sky temperature based on infrared radiation received within its field-of-view, an ambient temperature sensor configured to measure an ambient temperature, a photosensor configured to measure intensity of visible light, and logic configured to determine a cloud condition. If a time of day is between a first time before sunrise and a second time after sunrise or between a third time before sunset and sunset, the logic is configured to determine the cloud condition based on a difference between the measured sky temperature and the measured ambient temperature. If the time of day is between the second time after sunrise and before the third time before sunset, the logic is configured to determine the cloud condition based on the measured intensity of visible light from the photosensor.

Certain aspects pertain to infrared cloud detector methods. In some aspects, an infrared cloud detector method comprises receiving a sky temperature reading from an infrared sensor and an ambient temperature reading from an ambient temperature sensor, calculating a difference between the sky temperature reading and the ambient temperature reading, and determining a cloud condition based on the calculated difference between the sky temperature reading and the ambient temperature reading.

In some aspects, an infrared cloud detector method comprises receiving a sky temperature reading from an infrared sensor, an ambient temperature reading from an ambient temperature sensor, and an intensity reading from a photosensor and determining whether a time of day is: (i) between a first time before sunrise and a second time after sunrise or between a third time before sunset and sunset; (ii) between the second time after sunrise and before a third time before sunset; (iii) after (i) and before (iii); or (iv) after (iii) and before (i). If the time of day is (i), (iii), or (iv), the cloud condition is determined based on a difference between the measured sky temperature and the measured ambient temperature. If the time of day is (iii), the cloud condition is determined based on the intensity reading received from the photosensor.

These and other features and embodiments will be described in more detail below with reference to the drawings.

DETAILED DESCRIPTION

I. Introduction

Figure 1:
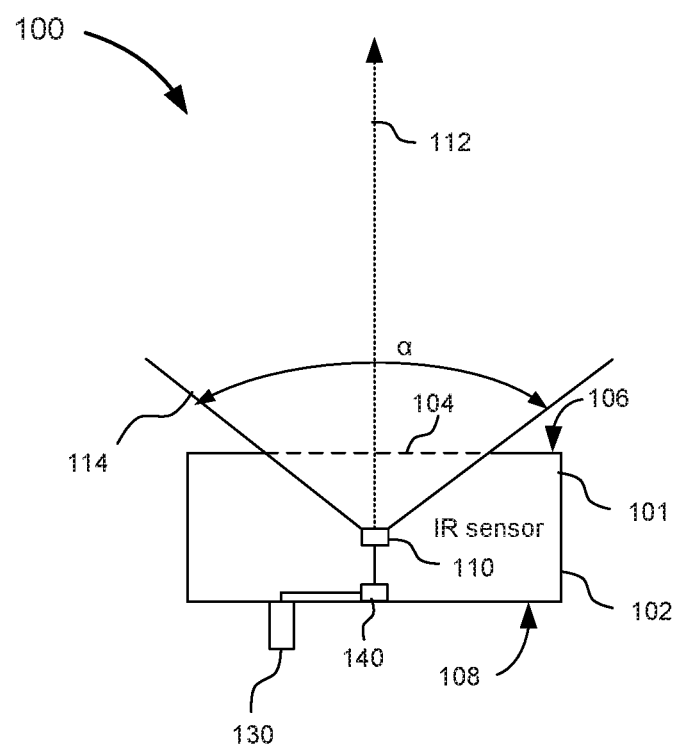
FIG. 1 shows a schematic representation of a side view of an infrared cloud detector system, according to some implementations.

At certain times of the day, the intensity of visible light is at a low level such as in the early morning around sunrise and in the evening just before sunset. A photosensor calibrated to measure the intensity of visible light (referred to herein as a "visible light photosensor" or generally as a "photosensor") does not detect direct sunlight and its intensity measurements at these times of day are not effective in determining when the sky is clear (a "clear" condition) and when the sky is cloudy (a "cloudy" condition). That is, a visible light photosensor directed toward the sky at these times would measure low intensity values both during a "clear" condition and a "cloudy" condition. Consequently, the intensity measurements taken by a visible light photosensor alone cannot be used to accurately distinguish between "cloudy" and "clear" conditions at these times. If intensity measurements from a visible light photosensor alone were used to determine a "cloudy" condition (e.g., when measured intensity levels drop below a particular minimal value) in the evening at dusk just before sunset, a false "cloudy" condition could be detected. Similarly, visible light photosensor measurements are not effective in distinguishing between "cloudy" and "clear" conditions just before sunrise when there is no direct sunlight. At any of these time periods, the photosensor measurements might be used to detect a false "cloudy" condition. A controller that relies on a false "cloudy" determination from such photosensor readings could consequently implement an inappropriate control decision based on this false "cloudy" determination. For example, if photosensor readings determine a false "cloudy" condition at a time just before sunrise, a window controller that controls tint levels in an optically switchable window (e.g., electrochromic window) facing East might inappropriately clear the window allowing direct glare from the rising sun to shine into the room.

Moreover, a controller that makes decisions based primarily on current readings from a visible light photosensor does not account for historical intensity levels in the geographic region that could bear on probable current/future cloud cover conditions, for example, to make control commands in anticipation of a condition that is likely to occur. For example, there may be a historically low light level in the morning when small clouds pass the geographic region. In this circumstance, a small cloud temporarily blocking sunlight to the photosensor would result in the same determination of a "cloudy" condition as when a large storm were rolling into the region. In this case, the passing of a small cloud could cause the controller to transition a tintable window and possibly lock an optically switchable window into an inappropriately low tint level until the window can transition to a higher (darker) tint level.

II. Infrared (IR) Cloud Detectors

Both clouds and water vapor absorb and re-emit radiation in discrete bands across the infrared (IR) spectrum. Since clouds absorb and re-emit IR radiation and a clear sky transmits IR radiation, clouds are generally warmer (have higher temperature) than clear sky. In other words, the presence of clouds generally produces an enhanced IR signal (which corresponds to an approximate black body spectrum at about ground temperature) above a signal from the clear sky. There is also the lesser effect of atmospheric humidity, which can also produce an enhanced IR signal, particularly at low elevations. Based on these distinctions, devices that measure IR radiation can be used to detect a cloud and a "cloudy" condition.

Various implementations relate to infrared cloud detectors and methods thereof that detect cloud cover based on infrared readings. The infrared cloud detectors generally include at least one infrared (IR) sensor and an ambient temperature sensor used in conjunction to take temperature readings of the sky that can be used to detect cloud cover conditions. Generally speaking, the amount of infrared radiation emitted by a medium/object and that is then measured by an IR sensor varies depending on the temperature of the medium/object, the surface and other physical characteristics of the medium/object, the field-of-view of the IR sensor, and the distance between the medium/objects and the IR sensor. The IR sensor converts IR radiation received within its field-of-view to a voltage/current and the voltage/current to corresponding temperature readings (e.g., digital temperature reading) of the medium/object within its field-of-view. For example, an IR sensor directed (oriented) to face the sky outputs temperature readings of a region of the sky within its field-of-view. The IR sensor can be oriented in a particular direction (e.g., azimuthal angle and altitude angle) to preferentially capture IR radiation in the geographical region of the sky within its field-of-view centered about that direction. The ambient temperature sensor measures the temperature of ambient air surrounding the sensor. Generally the ambient temperature sensor is located to measure the temperature of ambient air surrounding the infrared cloud detector. The infrared cloud detector further comprises a processor that determines the difference between the temperature readings taken by the IR sensor and the ambient temperature sensor and uses this difference to detect the amount of cloud cover in a region of the sky within the field-of-view of the IR sensor.

Generally, sky temperature readings taken by an ambient temperature sensor tend to fluctuate to a lesser extent with changing weather conditions than sky temperature readings taken by an infrared radiation sensor. For example, sky temperature readings taken by an infrared radiation sensor tend to fluctuate with high frequency during an "intermittent cloudy" condition in a fast moving weather pattern. Certain implementations of infrared cloud detectors have logic that determines the difference between infrared sensor temperature readings ($T_{IR}$) and ambient temperature readings ($T_A$), the delta ($\Delta$), according to Eqn. 1 to help normalize any fluctuations in the infrared sensor temperature readings ($T_{IR}$). In one example, logic determines a "cloudy" condition if the delta ($\Delta$) is determined to be above the upper threshold value (e.g., about 0 degrees Celsius), a "clear" condition if the delta ($\Delta$) is determined to be below the lower threshold value (e.g., about −5 degrees Celsius), and an "intermittent cloudy" condition if the delta ($\Delta$) is determined to be between upper and lower threshold values. In another example, the logic determines a "cloudy" condition if the delta ($\Delta$) is above a single threshold value and a "clear" condition if the delta ($\Delta$) is below the threshold value. In one aspect, the logic can apply one or more correction factors to the delta ($\Delta$) before determining whether it is above or below threshold value(s). Some examples of correction factors that may be used in implementations include humidity, sun angle/elevation, and site elevation. For example, a correction factor may be applied based on the altitude and density of the clouds being detected. Lower altitude and/or higher density clouds more closely relate to ambient temperature readings than infrared sensor readings. Higher altitude and/or less dense clouds closely relate to infrared sensor readings then to ambient temperature readings. In this example, a correction factor can be applied that weights the ambient temperature readings higher for lower altitude and/or higher density clouds or weights the infrared sensor readings higher for higher altitude and/or less dense clouds could be used. In another example, a correction factor may be applied based on humidity and/or sun position to more accurately describe cloud cover and/or remove any outliers. To illustrate the technical advantages of using the delta ($\Delta$) to determine a cloud condition is described with reference to FIGS. 2A-2C below.

Since sky temperature readings are generally independent of direct sunlight being present, temperature readings can be used by the infrared cloud detector to more accurately detect a cloud cover condition in certain instances than a visible light photosensor could detect at times when intensity of sunlight is low (e.g., just before sunrise and in the early morning just after sunrise, in the early evening before sunset). At these times, a visible light photosensor could potentially detect a false "cloudy" condition. According to these implementations, infrared cloud detectors can be used to detect cloud cover and the accuracy of their detection has no bearing on whether the sun is out or whether there are otherwise low light intensity levels such as, for example, just before sunrise or sunset. In these implementations, a relatively low sky temperature generally indicates the likelihood of a "clear" condition and a relatively high sky temperature reading generally indicates the likelihood of a "cloudy" condition (i.e. cloud cover).

In various implementations, the IR sensor of the infrared cloud detector is calibrated to measure radiant flux of long wavelength infrared radiation within a specific range. A processor of the IR sensor or a separate processor can be used to infer temperature readings from these measurements. In one aspect, the IR sensor is calibrated to detect infrared radiation in a wavelength range of between about 8 µm and about 14 µm. In another aspect, an IR sensor is calibrated to detect infrared radiation having wavelengths above about 5 µm. In another aspect, an IR sensor is calibrated to detect infrared radiation in a wavelength range of between about 9.5 µm and about 11.5 µm. In another aspect, an IR sensor is calibrated to detect infrared radiation in a wavelength range of between about 10.5 µm to 12.5 µm. In another aspect, an IR sensor is calibrated to detect infrared radiation in a wavelength range of between about 6.6 µm to 20 µm. Some examples of types of IR sensors that can be used include an infrared thermometer (e.g., a thermopile), infrared radiometer, infrared pyrgeometer, infrared pyrometer, and the like. A commercially-available example of an IR sensor is the Melexis MLX90614 made by Melexis of Detroit, Mich. Another commercially-available example of an IR sensor is the TS305-11055 Temperature Sensor made by TE connectivity Ltd. of Switzerland. Another commercially-available example of an IR sensor is the SI-111 Infrared radiometer made by Apogee Temperature Sensor made by TE connectivity Ltd. of Switzerland.

In various implementations, the infrared cloud detector has an IR sensor that is located and oriented so that its field-of-view can receive infrared radiation from a particular region of sky of interest. In one implementation, the IR sensor may be located on a roof-top of a building and oriented with its sensing surface facing vertically upward or at a small angle from vertical so that its field-of-view is of a region of the sky above or at a distance from the building.

In certain implementations, the infrared cloud detector has a protective housing and the infrared sensor is located within the housing. The housing may have a cover with one or more apertures or thinned areas that allow/restrict transmission of infrared radiation to the infrared sensor. In some cases, the cover may be formed from a plastic such as polycarbonate, polyethylene, polypropylene and/or a thermoplastic such as nylon or other polyamide, polyester or other thermoplastic, among other suitable materials. In one example, the material is a weather-resistant plastic. In other cases, the cover may be formed from a metallic material such as aluminum, cobalt or titanium, or a semi-metallic material such as alumide. In some implementations, the cover may be sloped or convex-shaped to prevent the accumulation of water. Depending on the type of material or materials used to form the cover, the cover may be 3D-printed, injection molded or formed via another suitable process or processes.

In some implementations, the cover includes one or more apertures or thinned areas to increase transmission (lessen blocking) of incident radiation or other signals to detectors within the housing. For example, the cover may include one or more apertures or thinned areas proximate infrared sensors in the housing to allow for improved transmission of incident infrared radiation to the infrared sensors. Apertures or thinned areas may also improve transmission of other signals (e.g., GPS signals) to other detecting devices within the housing. Additionally or alternatively, some or all of the cover can be formed of a light-diffusing material. In some implementations, the cover can be connected with the housing via an adhesive or with some mechanical coupling mechanism such as through the use of threads and threading or via a pressure gasket or other press-on fitting.

The field-of-view of the sensing surface of the infrared sensor is defined by its material composition and its structure. In some cases, the field-of-view of infrared sensor may be narrowed by obstructions. Some examples of obstructions include a building structure such as an overhanging or a roof-top structure, an obstruction near the building such as a tree or another building, etc. As another example, if the infrared sensor is located within a housing, structures within the housing may narrow the field-of-view.

In one aspect, a single IR sensor has a vertical unconstrained field-of-view of about 50 degrees to about 130 degree +−40 degrees off of vertical. In one aspect, an IR sensor has a field of view in a range of 50 degrees and 100 degrees. In another aspect, an IR sensor has a field of view in a range of 50 degrees and 80 degrees. In another aspect, an IR sensor has a field-of-view of about 88 degrees. In another aspect, an IR sensor has a field-of-view of about 70 degrees. In another aspect, an IR sensor has a field-of-view of about 44 degrees. The field-of-view of an IR sensor is typically defined as a conical volume. IR sensors typically have wider fields-of-view than visible light photosensors and are consequently capable of receiving radiation from larger regions of the sky. Since an IR sensor can take readings of larger regions of the sky, the IR sensor can be more useful in determining an approaching condition (e.g., incoming storm clouds) than a visible light photosensor which would be more limited to detecting a current condition affecting the immediate vicinity of the photosensor within its smaller field-of-view. In one aspect, a five-sensor obstructed IR sensor arrangement (e.g., in a multi-sensor configuration) of mounted sensors has four angularly mounted IR sensors, each constrained to a field-of-view of 20-70 degrees or 110-160 degrees, and one upward facing IR sensor constrained to a field-of-view of 70-110 degrees.

Certain IR sensors tend to be more effective in measuring sky temperature when direct sunlight is not impinging the sensing surface. In certain implementations, the infrared cloud detector has a structure that shades direct sunlight from the sensing surface of the IR sensor or has a structure that diffuses direct sunlight (e.g., enclosure of opaque plastic) before it impinges the sensing surface of IR sensor. In one implementation, an IR sensor may be shaded by an overhanging structure of the building or of the infrared cloud detector. In another implementation, an IR sensor may be located within a protective housing with a diffusing material between the sensing surface of the IR sensor and the sky to diffuse any direct sunlight from reaching the sensing surface of the IR sensor and also to provide protection from potentially harmful elements such as dirt, animals, etc. Additionally or alternatively, some implementations only use IR sensor readings taken before sunrise or after sunset to avoid the possibility of direct sunlight impinging the IR sensor. In these implementations, photosensor readings or other sensor readings may be used to detect cloud cover conditions between sunrise and sunset.

In various implementations of the infrared cloud detector has an ambient temperature sensor for measuring the temperature of the air surrounding the ambient temperature sensor. Typically, the ambient temperature sensor is located in contact with the outdoor environment (e.g. located outside of a building) to take temperature readings of the sky. The ambient temperature sensor may be, for example, a thermistor, a thermocouple, a resistance thermometer, a thermocouple, a silicon bandgap temperature sensor, etc. A commercially-available example of an ambient temperature sensor that can be used is the Pt100 thermometer probe made by Omega. Certain implementations include an ambient temperature sensor that is located to avoid direct sunlight from impinging its sensing surface. For example, the ambient temperature sensor may be located under an overhanging or mounted underneath a structure that shades the ambient temperature sensor from direct sunlight.

Although many implementations of the infrared cloud detector described herein include one IR sensor and one ambient temperature sensor, it would be understood that other implementations can include more than one IR sensor and/or more than one ambient temperature sensor. For example, in one implementation, the infrared cloud detector includes two or more IR sensors for redundancy and/or to direct IR sensors to different regions of the sky. Additionally or alternatively, the infrared cloud detector may have two or more ambient temperature sensors for redundancy in another implementation. An example of a system that uses two IR sensors directed different regions of the sky for detecting clouds can be found in international application PCT/US15/53041, filed on Sep. 29, 2015 and titled "SUNLIGHT INTENSITY OR CLOUD DETECTION WITH VARIABLE DISTANCE SENSING," which is hereby incorporated by reference in its entirety.

Various implementations of the infrared cloud detector have the basic functionality of detecting cloud cover conditions. In some cases, the infrared cloud detector can detect a "cloudy" condition and a "clear" condition. Additionally, some implementations can further differentiate a "cloudy" condition into gradations. For example, one implementation can differentiate a "cloudy" condition as either "overcast" or "intermittent clouds." In another example, an implementation can assign different levels (e.g., 1-10) of cloudiness to the "cloudy" condition. In yet another example, an implementation can determine a future cloud condition. Additionally or alternatively, some implementations can also detect other weather conditions.

In various implementations, the infrared cloud detector comprises an IR sensor configured to take temperature readings, $T_{IR}$, and an ambient temperature sensor configured to take ambient temperature readings, $T_A$. The infrared cloud detector also includes one or more processors containing program instructions that can be executing to perform various functions of the infrared cloud detector. The processor(s) executes program instructions to determine the temperature difference, delta ($\Delta$) between the temperature readings as provided in Eqn. 1. The processor(s) also executes program instructions to determine the cloud cover condition based on the delta ($\Delta$). As mentioned above, using the ambient temperature readings can help normalize any rapid fluctuations in the IR sensor temperature readings in some circumstances.

$$\text{Delta } (\Delta) = \text{Infrared Sensor Temperature Reading} \\ (T_{IR}) - \text{Ambient Temperature Reading } (T_A) \quad \text{(Eqn. 1)}$$

In one implementation, the processor(s) executes program instructions to compare the delta ($\Delta$) to an upper threshold value and a lower threshold value and determine a cloud cover condition. If the delta ($\Delta$) is above the upper threshold value, a "clear" condition is determined. If the delta ($\Delta$) is below the lower threshold value, a "cloudy" condition is determined. If the delta ($\Delta$) is below the upper threshold value and above the lower threshold value (i.e. between threshold values), an "intermittent" cloud cover condition is determined. Additionally or alternatively, additional factors may be used to determine a cloud cover condition when the delta ($\Delta$) is between threshold values. This implementation works well in the morning around dawn and in the evening around dusk to accurately determine a "cloudy" condition or a "clear" condition. Between sunrise and sunset, additional factors may be used to determine cloud cover condition such as, for example, by using visible photosensor values. Some examples of additional factors include: elevation, wind speed/direction, and sun elevation/angle.

A. Infrared (IR) Cloud Detection Sensor Systems

FIG. 1 shows a schematic representation of a side view of system with an infrared cloud detector 100, according to some implementations. The infrared cloud detector 100 comprises a housing 101 with a cover 102 having an aperture or thinned portion 104 at a first surface 106 of the housing 101. The housing 101 also has a second surface 108 opposing the first surface 106. The infrared cloud detector 100 further comprises an IR sensor 110 configured to take temperature readings, $T_{IR}$, based on infrared radiation received within its conical field-of-view 114, an ambient temperature sensor 130 for taking ambient temperature readings, $T_A$, and a processor 140 in communication (wired or wirelessly) with the IR sensor 110 and the ambient temperature sensor 130. In one aspect, the IR sensor is one of an infrared thermometer (e.g., a thermopile), infrared radiometer, infrared pyrgeometer, and infrared pyrometer. In one aspect, the ambient temperature sensor is one of a thermistor, a thermometer, and a thermocouple.

In FIG. 1, the IR sensor 110 is located behind the aperture or thinned portion 104 and within the enclosure of the housing 101. The aperture or thinned portion 104 enables the IR sensor 110 to measure infrared radiation transmitted through the aperture or thinned portion 104 and received at its sensing surface. The IR sensor 110 includes an imaginary axis 112 that is orthogonal to the sensing surface of the IR sensor 110 and passes through the center of the IR sensor 110. In the illustrated example, the IR sensor 110 is oriented so that its axis 112 is in a vertical orientation and the sensing surface is facing upward. In other examples, the IR sensor 110 can be directed so that the sensing surface is facing in another orientation to direct the IR sensor, for example, to a particular region of the sky. The IR sensor 110 has a conical field-of-view 114 through the aperture or thinned portion 104 to outside of the housing 102. In this example, the portions of the cover 102 around the aperture or thinned portion 104 are made of a material that blocks infrared radiation and the perimeter of the aperture or thinned portion 104 defines the field-of-view 114. The field-of-view 114 has an angle, $\alpha$, and is centered about the axis 112. In FIG. 1, the ambient temperature sensor 130 is located and affixed to the second surface 108 of the housing 102 away from the edge to avoid direct sunlight from impinging the ambient temperature sensor 130 when the infrared cloud detector 100 is in this orientation. Although not shown, the infrared cloud detector 100 also includes one or more structures that hold the infrared sensor 110 and other components in place within the housing 101.

The infrared cloud detector 100 further comprises logic that calculates a delta ($\Delta$) between infrared sensor sky temperature readings ($T_{IR}$) and the ambient temperature readings ($T_A$) at each reading time and determine a cloud cover condition based on the calculated delta ($\Delta$). During operation, the IR sensor 110 takes temperature readings, $T_{IR}$, based on infrared radiation received form the region of sky within its field-of-view 114 and the ambient temperature sensor 130 takes ambient temperature readings, $T_A$, of the ambient air surrounding the infrared cloud detector 100. The processor 140 receives signals with temperature readings, $T_{IR}$, from the IR sensor 110 and signals with ambient temperature readings, $T_A$, from the ambient temperature sensor 130. The processor 140 executes instructions stored in memory (not shown) that uses the logic to calculate a delta ($\Delta$) between infrared sensor temperature readings ($T_{IR}$) and the ambient temperature readings ($T_A$) at particular time to determine the cloud cover condition. For example, the processor 140 may execute instructions that determines a "cloudy" condition if the delta ($\Delta$) at that time is above the upper threshold value, determines a condition "clear" if the delta ($\Delta$) is below the lower threshold value, and determines an "intermittent cloudy" condition if is determined that the delta ($\Delta$) is between the upper threshold value and the lower threshold value. The processor 140 may also execute instructions stored in memory to perform other operations of methods described herein.

Although a single infrared sensor 110 is illustrated in FIG. 1, two or more infrared sensors can be used, in another implementation, for redundancy in case one malfunctions and/or is obscured by, for example, bird droppings or another environmental agent. In one implementation, two or more infrared sensors are used to face different orientations to capture IR radiation from different fields-of-view and/or at different distances from the building/structure. If two or more IR sensors are located within a housing of an infrared cloud detector 100, the IR sensors are typically offset from one another by a distance sufficient to reduce the likelihood that an obscuring agent would affect all the IR sensors. For example, IR sensors may be separated by at least about one inch or at least about two inches.

B. Comparison of Infrared Sensor Temperature Readings, Ambient Temperature Readings, and Delta Values During a Clear Day and a Day with Afternoon Clouds As discussed above, sky temperature readings taken by an ambient temperature sensor tend to fluctuate to a lesser extent than sky temperature readings taken by an infrared radiation sensor. Certain implementations of infrared cloud detectors have logic that determines the difference between infrared sensor temperature readings ($T_{IR}$) and ambient temperature readings ($T_A$), the delta ($\Delta$), according to Eqn. 1 to help normalize any fluctuations in the infrared sensor temperature readings ($T_{IR}$). By way of comparison, FIGS. 2A-2C include graphs of examples of temperature readings, $T_{IR}$, taken by an infrared sensor of an infrared cloud detector according to an implementation, temperature readings, $T_A$, taken by an ambient temperature sensor of the infrared cloud detector, and the delta ($\Delta$) between these readings. Each graph includes two plots: a plot of readings taken during a clear day and a plot of readings taken during a day with afternoon clouds. The infrared cloud detector used in this example includes components that are similar to those described with respect to the infrared cloud detector 100 shown in FIG. 1. In this case, the infrared cloud detector is located on the rooftop of a building and the infrared sensor is oriented to face vertically upward. The infrared sensor is calibrated to measure infrared radiation in the wavelength range from about 8 µm to about 14 µm. To avoid direct sunlight from impinging the infrared sensor, the infrared sensor is located behind a cover formed of a light diffusing material such as a plastic e.g., polycarbonate, polyethylene, polypropylene and/or a thermoplastic such as nylon or other polyamide, polyester or other thermoplastic, among other suitable materials. In this example, the infrared cloud detector also comprises logic that can be used to calculate the difference, delta ($\Delta$), between the temperature readings, $T_{IR}$, taken by the IR sensor and the ambient temperature readings, $T_A$, taken by the ambient temperature sensor of the infrared cloud detector. The logic can also be used to determine a "cloudy" condition if the delta ($\Delta$) is at or above the upper threshold value, a "clear" condition if the delta ($\Delta$) is at or below the lower threshold value, and an "intermittent cloudy" condition if is determined that the delta ($\Delta$) is between the upper and lower threshold values.

Figure 2A:
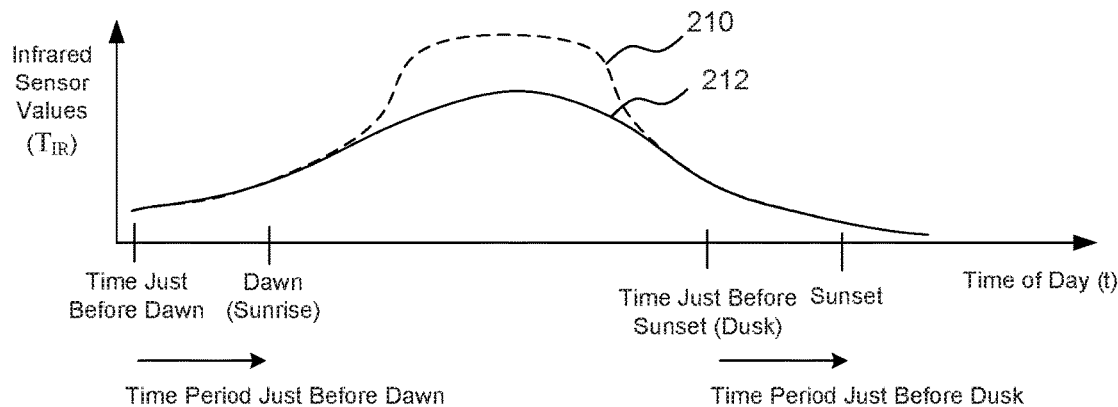
FIG. 2A shows a graph with two plots of temperature readings taken over time by an infrared sensor of the infrared cloud detector, according to this implementation.

FIG. 2A shows a graph with two plots of temperature readings, $T_{IR}$, taken over time by an infrared sensor of the infrared cloud detector, according to this implementation. Each of the two plots is of temperature readings, $T_{IR}$, taken by the infrared sensor over a time period of a day. The first plot 110 is of temperature readings, $T_{IR}$, taken by the infrared sensor during a first day with clouds in the afternoon. The second plot 112 is of temperature readings, $T_{IR}$, taken by the infrared sensor during a second day that is clear all day. As shown, the temperature readings, $T_{IR}$, of the first plot 110 taken during the afternoon of the first day with afternoon cloudiness are generally higher than the temperature readings, $T_{IR}$, of the second plot 112 taken during the second that is clear all day.

Figure 2B:
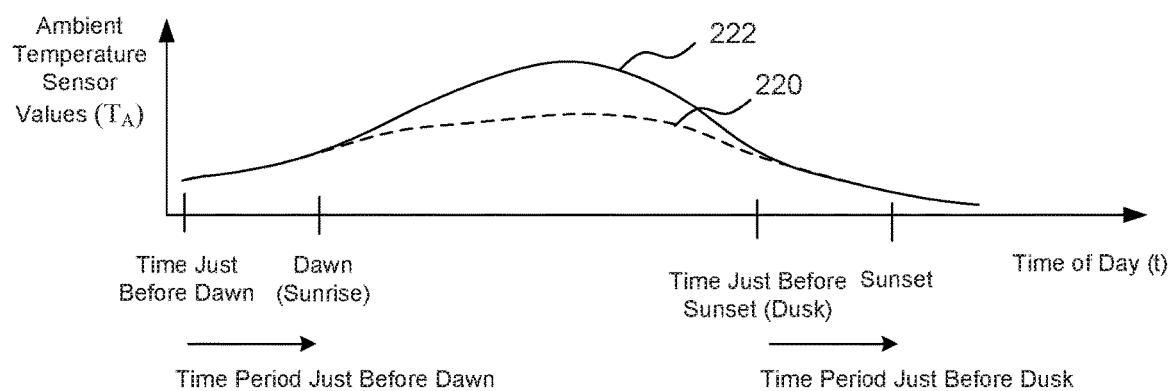
FIG. 2B shows a graph having two plots of ambient temperature readings taken over time by the ambient temperature sensor of the infrared cloud detector discussed with respect to FIG. 2A.

FIG. 2B shows a graph having two plots of ambient temperature readings, $T_A$, taken over time by the ambient temperature sensor of the infrared cloud detector discussed with respect to FIG. 2A. Each of the two plots is of temperature readings, $T_A$, taken by the ambient temperature sensor over a time period of a day. To avoid direct sunlight from impinging the ambient temperature sensor, it is shaded from direct sunlight. The first plot 220 is of temperature readings taken by the ambient temperature sensor during the first day with clouds in the afternoon. The second plot 222 is of temperature readings taken by the infrared sensor during a second day that is clear all day. As shown, the ambient temperature readings, $T_A$, of the first plot 220 taken during the first day with clouds in the afternoon are at lower levels than the temperature readings, $T_A$, of the second plot 222 taken during the second day that is clear all day.

Figure 2C:
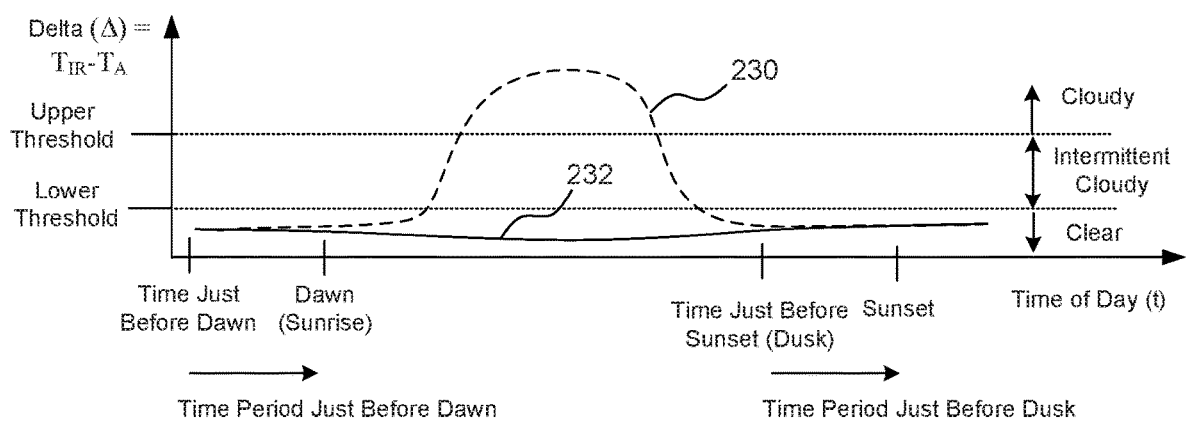
FIG. 2C shows a graph having two plots of the calculated delta between the temperature readings taken by the infrared sensor and the ambient temperature readings taken by the ambient temperature sensor of the infrared cloud detector discussed with respect to FIGS. 2A and 2B.

FIG. 2C shows a graph having two plots of the calculated delta ($\Delta$) between the temperature readings, $T_{IR}$, taken by the IR sensor and the ambient temperature readings, $T_A$, taken by the ambient temperature sensor of the infrared cloud detector discussed with respect to FIGS. 2A and 2B. Each of the two plots is of the calculated delta ($\Delta$) over a time period of a day. The first plot 230 is the calculated delta ($\Delta$) of the readings taken during the first day with clouds in the afternoon. The second plot 232 is the calculated delta ($\Delta$) taken during the second day that is clear all day. The graph also includes an upper threshold value and a lower threshold value.

In FIG. 2C, the values of delta ($\Delta$) of the second plot 232 during a time interval from just before sunrise until just after sunrise and during a time interval from just before sunset until sunset are below the lower threshold value. Using the calculated delta ($\Delta$) values shown in the plots in FIG. 2C, the logic of the infrared cloud detector would determine a "clear" condition during this time interval. Also, since the values of delta ($\Delta$) of the second plot 232 are below the lower threshold value at most other times of the day, the logic of the infrared cloud detector would determine a "clear" condition for the other times as well.

In FIG. 2C, the values of delta ($\Delta$) of the first plot 230 are above the upper threshold value for most of the afternoon and the infrared cloud detector would determine a "cloudy" condition during the afternoon. The values of delta ($\Delta$) of the first plot 230 are below the lower threshold value during a time interval just before sunrise until just after sunrise and during a time interval from just before sunset until sunset. Based on these calculated delta ($\Delta$) values, the logic of the infrared cloud detector would determine a "clear" condition during this time interval. The values of delta ($\Delta$) of the first plot 230 are between the lower and upper threshold values during a brief period of time in transition in early and late afternoon. Based on these calculated delta ($\Delta$) values, the logic of the infrared cloud detector would determine an "intermittent cloudy" condition.

C. Infrared Cloud Detector Systems with Optional Photosensor(s)

In certain implementations, infrared cloud detector systems include an optional visible light photosensor (e.g., a photodiode) for measuring intensity of visible light radiation during operation. These systems generally comprise an infrared sensor, an ambient temperature sensor, a visible light photosensor, and logic for determining a cloud cover condition based on readings taken by one or more of the infrared sensor, the ambient temperature sensor, and the visible light photosensor. In some cases, the infrared sensor is calibrated to measure wavelengths in the 8-14 µm spectrum. In some cases, the photosensor is calibrated to detect intensity of visible light (e.g., between about 390 nm and about 700 nm) within a photopic range. The photosensor may be located in/on the same housing as the infrared sensor and the ambient temperature sensor or may be located separately. In some cases, the logic determines the cloud cover condition based on a calculated delta ($\Delta$) value between the infrared sensor temperature readings, $T_{IR}$, and the ambient temperature readings, $T_A$, when the confidence level of the infrared sensor is high and/or the confidence level of the photosensor is low. The logic determines the cloud cover condition based on photosensor readings when the confidence level of the infrared sensor is low and/or the confidence level of the photosensor is high.

In various implementations, an infrared cloud detector system includes logic for determining a cloud cover condition using, as input, the time of day, day of year, temperature readings, $T_{IR}$, from the infrared sensor, ambient temperature readings, $T_A$, from the ambient temperature sensor, and light intensity readings from the photosensor, the oscillation frequency of the visible light intensity readings from the photosensor, and the oscillation frequency of the temperature readings, $T_{IR}$, from the infrared sensor. In some cases, the logic determines the oscillation frequency from the visible light intensity readings and/or the oscillation frequency from the temperature readings, $T_{IR}$. The logic determines whether the time of day is during one of the following four time periods: (i) a time period shortly before sunrise and up to slightly after sunrise; (ii) daytime defined as after (i) and before (iii); (iii) a time period shortly before sunset (dusk) and up until sunset; or (iv) nighttime defined as after (iii) and before (i). In one case, the time of sunrise can be determined from measurements taken by the visible wavelength photosensor. For example, the time period (i) may end at the point where a visible light wavelength photosensor begins to measure direct sunlight i.e. an intensity reading of the visible light photosensor is at or above a minimum intensity value. In addition or alternatively, the time period (iii) may be determined to end at the point where the intensity reading from a visible light wavelength photosensor is at or below a minimum intensity value. In another example, the time of sunrise and/or the time of sunset may be calculated using a solar calculator based on the day of the year and the time periods (i) and (iii) can be calculated by a defined period of time (e.g., 45 minutes) before and after the calculated times of sunrise/sunset. If the time of day is within (i) or (iii) time periods, the confidence level of the photosensor readings tends to be low and the infrared sensor readings high. In this situation, the logic determines the cloud cover condition based on a calculated delta ($\Delta$) with or without correction factors. For example, the logic may determine a "cloudy" condition if the delta ($\Delta$) is above the upper threshold value, a "clear" condition if the delta ($\Delta$) is below the lower threshold value, and an "intermittent cloudy" condition if the delta ($\Delta$) is between upper and lower threshold values. As another example, the logic may determine a "cloudy" condition if the delta ($\Delta$) is above a single threshold value and a "clear" condition if the delta ($\Delta$) is below the threshold value. If the time of day is during (ii) daytime, the confidence level of the photosensor readings is at a high level and the confidence level of the infrared sensor readings tends to be low. In this case, the logic may use the photosensor readings to determine the cloud cover condition as long as a calculated difference between the infrared readings and the photosensor readings stays at or below an acceptable value. For example, the logic may determine a "clear" condition if the photosensor reading is above a certain intensity level and determine a "cloudy" condition if the photosensor reading is at or below the intensity level. If the calculated difference between the infrared readings and the photosensor readings increases above the acceptable value, the confidence of the infrared readings is increased and the logic determines the cloud cover condition based on the delta ($\Delta$) as described above. Alternatively or additionally, if the photosensor readings are determined to be oscillating at a frequency greater than a first defined level, the confidence level of the infrared readings is increased and the logic determines the cloud cover condition based on the delta ($\Delta$). If the infrared readings are determined to be oscillating at a frequency greater than a second defined level, the confidence level of the photosensor readings is increased and the logic determines the cloud cover condition based on the photosensor readings. If the time of day is during (iv) nighttime, the logic may determine the cloud cover condition based on the delta ($\Delta$) as described above.

Figure 3:
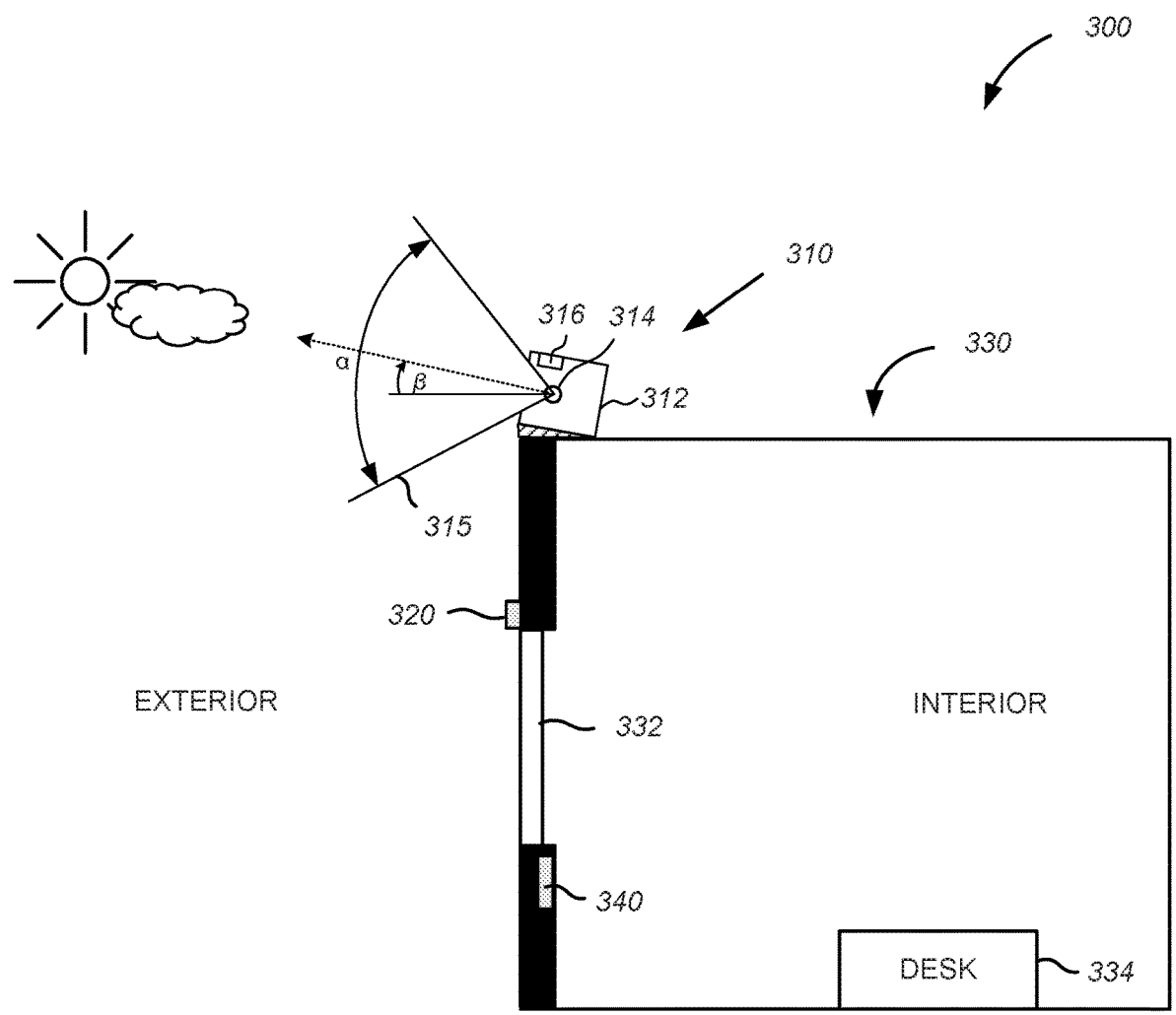
FIG. 3 depicts a schematic (side view) diagram of an infrared cloud detector system comprising an infrared cloud detector and a photosensor, according to an implementation.

FIG. 3 depicts a schematic (side view) diagram of an infrared cloud detector system 300 comprising an infrared cloud detector 310 and a photosensor 320, according to an implementation. The infrared cloud detector 310 comprises a housing 312, an infrared sensor 314 within the enclosure of the housing 312, and an ambient temperature sensor 316 also within the enclosure of the housing 312. The infrared sensor 314 is configured to take temperature readings, $T_{IR}$, based on infrared radiation received form the region of sky within its conical field-of-view 315. The ambient temperature sensor 316 is configured to take ambient temperature readings, $T_A$, of the ambient air surrounding the infrared cloud detector 310. In one aspect, the IR sensor is one of an infrared thermometer (e.g., a thermopile), infrared radiometer, infrared pyrgeometer, and infrared pyrometer. In one aspect, the ambient temperature sensor is one of a thermistor, a thermometer, and a thermocouple.

The infrared cloud detector 310 is located on the roof of a building having a room 330 with a tintable window 332 (e.g., electrochromic window with at least one electrochromic device) and the photosensor 320 is located on an exterior surface of the building. The tintable window 332 is located between the exterior and the interior of the building, which includes the room 330. FIG. 5 also shows a desk 334 in the room 330. Although the photosensor 320 is located separately from the infrared cloud detector 310 in this example, in other implementations, the photosensor 320 is located in the enclosure of the housing or on the outside of the housing 312.

The infrared sensor 314 includes an imaginary axis that is perpendicular to the sensing surface of the infrared sensor 314 and passes through its center. The infrared cloud detector 310 is supported by a wedge-shaped structure that orients the infrared cloud detector 310 such that its axis is directed at an angle of inclination, $\beta$, from a horizontal plane. Other components can be used to support the infrared cloud detector 310 in other implementations. The infrared sensor 314 is directed so that the sensing surface faces the sky and can receive infrared radiation from a region of the sky within its field-of-view 315. The ambient temperature sensor 130 is located within the enclosure of the housing 312 away from the edge and shaded by an overhanging portion of the housing 312 avoid direct sunlight from impinging the sensing surface of the ambient temperature sensor 130. Although not shown, the infrared cloud detector 310 also includes one or more structures that hold its components within the housing 312.

In FIG. 3, the infrared cloud detector system 300 also includes a controller 340 with a processor that can execute instructions stored in memory (not shown) for using the logic of the infrared cloud detector system 300. The controller 340 is in communication with (wirelessly or wired) the infrared sensor 314 and the ambient temperature sensor 316 to receive signals with temperature readings. The controller 340 is also in communication with (wirelessly or wired) the photosensor 320 to receive signals with visible light intensity readings.

In some implementations, power/communication lines can extend from the building or another structure to the infrared cloud detector 310. In one implementation, the infrared cloud detector 310 includes a network interface that can couple the infrared cloud detector 310 to a suitable cable. The infrared cloud detector 310 can communicated data through the network interface to the controller 340 or another controller (e.g., network controller and/or master controller) of the building. In some other implementations, the infrared cloud detector 310 can additionally or alternatively include a wireless network interface enabling wireless communication with one or more external controllers.

In some implementations, the infrared cloud detector 310 or other examples of infrared cloud detectors can also include a battery within or coupled with its housing to power the sensors and electrical components within. The battery can provide such power in lieu of or in addition to the power from a power supply (for example, from a building power supply). In one implementation, an infrared cloud detector further includes at least one photovoltaic cell, for example, on an outer surface of the housing. This at least one photovoltaic cell can provide power in lieu of or in addition to the power provided by any other power supply.

The infrared cloud detector system 300 further comprises logic for determining the cloud cover condition that uses, as input, the time of day, day of year, temperature readings, $T_{IR}$, from the infrared sensor 314, ambient temperature readings, $T_A$, from the ambient temperature sensor 316, and light intensity readings from the photosensor 320, the oscillation frequency of the visible light intensity readings from the photosensor 320, and the oscillation frequency of the temperature readings, $T_{IR}$, from the infrared sensor 314. During operation, the infrared sensor 314 takes temperature readings, $T_{IR}$, based on infrared radiation received from the region of sky within its field-of-view 315, the ambient temperature sensor 316 takes ambient temperature readings, $T_A$, of the ambient air surrounding the infrared cloud detector 310, and the photosensor 320 takes intensity readings of visible light received at its sensing surface. The processor of the controller 340 receives signals with temperature readings, $T_{IR}$, from the infrared sensor 314, signals with ambient temperature readings, $T_A$, from the ambient temperature sensor 316, and signals with intensity readings from the photosensor 320. The processor executes instructions stored in memory for using the logic to determine the cloud cover condition based on the various inputs. An example of such logic is described above and also with reference to FIG. 9. In one implementation, the controller 340 is also be in communication with and configured to control one or more building components. For example, the controller 340 may be in communication with and configured to control the tint level of the tintable window 332. In this implementation, the infrared cloud detector system 300 further comprises logic for determining control decisions for the one or more building components e.g., the tintable window 332, based on the determined cloud cover condition. An example of logic for determining control decisions based on a determined cloud cover condition is described in more detail with respect to FIG. 10.

Although a single infrared sensor 314, ambient temperature sensor 316, and photosensor 320 are illustrated in FIG. 3, it would be understood that the disclosure is not so limiting and that additional components can be used, in another implementation. For example, multiple components can be used for redundancy in case one malfunctions and/or is obscured or otherwise prevented from functioning. In another example, two or more components may be used at different locations or at different orientations to capture different information. In one implementation, two or more infrared sensors are used to face different orientations to capture infrared radiation from different fields-of-view and/or at different distances from the building/structure. In cases with multiple sensors, an average or mean value of the values from the multiple sensors may be used to determine the cloud cover condition. If two or more IR sensors are located within a housing of an infrared cloud detector 310, the IR sensors are typically offset from one another by a distance sufficient to reduce the likelihood that an obscuring agent would affect all the IR sensors. For example, IR sensors may be separated by at least about one inch or at least about two inches.

Another example of an infrared cloud detector system is described with respect to FIGS. 11A-C in Section III below.

Multi-Sensor Implementations

In certain implementations, an infrared cloud detector system includes an infrared cloud detector with a visible light photosensor in the form of a multi-sensor device with various other optional sensors and electrical components within or on its housing. Details of different examples of multi-sensor devices are described in U.S. patent application Ser. No. 14/998,019, filed on Oct. 6, 2016 and titled "MULTI-SENSOR," which is hereby incorporated by reference in its entirety. Multi-sensor devices of these implementations are configured to be located in an environment exterior to a building in order to expose sensors to the outside environment. In some of these implementations with multi-sensor devices, power/communication lines extend from the building to the multi-sensor device. In one such case, the multi-sensor device includes a network interface that can couple the multi-sensor device to a suitable cable. The multi-sensor device can communicate data through the network interface to a local controller or controllers, a network controller, and/or a master controller of the building. In other implementations, the multi-sensor device can additionally or alternatively include a wireless network interface enabling wireless communication with one or more external controllers. In some implementations, the multi-sensor device may also include a battery within or coupled with its housing to power the sensors and electrical components within. The battery can provide such power in lieu of or in addition to the power from a power supply (for example, from a building power supply). In some implementations, the multi-sensor device further includes at least one photovoltaic cell, for example, on a surface of its housing.

Figure 4A:
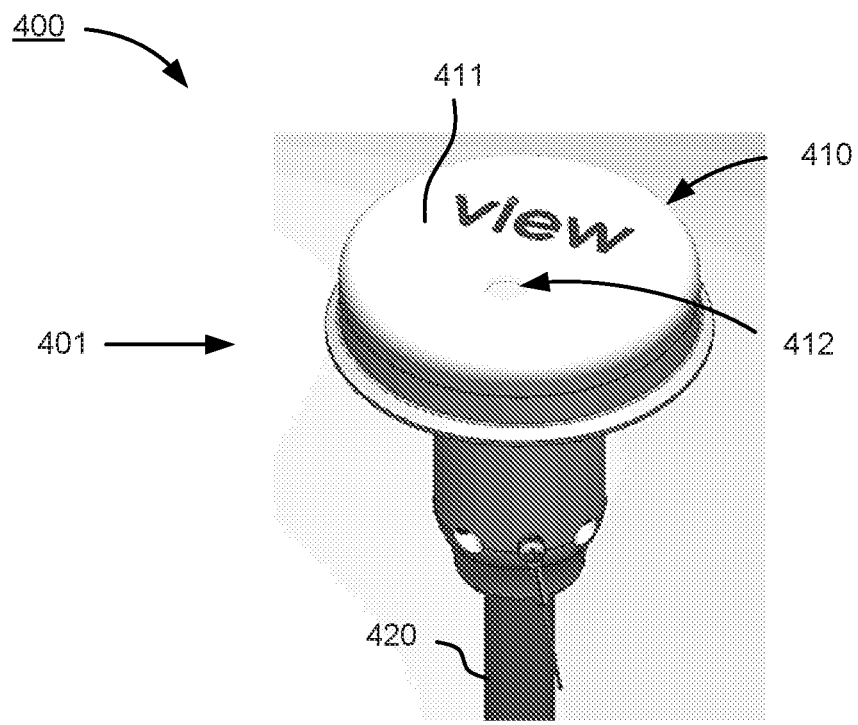
FIG. 4A shows a perspective view of a diagrammatic representation of an infrared cloud detector system comprising an infrared cloud detector in the form of a multi-sensor, according to an implementation.
Figure 4B:
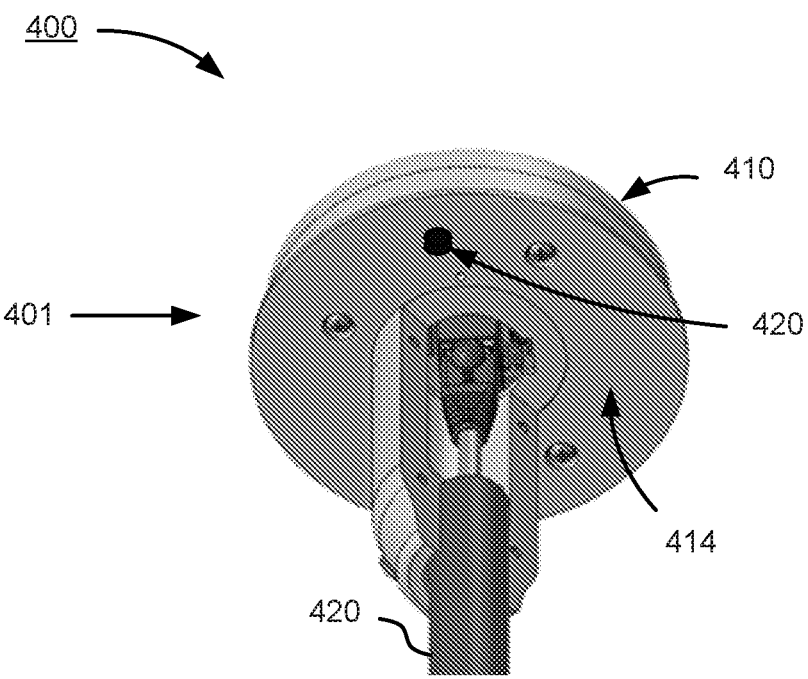
FIG. 4B shows another perspective view of the infrared cloud detector system comprising the infrared cloud detector in the form of the multi-sensor shown in FIG. 4A.
Figure 4C:
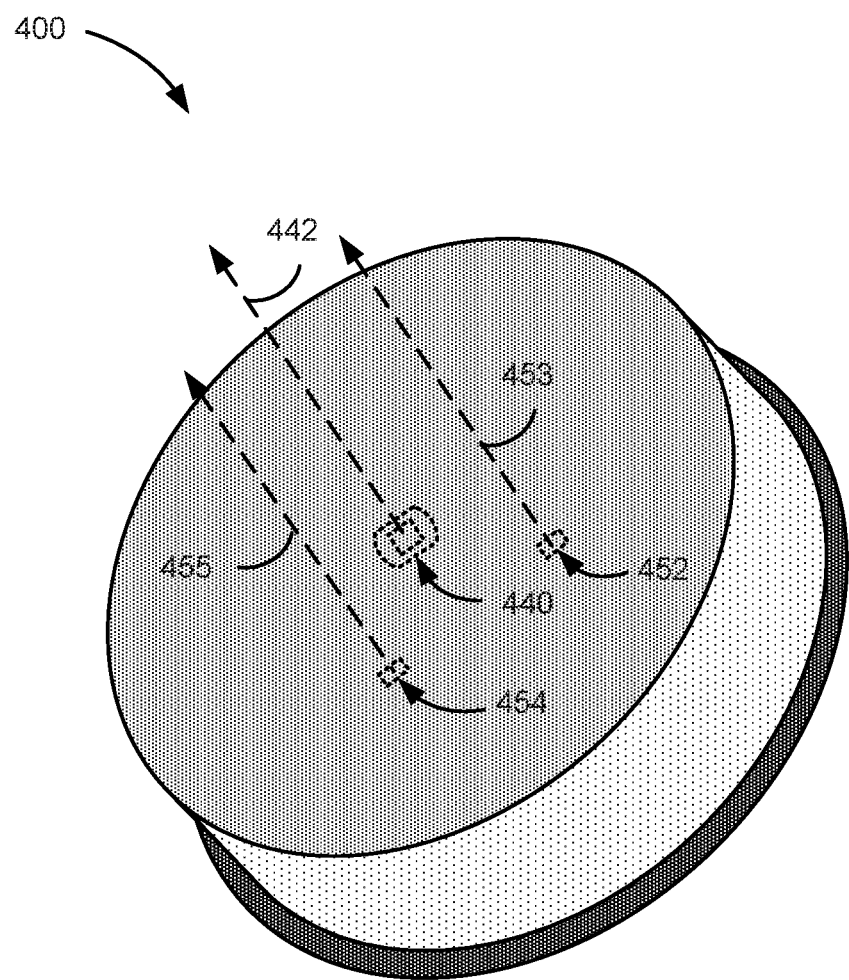
FIG. 4C shows a perspective view of some of the inner components of the multi-sensor device of the infrared cloud detector system shown in FIGS. 4A and 4B.

FIGS. 4A, 4B, and 4C show perspective views of a diagrammatic representation of an infrared cloud detector system 400 comprising an infrared cloud detector in the form of a multi-sensor device 401, according to one such implementation. FIGS. 4A and 4B show that the multi-sensor device 401 comprises a housing 410 coupled to a mast 420. The mast 420 can function as a mounting assembly including a first end portion for coupling to a base portion 414 of the housing 410 and a second end portion for mounting to the building. In one example, the base portion 414 is fixedly attached or coupled to or with the first end portion of the mast 420 via mechanical threading or via a rubber gasket press-on. The mast 420 also can include a second end portion that can include a mounting or attachment mechanism for mounting or attaching the mast 420 to a roof top of the building (e.g., on roof of building with room 330 shown in FIG. 3) such as, for example, to a surface of the roof, a wall on the roof, or to another structure on the roof. The housing includes a cover 411 that is formed of a light-diffusing material. The cover 411 also includes a thinned portion 412.

FIG. 4B also shows that the infrared cloud detector system 400 includes an ambient temperature sensor 420 located on the bottom surface of the base portion 414 of the multi-sensor device 401. The ambient temperature sensor 420 is configured to measure ambient temperature of the external environment during operation. The ambient temperature sensor 420 is located on the bottom surface to be shaded from direct solar radiation when infrared cloud detector system 400 is located in an outdoor environment with the upper surface facing upward. The temperature sensor 420 may be, for example, a thermistor, a thermocouple, a resistance thermometer, a silicon bandgap temperature sensor, etc.

FIG. 4C shows a perspective view of some of the inner components of the multi-sensor device 401 of the infrared cloud detector system 400 shown in FIGS. 4A and 4B. As shown, the infrared cloud detector system 400 further includes a visible light sensor 440, a first infrared sensor 452 and a second infrared sensor 454. The first infrared sensor 452 and second infrared sensor 454 are located on an upper portion of the multi-sensor device 401 and positioned behind the cover 411 (shown in FIGS. 4A and 4B) formed of the light-diffusing material.

As shown in FIG. 4C, the first infrared sensor 452 has a first axis of orientation 453 that is perpendicular to its sensing surface. The second infrared sensor 454 has a second axis of orientation 455 that is perpendicular to its sensing surface. In the illustrated example, the first and second infrared sensors 452, 454 are positioned so that their axis of orientation 453, 455 face outward from the top portion of the housing 410 (shown in FIGS. 4A and 4B) in order to be able to take temperature readings during operation that are based on infrared radiation captured from above the multi-sensor device 401. The first infrared sensor 452 is separated from the second infrared sensor 454 by at least about one inch. During operation, the first and second infrared sensors 452, 454 detect infrared radiation that is radiated from any objects or medium within their field-of-view. The field-of-view is based on the physical and material properties of the first and second infrared sensors 452, 454. Based on their physical and material properties alone, some examples of infrared sensors have a field-of-view that ranges from about 50 degrees to about 80 degrees. In one particular example, an infrared sensor has a field-of-view of about 70.

The photosensor 440 has an axis of orientation 442 that is perpendicular to its sensing surface. The photosensor 440 is positioned behind the thinned portion 412 of the housing 410 as shown in FIG. 4A. The thinned portion 412 allows the photosensor 440 to receive visible light radiation through the thinned portion 412. During operation, the photosensor 440 measures the intensity of visible light received through the thinned portion 412.

In one implementation, the infrared cloud detector system 400 also includes an external controller with a processor that can execute instructions stored in memory (not shown) for using the logic of the infrared cloud detector system 400. In this implementation, the infrared cloud detector system 400 further includes logic for determining a cloud cover condition using as input the time of day, day of year, temperature readings, $T_{IR}$, from one of both of the infrared sensors 452, 454, ambient temperature readings, $T_A$, from the ambient temperature sensor 420, and light intensity readings from the photosensor 440, the oscillation frequency of the visible light intensity readings from the photosensor 440, and the oscillation frequency of the temperature readings, $T_{IR}$, from the infrared sensors 452, 454. Examples of such logic are described herein, for example, with respect to FIGS. 8-10.

The external controller is in communication with (wirelessly or wired) the infrared sensors 452, 454 and the ambient temperature sensor 420 to receive signals with temperature readings. The controller is also in communication with (wirelessly or wired) the photosensor 440 to receive signals with visible light intensity readings. In some implementations, power/communication lines can extend from the building or another structure to the infrared cloud detector system 400. In one implementation, the infrared cloud detector system 400 includes a network interface that can couple to a suitable cable. The infrared cloud detector system 400 can communicated data through the network interface to the external controller or another controller of the building. In some other implementations, the infrared cloud detector system 400 can additionally or alternatively include a wireless network interface enabling wireless communication with one or more external controllers. In some implementations, the infrared cloud detector system 400 can also include a battery within or coupled with the housing to power the sensors and electrical components within. The battery can provide such power in lieu of or in addition to the power from a power supply (for example, from a building power supply). In some implementations, the infrared cloud detector system 400 further includes at least one photovoltaic cell, for example, on a surface of the housing.

D. Comparison of Intensity Readings from a Photosensor with Delta Values During Different Cloud Cover Conditions As discussed above, infrared sensors can be more accurate than a visible light photosensor in detecting a "clear" condition in the early morning and evening. Direct sun light and other conditions can cause, however, some noise that results in oscillations in the infrared sensor readings. If the frequency of these oscillations is low, the infrared sensor readings can be used to make a high confidence assessment of the cloud cover condition. Also, certain conditions (e.g., fast moving clouds) may cause oscillations in the photosensor readings. If the frequency of oscillation is low, the photosensor readings can be used to make a high confidence assessment of the cloud cover condition during the daytime. In certain implementations, logic may determine whether the oscillations of the infrared sensor readings are of high frequency and/or the whether the oscillations of the photosensor readings are of high frequency. If it is determined that the oscillations of the infrared sensor readings are of high frequency, the logic uses the photosensor readings to determine the cloud cover condition. If it is determined that the oscillations of the photosensor readings are of high frequency, the logic uses the difference between the infrared sensor readings and the ambient temperature sensor readings to determine the cloud cover condition. To illustrate technical advantages of this logic selecting the type of sensor reading to use depending on the oscillations, FIGS. 5A, 5B, 6A, 6B, 7A, and 7B include graphs of plots of intensity readings, I, taken by a visible light photosensor for comparison with the difference, delta ($\Delta$), between temperature readings, $T_{IR}$, taken by an infrared sensor and temperature readings, $T_A$, taken by an ambient temperature sensor during different cloud cover conditions. The visible light photosensor, infrared sensor, and ambient temperature sensor are similar to those described with respect to components of the infrared cloud detector 310 shown in FIG. 3. Each of the plots is of readings taken during the time period of a day.

Figure 5A:
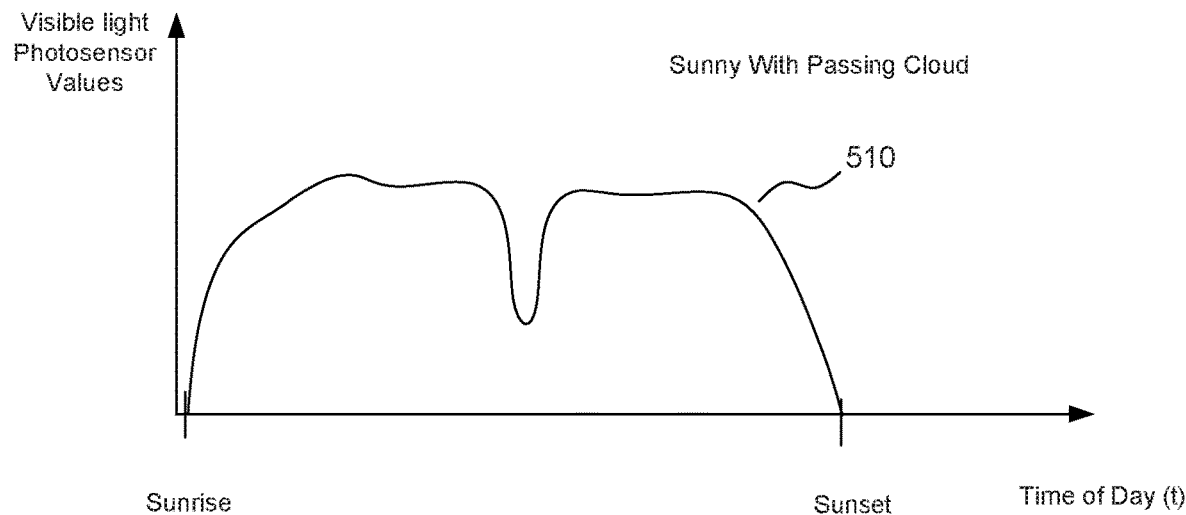
FIG. 5A is a graph with a plot of intensity readings taken by the visible light photosensor over time.
Figure 5B:
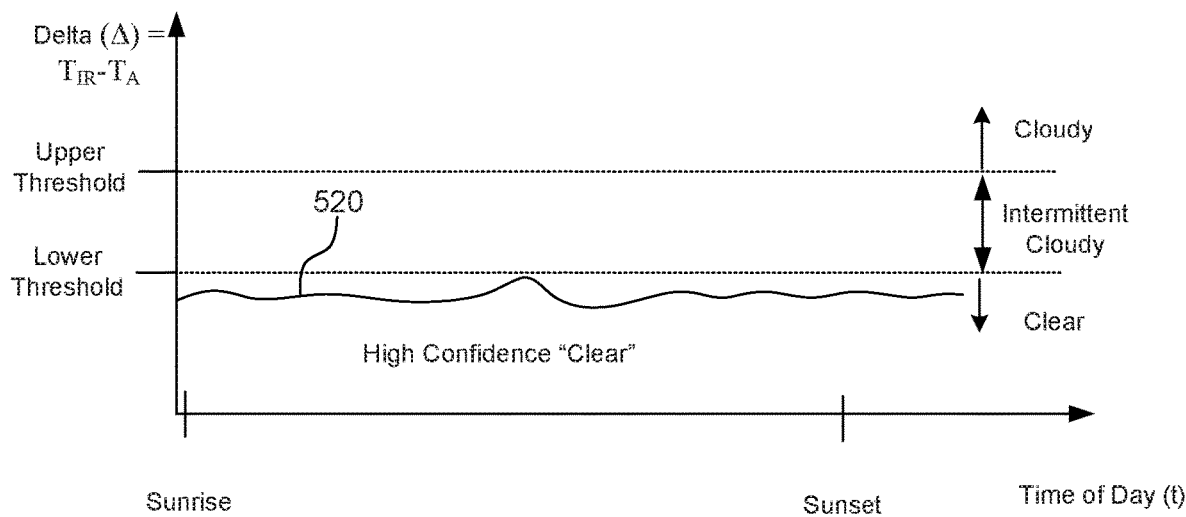
FIG. 5B is a graph with a plot of the difference between temperature readings taken by the infrared sensor and temperature readings taken by the ambient temperature sensor over time.

FIGS. 5A-5B include graphs of plots of readings taken over a day that is sunny and clear all day except for a passing cloud during the middle of the daytime. FIG. 5A is a graph with a plot 510 of intensity readings, I, taken by the visible light photosensor over time. FIG. 5B is a graph with a plot 520 of the difference, delta ($\Delta$), between temperature readings, $T_{IR}$, taken by the infrared sensor and temperature readings, $T_A$, taken by the ambient temperature sensor over time. As shown in the plot 510 of FIG. 5A, the intensity readings, I, taken by the visible light photosensor are high most of the daytime and drop with a high frequency (short period) oscillation when a cloud passes during the middle of the daytime. The plot 520 of FIG. 5A shows the values of delta ($\Delta$) do not increase above the lower threshold value during the entire day, which indicates a high confidence "clear" condition.

Figure 6A:
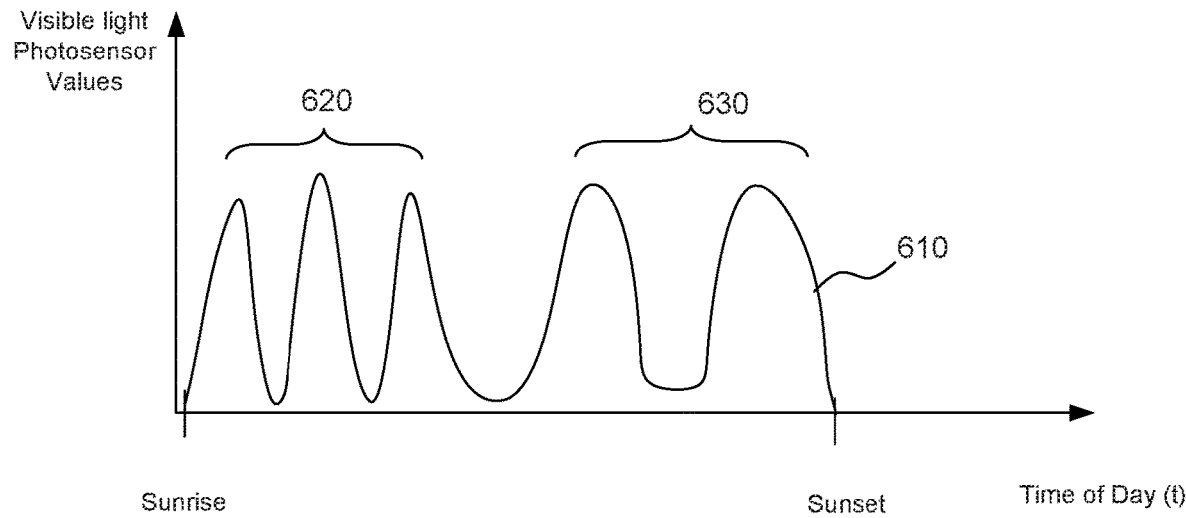
FIG. 6A is a graph with a plot of intensity readings taken by the visible light photosensor over time.
Figure 6B:
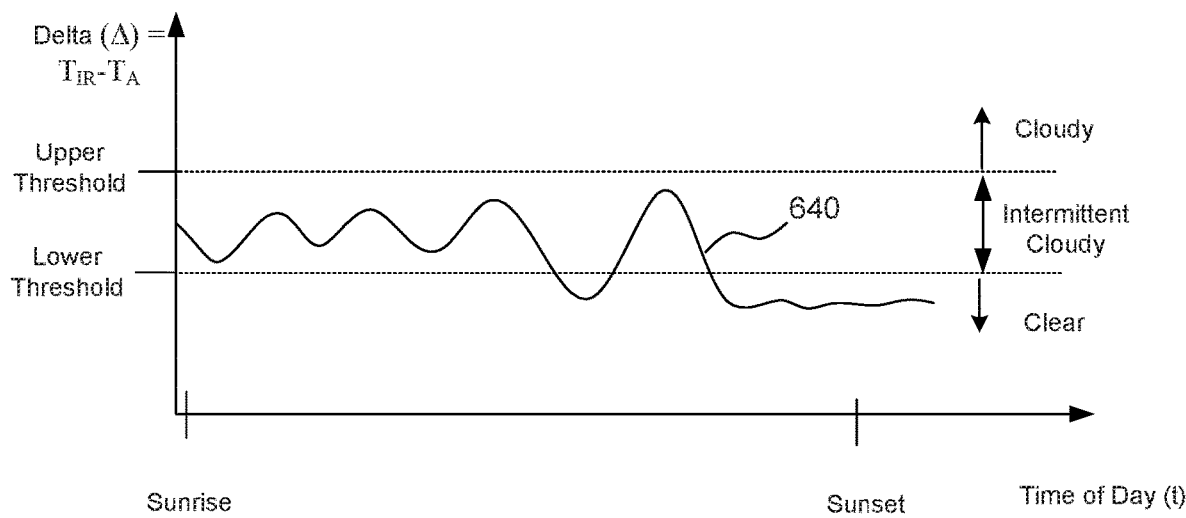
FIG. 6B is a graph with a plot of the difference between temperature readings taken by the infrared sensor over time and temperature readings taken by an ambient temperature sensor over time.

FIGS. 6A-6B include graphs of plots of readings taken over a day with frequent passing clouds in the morning until afternoon and the two slow moving clouds passing later in the afternoon. FIG. 6A is a graph with a plot 610 of intensity readings, I, taken by the visible light photosensor over time. FIG. 6B is a graph with a plot 640 of the difference, delta ($\Delta$), between temperature readings, $T_{IR}$, taken by the infrared sensor over time and temperature readings, $T_A$, taken by an ambient temperature sensor over time. As shown in the plot

610 of FIG. 6A, the intensity readings, I, taken by the visible light photosensor has a high frequency portion 620 during the time period that the frequent clouds are passing in the morning until afternoon. The plot 610 has a low frequency portion 630 later in the afternoon when two slow moving clouds pass by. The plot 640 in FIG. 6B shows that the values of delta (Δ) have high frequency during the time period that the frequent clouds are passing in the morning until afternoon and the values remain between the upper and lower threshold values indicating intermittent cloudy. The values of delta (Δ) later in the afternoon have a low frequency oscillations that have values between the upper and lower thresholds and also below the lower thresholds value shifting between "intermittent cloudy" and "clear" condition. In this case, the infrared sensor values indicate high confidence "intermittent cloudy" condition from morning until afternoon and the photosensor values indicate a high confidence "intermittent cloudy condition in the later afternoon.

Figure 7A:
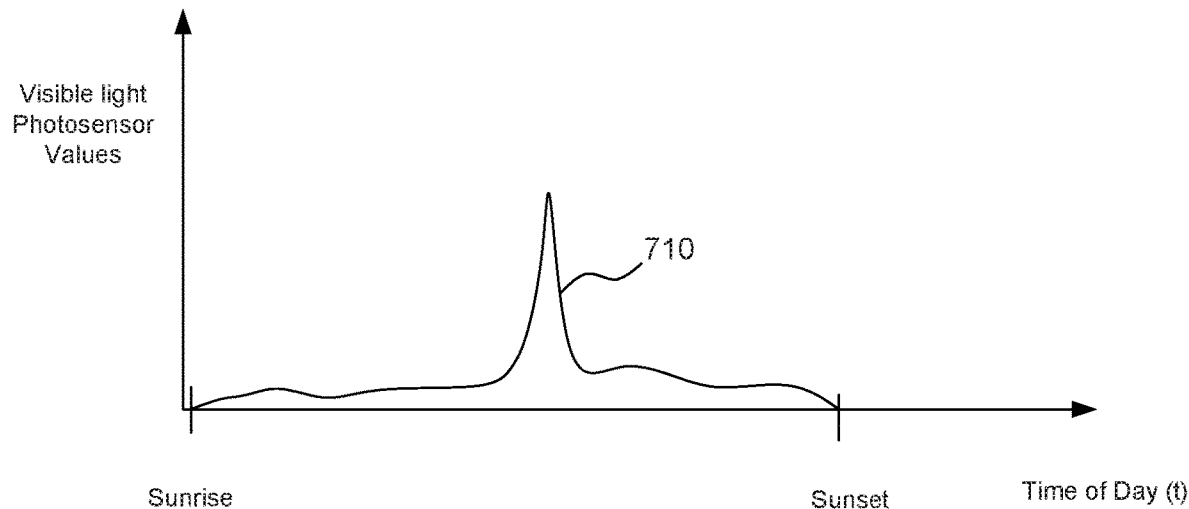
FIG. 7A is a graph with a plot of intensity readings taken by the visible light photosensor over time.
Figure 7B:
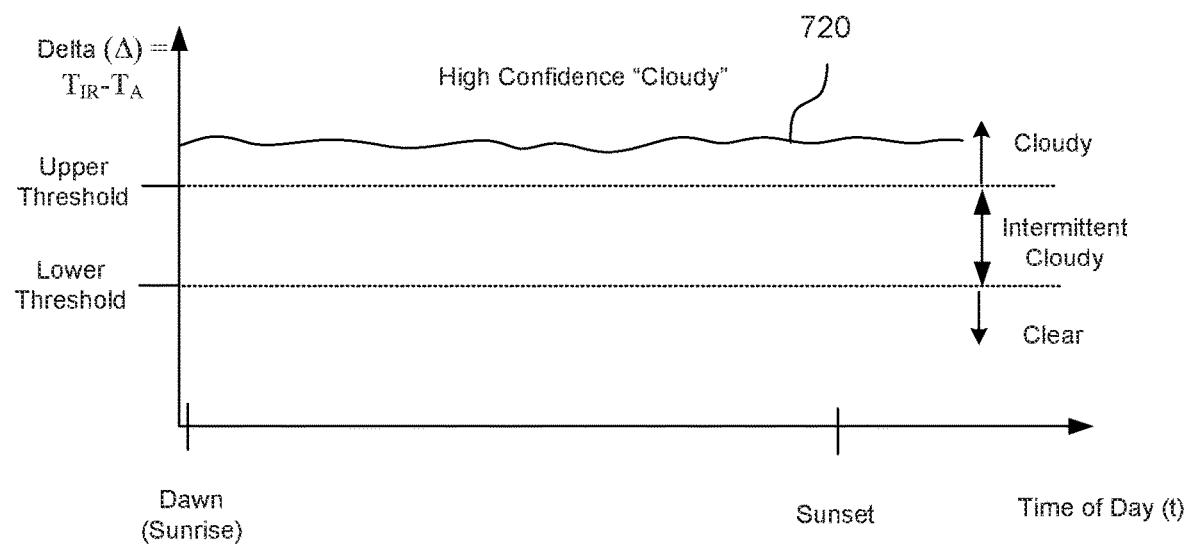
FIG. 7B is a graph with a plot of the difference between temperature readings taken by the infrared sensor and temperature readings taken by an ambient temperature sensor over time.

FIGS. 7A-7B include graphs of plots of readings taken over time during a day that is cloudy except for a short time during the middle of the day. FIG. 7A is a graph with a plot 710 of intensity readings, I, taken by the visible light photosensor over time. FIG. 7B is a graph with a plot 720 of the difference, delta (Δ), between temperature readings, $T_{IR}$, taken by the infrared sensor and temperature readings, $T_A$, taken by an ambient temperature sensor over time. As shown in the plot 710 of FIG. 7A, the intensity readings, I, taken by the visible light photosensor are low most of the daytime and increase with a high frequency (short period) oscillation when the sky clears briefly in the middle of the day. The plot 720 of FIG. 7A shows the values of delta (Δ) do not go below the upper threshold value during the entire day which indicates a high confidence "cloudy" condition.

In some implementations, an infrared cloud detector system uses readings from an infrared sensor to evaluate the delta differential between the ambient temperature and the temperature reading from an infrared sensor measuring wavelengths in an infrared range, for example, wavelengths between 8-14 micrometers. In some cases, one or more correcting factors are applied to the calculated delta differential. The delta differential provides a relative sky temperature value that can be used to classify the cloud cover condition. For example, a cloud cover condition may be determined in one of three buckets "Clear," "Cloudy," and "Overcast." In using this infrared cloud detector system, the cloud cover condition determined has no bearing on if the sun is out or if it is before sunrise/sunset.

The infrared cloud detector system according to certain implementations may have one or more technical advantages. For example, during early morning and evening conditions, the infrared sensor can determine if it is cloudy or sunny independent of visible light intensity levels. This determination of cloud cover condition during these times, when a photosensor would be ineffective while the sun is still up, may provide additional context to determining a tint state of a tintable window. As another example, the infrared sensor can be used to detect the general cloud cover condition within its field-of-view. This information can be used in conjunction with photosensor readings to determine if a "clear" or "cloudy" condition determined by the photosensor is likely to persist. For example, if the photo sensor detects a sharp rise in intensity levels which would tend to indicate a "clear" condition, but the infrared sensor indicates a "cloudy" condition, the "clear" condition is not expected to persist. Conversely, if the infrared sensor says a "clear" condition and the photosensor readings indicate that its a "clear" condition, then the "clear" condition is likely to persist. As another example, on occasions where a tintable window needs to be at a steady state at sunrise, the transition needs to start at X time (e.g., transition time) before sunrise. During this time, the photosensor is ineffective as there is minimal light exposure. The IR sensor can determine the cloud conditions before sunrise to inform the control logic whether to begin the tinting process (during clear sky) or keep the tintable window clear in anticipation of a "cloudy" condition at sunrise.

Figure 8:
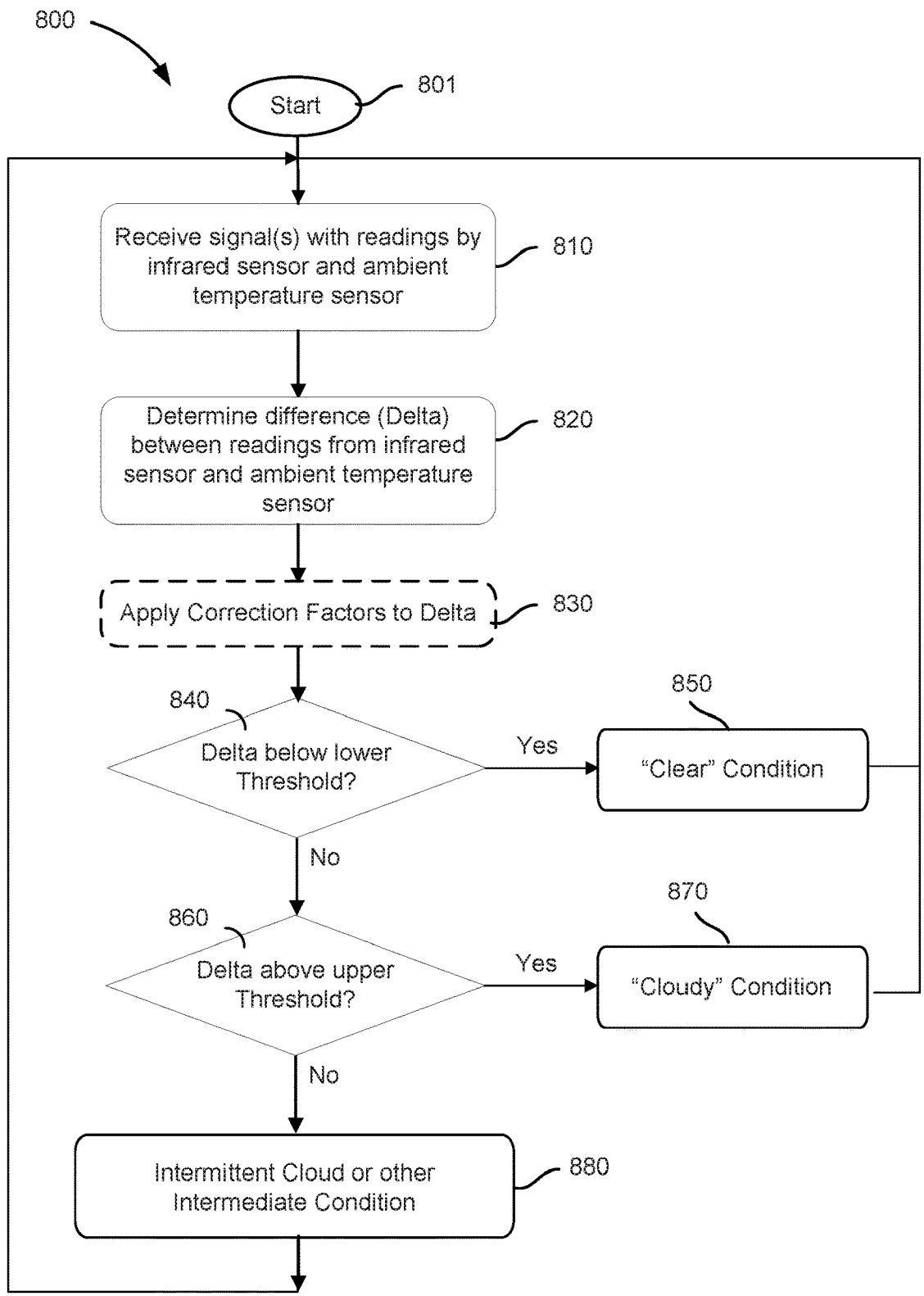
FIG. 8 shows a flowchart describing a method that uses temperature readings from an infrared sensor and an ambient temperature sensor to determine a cloud cover condition, according to implementations.
Figure 9:
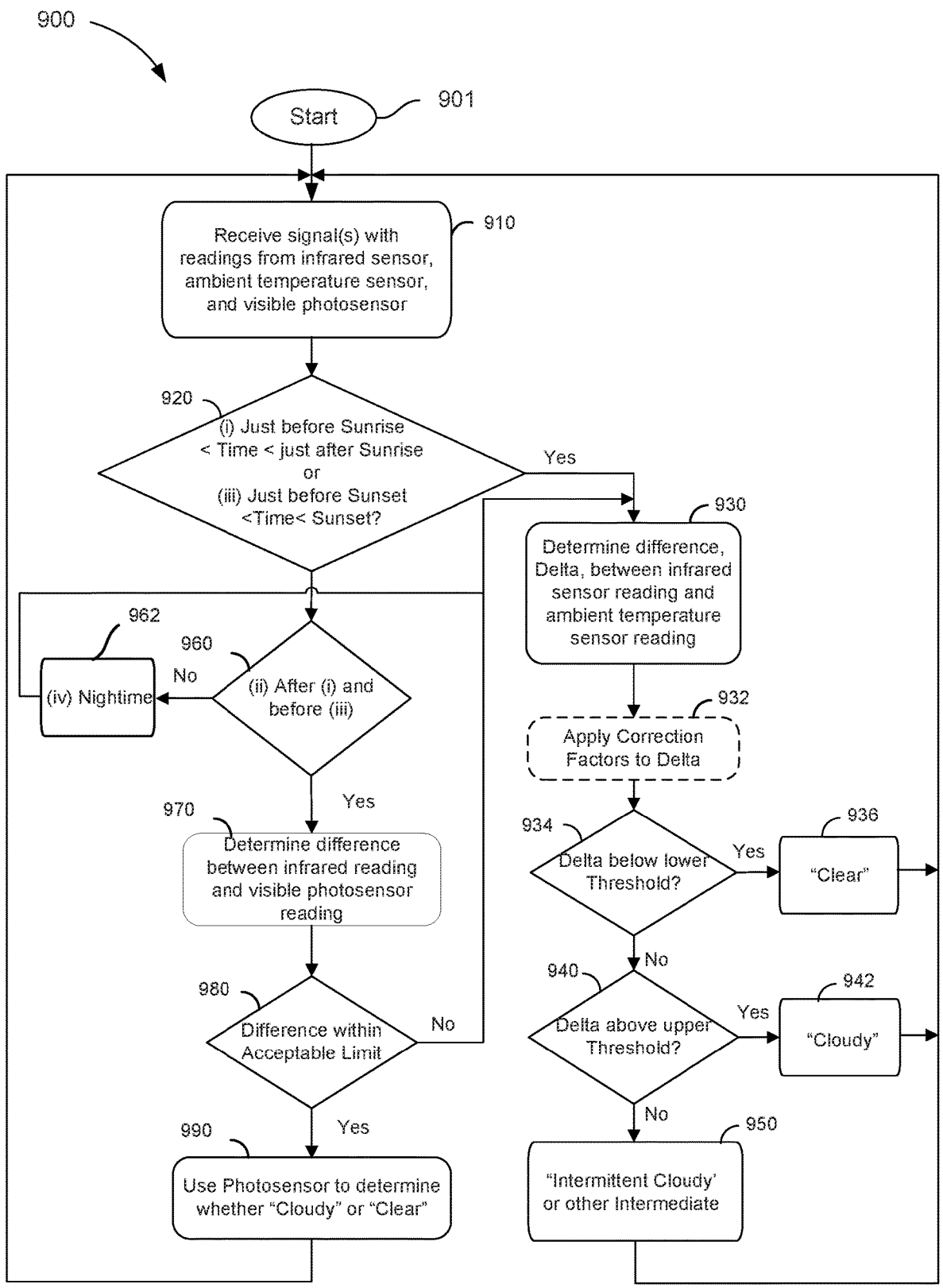
FIG. 9 shows a flowchart describing a method that determines a cloud cover condition using readings from an infrared sensor, an ambient temperature sensor, and a photosensor of an infrared cloud detector system, according to implementations.

III. Methods of Using Readings from at Least One Infrared Sensor and One Ambient Temperature Sensor to Determine a Cloud Cover Condition FIGS. 8-10 show flow charts describing methods of using readings from at least one infrared sensor and one ambient temperature sensor to determine a cloud cover condition, according to various embodiments. In FIGS. 9-10, readings from at least one photosensor can also be used to determine the cloud cover condition under certain conditions. In some cases, the infrared sensor used to take temperature readings is calibrated to detect infrared radiation in about the 8 μm to 14 μm spectrum and/or has a field-of-view of about 72 degrees. In some cases, the photosensor used to take the photosensor readings is calibrated to detect intensity of visible light (e.g., between about 390 nm and about 700 nm) within a photopic range, which generally refers to light that is visible to the average human eye under well-lit conditions (e.g., a luminance level ranging from between about 10 cd/m$^2$ and about 108 cd/m$^2$). Although these methods are described with respect to readings from a single infrared sensor, a single ambient temperature sensor, and/or a single photosensor, it would be understood that values from multiple sensors of a type can be used, for example, multiple sensors oriented in different directions can be used. If multiple sensors are used, the method may use a single value based on a sensor (e.g., a functioning sensor) of a particular orientation or take an average, mean, or other statistically relevant value of readings from multiple functioning sensors. In other cases, there may be redundant sensors and the infrared cloud detector may have logic that uses the values from a functioning sensor. For example, by evaluating which of the sensors is functioning and/or which are not functioning based on comparing the readings from the various sensors.

A. Method I

FIG. 8 shows a flowchart 800 describing a method that uses temperature readings from an infrared sensor and an ambient temperature sensor to determine a cloud cover condition, according to implementations. The infrared sensor and ambient temperature sensor of the infrared cloud detector system generally take readings (at sample times) on a periodic basis. A processor executes instructions stored in memory to perform the operations of this method. In one implementation, the infrared cloud detector system has components similar to those described with respect to the system having the infrared cloud detector 100 described with respect to FIG. 1. In another implementation, the infrared cloud detector system has components similar to those described with respect to the system with infrared cloud detector 310 in FIG. 3.

In FIG. 8, the method starts at operation 801. At operation 810, a signal(s) is received, at the processor, with temperature reading, $T_{IR}$, taken by an infrared sensor and temperature reading, $T_A$, taken by the ambient temperature sensor. Signals from the infrared sensor and/or ambient temperature sensor are received wirelessly and/or via wired electrical connections. The infrared sensor takes temperature readings based on infrared radiation received within its field-of-view. The infrared sensor is usually oriented toward a region of sky of interest, for example, a region above a building. The ambient temperature sensor is configured to be exposed to the outside environment to measure the ambient temperature.

At operation 820, the processor calculates the difference, delta (Δ), between the temperature reading, $T_{IR}$, taken by the infrared sensor and the temperature reading, $T_A$, taken by an ambient temperature sensor at a sample time. Optionally (denoted by dotted line), correction factors are applied to the calculated delta (Δ) (operation 830). Some examples of correction factors that may be applied include humidity, sun angle/elevation, and site elevation.

At operation 840, the processor determines whether the calculated delta (Δ) value is below a lower threshold value (e.g., −5 degrees Celsius, −2 degrees Celsius, etc.). If it is determined that the calculated delta (Δ) value is below the lower threshold value, the cloud cover condition is determined to be a "clear" condition (operation 850). During operation of the infrared cloud detector, the method then increments to the next sample time and returns to operation 810.

If it is determined that the calculated delta (Δ) is above the lower threshold value, then the processor determines whether the calculated delta (Δ) is above an upper threshold value (e.g., 0 degrees Celsius, 2 degrees Celsius, etc.) at operation 860. If it is determined that the calculated delta (Δ) is above the upper threshold value at operation 860, then the processor determines the cloud cover condition to be a "cloudy" condition (operation 870). During operation of the infrared cloud detector, the method then increments to the next sample time and returns to operation 810.

If it is determined that the calculated delta (Δ) is below the upper threshold value at operation 860, then the processor determines the cloud cover condition to be "intermittent cloudy" or another intermediate condition (operation 880). During operation of the infrared cloud detector, the method then increments to the next sample time and returns to operation 810.

B. Method II

FIG. 9 shows a flowchart 900 describing a method that determines a cloud cover condition using readings from an infrared sensor, an ambient temperature sensor, and a photosensor of an infrared cloud detector system, according to implementations. The infrared sensor, ambient temperature sensor, and photosensor generally take readings (at sample times) on a periodic basis. The infrared cloud detector system also includes a processor that can execute instructions stored in memory to perform the operations of this method. In one implementation, the infrared sensor, ambient temperature sensor, and photosensor are similar to components of the infrared cloud detector system 300 described with respect to FIG. 3. In another implementation, the infrared sensor, ambient temperature sensor, and photosensor are similar to components of the infrared cloud detector system 400 described with respect to FIG. 4A-4C.

In FIG. 9, the method starts at operation 901. At operation 910, one or more signals are received, at the processor, with a temperature reading, $T_{IR}$, taken by an infrared sensor at a particular sample time, a temperature reading, $T_A$, taken by the ambient temperature sensor at the sample time, and an intensity reading taken by the photosensor at the sample time. Signals from the infrared sensor, ambient temperature sensor, and photosensor are received wirelessly and/or via wired electrical connections. The infrared sensor takes temperature readings based on infrared radiation received within its field-of-view. The infrared sensor is usually oriented toward a region of sky of interest, for example, a region above a building. The ambient temperature sensor is configured to be exposed to the outside environment to measure the ambient temperature. The sensing surface of the photosensor is usually also oriented toward the region of sky of interest and direct sunlight is blocked or diffused from impinging the sensing surface.

At operation 920, the processor determines whether the time of day is during one of the following time periods: (i) a time period shortly before sunrise (e.g., starting at a first time of 45 minutes before sunrise, 30 minutes before sunrise, 20 minutes before sunrise, or other suitable amount of time before sunrise) and up to slightly after sunrise (e.g., starting at a second time of 45 minutes after sunrise, 30 minutes after sunrise, 20 minutes after sunrise, or other suitable amount of time after sunrise) and (iii) a time period shortly before sunset (dusk) (e.g., starting at a third time of 45 minutes before sunset, 30 minutes before sunset, 20 minutes before sunset, or other suitable amount of time before sunset) and up until sunset. In one case, the time of sunrise can be determined from measurements taken by the visible wavelength photosensor. For example, the time period (i) may end at the point where a visible light wavelength photosensor begins to measure direct sunlight i.e. an intensity reading of the visible light photosensor is at or above a minimum intensity value. In addition or alternatively, the time period (iii) may be determined to end at the point where the intensity reading from a visible light wavelength photosensor is at or below a minimum intensity value. In another example, the time of sunrise and/or the time of sunset may be calculated using a solar calculator and the day of the year and the time periods (i) and (iii) can be calculated by a defined period of time (e.g., 45 minutes) before and after the calculated times of sunrise/sunset.

If it is determined at operation 920 that the time of day is during either of the time periods (i) or (iii), then the processor calculates the difference, delta (Δ), between the temperature reading, $T_{IR}$, taken by the infrared sensor and the temperature reading, $T_A$, taken by an ambient temperature sensor at a sample time (operation 930). Optionally (denoted by dotted line), correction factors are applied to the calculated delta (Δ) (operation 930). Some examples of correction factors that may be applied include humidity, sun angle/elevation, and site elevation.

In one embodiment, the processor also determines at operation 920 whether the infrared readings are oscillating at a frequency greater than a second defined level. If the processor determines at operation 920 that the time of day is either within the time period (i) or (iii) and the infrared readings are oscillating at a frequency greater than a second defined level, then the processor applies operation 990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

At operation 934, the processor determines whether the calculated delta (Δ) value is below a lower threshold value (e.g., −5 degrees Celsius, −2 degrees Celsius, etc.). If it is determined that the calculated delta (Δ) value is below the lower threshold value, the cloud cover condition is determined to be a "clear" condition (operation 936). During operation of the infrared cloud detector, the method then increments to the next sample time and returns to operation 910.

If it is determined that the calculated delta (Δ) is above the lower threshold value, then the processor determines whether the calculated delta (Δ) is above an upper threshold value (e.g., 0 degrees Celsius, 2 degrees Celsius, etc.) at operation 940. If it is determined that the calculated delta (Δ) is above the upper threshold value at operation 940, then the processor determines the cloud cover condition to be a "cloudy" condition (operation 942). If still in operation, the method increments to the next sample time and returns to operation 910.

If it is determined that the calculated delta (Δ) is below the upper threshold value at operation 940, then the processor determines the cloud cover condition to be "intermittent cloudy" or another intermediate condition (operation 950). If the system is still in operation, the method increments to the next sample time and returns to operation 910.

If it is determined at operation 920 that the time of day is not during either of the time periods (i) or (iii), then the processor determines whether the time of day is during the time period (ii) which is in the daytime after the time period (i) and before time period (iii) (operation 960). If the processor determines at operation 960 that the time of day is during the time period (ii) daytime, then the processor calculates the difference between the temperature reading, $T_{IR}$, taken by the infrared sensor and the intensity reading taken by the photosensor (operation 970). At operation 980, the processor determines whether the calculated difference is within an acceptable limit. If the processor determines at operation 980 that the calculated difference is more than the acceptable limit, then the processor applies operation 930 to calculate the delta (Δ) and uses the calculated delta (Δ) to determine the cloud cover condition as discussed above.

In one embodiment, the processor also determines at operation 960 whether the infrared readings are oscillating at a frequency greater than a second defined level. If the processor determines at operation 960 the time of day is within the time period (ii) and that the infrared readings are oscillating at a frequency greater than a second defined level, then the processor applies operation 990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

If the processor determines at operation 980 that the calculated difference is within the acceptable limit, the photosensor reading is used to determine the cloud cover condition (operation 990). For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

In one embodiment, the processor also determines at operation 970 whether the photosensor readings are oscillating at a frequency greater than a first defined level and whether the infrared readings are oscillating at a frequency greater than a second defined level. If the processor determines at operation 980 that the calculated difference is within the acceptable limit and the processor determines that the photosensor readings are oscillating at a frequency greater than the first defined level, then the processor applies operation 930 to calculate the delta (Δ) and use the calculated delta (Δ) is used determine the cloud cover condition as discussed above. If the processor determines at operation 980 that the calculated difference is not within the acceptable limit and the processor determines that the infrared readings are oscillating at a frequency greater than the second defined level, then the processor applies operation 990 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 910.

If the processor determines at operation 960 that the time of day is in the nighttime time period (iv) after time period (iii) and before time period (i), the processor calculates the delta at operation 930 and uses the calculated delta (Δ) to determine the cloud cover condition as discussed above.

C. Method III—Module C Algorithm that Uses Infrared Sensor, Ambient Temperature Sensor, and Photosensor Readings.

In energy efficient buildings, control logic for setting levels of its building systems may consider cloud cover. For example, in buildings with optically-switchable windows, control logic may consider cloud cover in setting window optical states (e.g., tint states in an electrochromic window). Conventional systems that purport to provide this functionality typically employ expensive sensing equipment to map the entire sky and track clouds. This mapping technology can also be hampered by not being able to register clouds until there is enough light to see them. Thus, by the time the clouds are registered, building systems may not need to be adjusted.

In various implementations described herein, a cloud cover condition determined by sensor data from an infrared cloud detector system (e.g., a system of FIG. 1, system 300 in FIG. 3, system 400 in FIGS. 4A-4C, or other infrared cloud detector system described herein) can be used to set levels of building systems. As an example, this section describes control logic that uses sensor readings from sensors in an infrared cloud detector system to determine a cloud cover condition and set tint levels in one or more optically-switchable windows (e.g., electrochromic windows) of a building based on the determined cloud cover condition. Electrochromic windows have one or more electrochromic devices such as the electrochromic devices described in U.S. Pat. No. 8,764,950, issued on Jul. 1, 2014 and titled "ELECTROCHROMIC DEVICES," and U.S. patent application Ser. No. 13/462,725, filed on May 2, 2012 and titled "ELECTROCHROMIC DEVICES," both of which are hereby incorporated by reference in their entirety.

i) Introduction to Electrochromic Devices/Windows

Figure 10A:
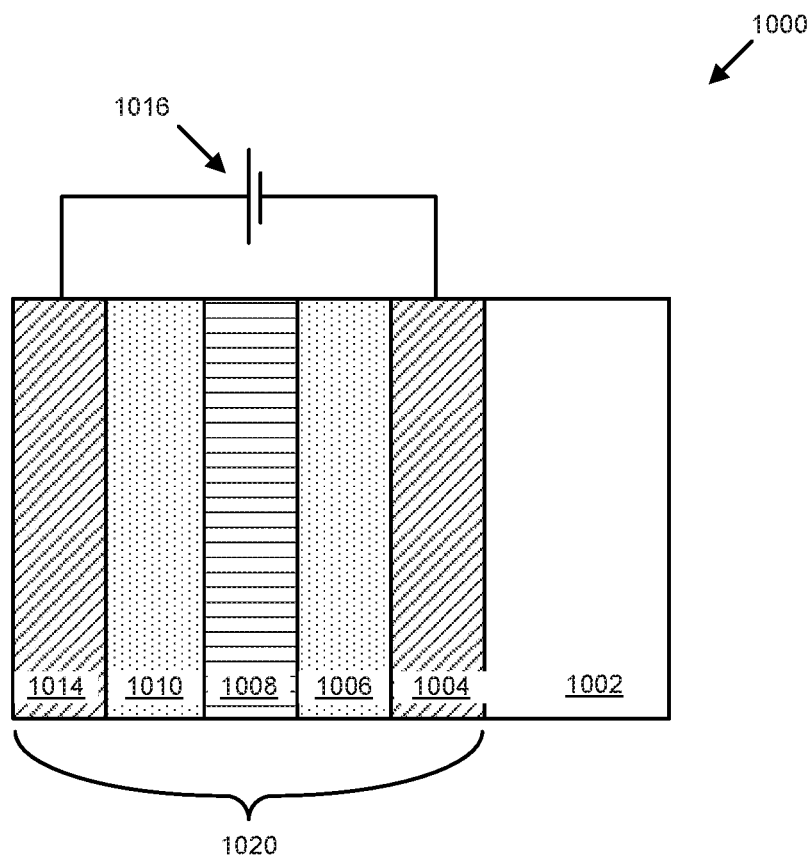
FIG. 10A depicts a schematic cross-section of an electrochromic device.
Figure 10B:
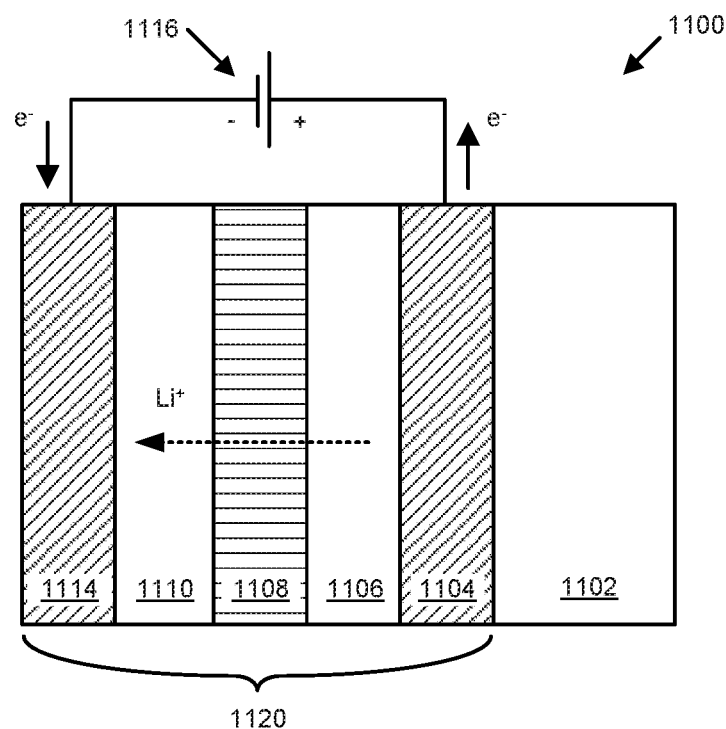
FIG. 10B depicts a schematic cross-section of an electrochromic device in a bleached state (or transitioning to a bleached state).
Figure 10C:
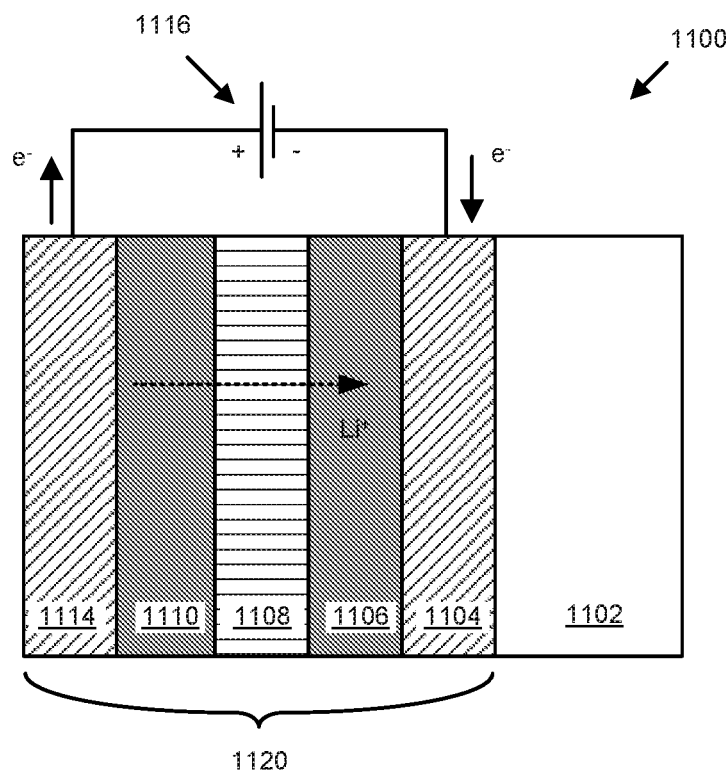
FIG. 10C depicts a schematic cross-section of the electrochromic device shown in FIG. 10B, but in a colored state (or transitioning to a colored state).

FIG. 10A schematically depicts an electrochromic device 1000, in cross-section. The electrochromic device 1000 includes a substrate 1002, a first conductive layer (CL) 1004, an electrochromic layer (EC) 1006, an ion conducting layer (IC) 1008, a counter electrode layer (CE) 1010, and a second conductive layer (CL) 1014. In one implementation, the electrochromic layer (EC) 1006 comprising tungsten oxide and the counter electrode layer (CE) 1010 comprises nickel-tungsten oxide. Layers 1004, 1006, 1008, 1010, and 1014 are collectively referred to as an electrochromic stack 1020. A voltage source 1016 operable to apply an electric potential across the electrochromic stack 1020 effects transition of the electrochromic device, for example, between a bleached state (e.g., as depicted in FIG. 10B) and a colored state (e.g., as depicted in FIG. 10C). The order of layers can be reversed with respect to the substrate 1002.

In some cases, electrochromic devices having distinct layers and can be fabricated as all solid state devices and/or all inorganic devices. Examples of such devices and methods of fabricating them are described in more detail in U.S. patent application Ser. No. 12/645,111, titled "Fabrication of Low-Defectivity Electrochromic Devices" and filed on Dec. 22, 2009, and in U.S. patent application Ser. No. 12/645,159 (issued as U.S. Pat. No. 8,432,603 on Apr. 30, 2013), titled "Electrochromic Devices" and filed on Dec. 22, 2009, both of which are hereby incorporated by reference in their entireties. It should be understood, however, that any one or more of the layers in the stack may contain some amount of organic material. The same can be said for liquids that may be present in one or more layers in small amounts. It should also be understood that solid state material may be deposited or otherwise formed by processes employing liquid components such as certain processes employing sol-gels or chemical vapor deposition. Additionally, it should be understood that reference to a transition between a bleached state and colored state is non-limiting and suggests only one example, among many, of an electrochromic transition that may be implemented. Unless otherwise specified herein (including the foregoing discussion), whenever reference is made to a bleached-colored transition, the corresponding device or process encompasses other optical state transitions such as non-reflective-reflective, transparent-opaque, etc. Further, the term "bleached" refers to an optically neutral state, for example, uncolored, transparent, or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In some implementations, an electrochromic device is configured to reversibly cycle between a bleached state and a colored state. When the electrochromic device is in a bleached state, a potential is applied to the electrochromic stack 1020 such that available ions in the stack reside primarily in the counter electrode 1010. When the potential on the electrochromic stack is reversed, the ions are transported across the ion conducting layer 1008 to the electrochromic material 1006 and cause the material to transition to the colored state. In a similar way, the electrochromic device of certain implementations described herein is configured to reversibly cycle between different tint levels (e.g., bleached state, darkest colored state, and intermediate levels between the bleached state and the darkest colored state).

Referring again to FIG. 10A, a voltage source 1016 is configured to operate in conjunction with input from sensors. As described herein, the voltage source 1016 interfaces with a controller (not shown in this figure). Additionally, the voltage source 1016 may interface with an energy management system that controls the electrochromic device according to various criteria such as the time of year, time of day, and measured environmental conditions. Such an energy management system, in conjunction with large area electrochromic windows can dramatically lower the energy consumption of a building having the electrochromic windows.

Any material having suitable optical, electrical, thermal, and mechanical properties may be used as the substrate 1002 or other substrate of an electrochromic stack described herein. Examples of suitable substrates include, for example, glass, plastic, and mirror materials. Suitable glasses include either clear or tinted soda lime glass, including soda lime float glass. The glass may be tempered or untempered. In many cases, the substrate is a glass pane sized for residential window applications. The size of such glass pane can vary widely depending on the specific needs of the residence. In other cases, the substrate is architectural glass. Architectural glass is typically used in commercial buildings, but may also be used in residential buildings, and typically, though not necessarily, separates an indoor environment from an outdoor environment. In certain examples, architectural glass is at least 20 inches by 20 inches, and can be much larger, for example, as large as about 80 inches by 120 inches. Architectural glass is typically at least about 2 mm thick, typically between about 3 mm and about 6 mm thick. Of course, electrochromic devices are scalable to substrates smaller or larger than architectural glass. Further, the electrochromic device may be provided on a mirror of any size and shape.

On top of the illustrated substrate 1002 is a conductive layer 1004. In certain implementations, one or both of the conductive layers 1004 and 1014 is inorganic and/or solid. The conductive layers 1004 and 1014 may be made from a number of different materials, including conductive oxides, thin metallic coatings, conductive metal nitrides, and composite conductors. Typically, the conductive layers 1004 and 1014 are transparent at least in the range of wavelengths where electrochromism is exhibited by the electrochromic layer. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Since oxides are often used for these layers, they are sometimes referred to as "transparent conductive oxide" (TCO) layers. Thin metallic coatings that are substantially transparent may also be used, as well as combinations of TCOs and metallic coatings.

The function of the conductive layers is to spread an electric potential provided by the voltage source 1016 over surfaces of the electrochromic stack 1020 to interior regions of the stack, with relatively little ohmic potential drop. The electric potential is transferred to the conductive layers though electrical connections to the conductive layers. In some aspects, bus bars, at least one in contact with conductive layer 1004 and at least one in contact with conductive layer 1014, provide the electric connection between the voltage source 1016 and the conductive layers 1004 and 1014. The conductive layers 1004 and 1014 may also be connected to the voltage source 1016 with other conventional means.

Overlaying the illustrated conductive layer 1004 is an electrochromic layer 1006. In some aspects, the electrochromic layer 1006 is inorganic and/or solid. The electrochromic layer may contain any one or more of a number of different electrochromic materials including metal oxides. Some examples of suitable metal oxides include tungsten oxide ($WO_3$), molybdenum oxide ($MoO_3$), niobium oxide ($Nb_2O_5$), titanium oxide ($TiO_2$), copper oxide (CuO), iridium oxide ($Ir_2O_3$), chromium oxide ($Cr_2O_3$), manganese oxide ($Mn_2O_3$), vanadium oxide ($V_2O_5$), nickel oxide ($Ni_2O_3$), cobalt oxide ($Co_2O_3$) and the like. During operation, the electrochromic layer 1006 transfers ions to and receives ions from the counter electrode layer 1010 to cause reversible optical transitions. Generally, the colorization (or change in any optical property—e.g., absorbance, reflectance, and transmittance) of the electrochromic material is caused by reversible ion insertion into the material (e.g., intercalation) and a corresponding injection of a charge balancing electron. Typically some fraction of the ions responsible for the optical transition is irreversibly bound up in the electrochromic material. Some or all of the irreversibly bound ions are used to compensate "blind charge" in the material. In most electrochromic materials, suitable ions include lithium ions (Li+) and hydrogen ions (H+) (that is, protons). In some cases, however, other ions will be suitable. In various embodiments, lithium ions are used to produce the electrochromic phenomena. Intercalation of lithium ions into tungsten oxide ($WO_{3-y}(0<y\leq\sim0.3)$) causes the tungsten oxide to change from transparent (bleached state) to blue (colored state).

Referring again to FIG. 10A, in the electrochromic stack 1020, the ion conducting layer 1008 is sandwiched between the electrochromic layer 1006 and the counter electrode layer 1010. In some embodiments, the counter electrode layer 1010 is inorganic and/or solid. The counter electrode layer may comprise one or more of a number of different materials that serve as a reservoir of ions when the electrochromic device is in the bleached state. During an electrochromic transition initiated by, for example, application of an appropriate electric potential, the counter electrode layer transfers some or all of the ions it holds to the electrochromic layer, changing the electrochromic layer to the colored state. Concurrently, in the case of NiWO, the counter electrode layer colors with the loss of ions. Suitable materials for the counter electrode complementary to $WO_3$ include nickel oxide (NiO), nickel tungsten oxide (NiWO), nickel vanadium oxide, nickel chromium oxide, nickel aluminum oxide, nickel manganese oxide, nickel magnesium oxide, chromium oxide ($Cr_2O_3$), manganese oxide ($MnO_2$), and Prussian blue. When charge is removed from a counter electrode 1010 made of nickel tungsten oxide (that is, ions are transported from counter electrode 1010 to electrochromic layer 1006), the counter electrode layer 1010 will transition from a transparent state to a colored state.

In the illustrated electrochromic device 1100, between the electrochromic layer 1006 and the counter electrode layer 1010, there is the ion conducting layer 1008. The ion conducting layer 1008 serves as a medium through which ions are transported (in the manner of an electrolyte) when the electrochromic device transitions between the bleached state and the colored state. Preferably, ion conducting layer 1008 is highly conductive to the relevant ions for the electrochromic and the counter electrode layers, but has sufficiently low electron conductivity that negligible electron transfer takes place during normal operation. A thin ion conducting layer with high ionic conductivity permits fast ion conduction and hence fast switching for high performance electrochromic devices. In certain aspects, the ion conducting layer 1008 is inorganic and/or solid.

Examples of suitable materials for an ion conducting layer (i.e. for electrochromic devices having a distinct IC layer) include silicates, silicon oxides, tungsten oxides, tantalum oxides, niobium oxides, and borates. These materials may be doped with different dopants, including lithium. Lithium doped silicon oxides include lithium silicon-aluminum-oxide. In some embodiments, the ion conducting layer comprises a silicate-based structure. In one aspect, a silicon-aluminum-oxide (SiAlO) is used for the ion conducting layer 1008.

In certain implementations, the electrochromic device 1000 includes one or more additional layers (not shown), such as one or more passive layers. Passive layers used to improve certain optical properties may be included in the electrochromic device 1000. Passive layers for providing moisture or scratch resistance may also be included in electrochromic device 1000. For example, the conductive layers may be treated with anti-reflective or protective oxide or nitride layers. Other passive layers may serve to hermetically seal electrochromic device 300.

FIG. 10B is a schematic cross-section of an electrochromic device in a bleached state (or transitioning to a bleached state). In accordance with this illustrated example, an electrochromic device 1100 includes a tungsten oxide electrochromic layer (EC) 1106 and a nickel-tungsten oxide counter electrode layer (CE) 1110. The electrochromic device 1100 also includes a substrate 1102, a conductive layer (CL) 11011, an ion conducting layer (IC) 1108, and conductive layer (CL) 1114. Layers 1104, 1106, 1108, 1010, and 1114 are collectively referred to as an electrochromic stack 1120. A power source 1116 is configured to apply a voltage potential and/or current to the electrochromic stack 1120 through suitable electrical connections (e.g., bus bars) to the conductive layers 1104 and 1114. In one aspect, the voltage source is configured to apply a potential of a few volts in order to drive a transition of the device from one optical state to another. The polarity of the potential as shown in FIG. 10B is such that the ions (lithium ions in this example) primarily reside (as indicated by the dashed arrow) in nickel-tungsten oxide counter electrode layer 1110

FIG. 10C is a schematic cross-section of the electrochromic device 1100 shown in FIG. 10B but in a colored state (or transitioning to a colored state). In FIG. 10C, the polarity of voltage source 1116 is reversed, so that the tungsten oxide electrochromic layer 1106 is made more negative to accept additional lithium ions, and thereby transition to the colored state. As indicated by the dashed arrow, lithium ions are transported across the ion conducting layer 1108 to the tungsten oxide electrochromic layer 1106. The tungsten oxide electrochromic layer 1106 is shown in the colored state or transitioning to the colored state. The nickel-tungsten oxide counter electrode 1110 is also shown in the colored state or transitioning to the colored state. As explained, nickel-tungsten oxide becomes progressively more opaque as it gives up (deintercalates) lithium ions. In this example, there is a synergistic effect where the transition to colored states for both layers 1106 and 1110 are additive toward reducing the amount of light transmitted through the electrochromic stack and the substrate.

In certain implementations, an electrochromic device includes an electrochromic (EC) electrode layer and a counter electrode (CE) layer separated by an ionically conductive (IC) layer that is highly conductive to ions and highly resistive to electrons. As conventionally understood, the ionically conductive layer therefore prevents shorting between the electrochromic layer and the counter electrode layer. The ionically conductive layer allows the electrochromic and counter electrodes to hold a charge and thereby maintain their bleached or colored states. In electrochromic devices having distinct layers, the components form a stack which includes the ion conducting layer sandwiched between the electrochromic electrode layer and the counter electrode layer. The boundaries between these three stack components are defined by abrupt changes in composition and/or microstructure. Thus, the devices have three distinct layers with two abrupt interfaces.

In accordance with certain implementations, the counter electrode and electrochromic electrodes are formed immediately adjacent one another, sometimes in direct contact, without separately depositing an ionically conducting layer. In some implementations, electrochromic devices having an interfacial region rather than a distinct IC layer are employed. Such devices, and methods of fabricating them, are described in U.S. Pat. Nos. 8,300,298, 8,582,193, 8,764,950, and U.S. Pat. No. 8,764,951—each of the patents is titled "Electrochromic Devices," and each is hereby incorporated by reference in its entirety.

In certain implementations, an electrochromic device may be integrated into an insulated glass unit (IGU) of an electrochromic window or may be in a single pane electrochromic window. For example, an electrochromic window may have an IGU including a first electrochromic lite and a second lite. The IGU also includes a spacer separating the first electrochromic lite and the second lite. The second lite in the IGU may be a non-electrochromic lite or otherwise. For example, the second lite may have an electrochromic device thereon and/or one or more coatings such as low-E coatings and the like. Either of the lites can also be laminated glass. Between the spacer and the first TCO layer of the electrochromic lite is a primary seal material. This primary seal material is also between spacer and second glass lite. Around the perimeter of spacer is a secondary seal. These seals aid in keeping moisture out of the interior space of the IGU. They also serve to prevent argon or other gas that may be introduced into the interior space of the IGU from escaping. The IGU also includes bus bar wiring for connection to a window controller. In some implementations, one or both of the bus bars are inside the finished IGU, however in one implementation one bus bar is outside the seal of the IGU and one bus bar is inside the IGU. In the former embodiment, an area is used to make the seal with one face of the spacer used to form the IGU. Thus, the wires or other connection to the bus bars runs between the spacer and the glass. As many spacers are made of metal, e.g., stainless steel, which is conductive, it is desirable to take steps to avoid short circuiting due to electrical communication between the bus bar and connector thereto and the metal spacer.

iii) Logic for Controlling Electrochromic Devices/Windows

In some implementations, a controller (e.g., local window controller, network controller, master controller, etc.) includes intelligence control logic for calculating, determining, selecting or otherwise generating tint states for one or more optically-switchable windows (e.g., electrochromic windows) of a building. This control logic can be used to determine a cloud cover condition based on sensor data from an infrared cloud detector system at the building and use the determined cloud cover condition to determine tint states for the optically-switchable windows. This control logic can be used to implement methods for determining and controlling desired tint levels for the one more electrochromic windows or other tintable windows to account for occupant comfort and/or energy conservation considerations. In some cases, the control logic employs one or more logic modules. FIGS. 11A-11C include diagrams depicting some general input to each of three logic Modules A, B, and C of an exemplary control logic of disclosed implementations. Additional examples of Modules A, B, and C are described in International Patent Application PCT/US16/41344, titled "CONTROL METHOD FOR TINTABLE WINDOWS," filed on Jul. 7, 2016, and in PCT/US15/29675, titled "CONTROL METHOD FOR TINTABLE WINDOWS" and filed on May 5, 2015, each of which is hereby incorporated by reference in its entirety.

Figure 11A:
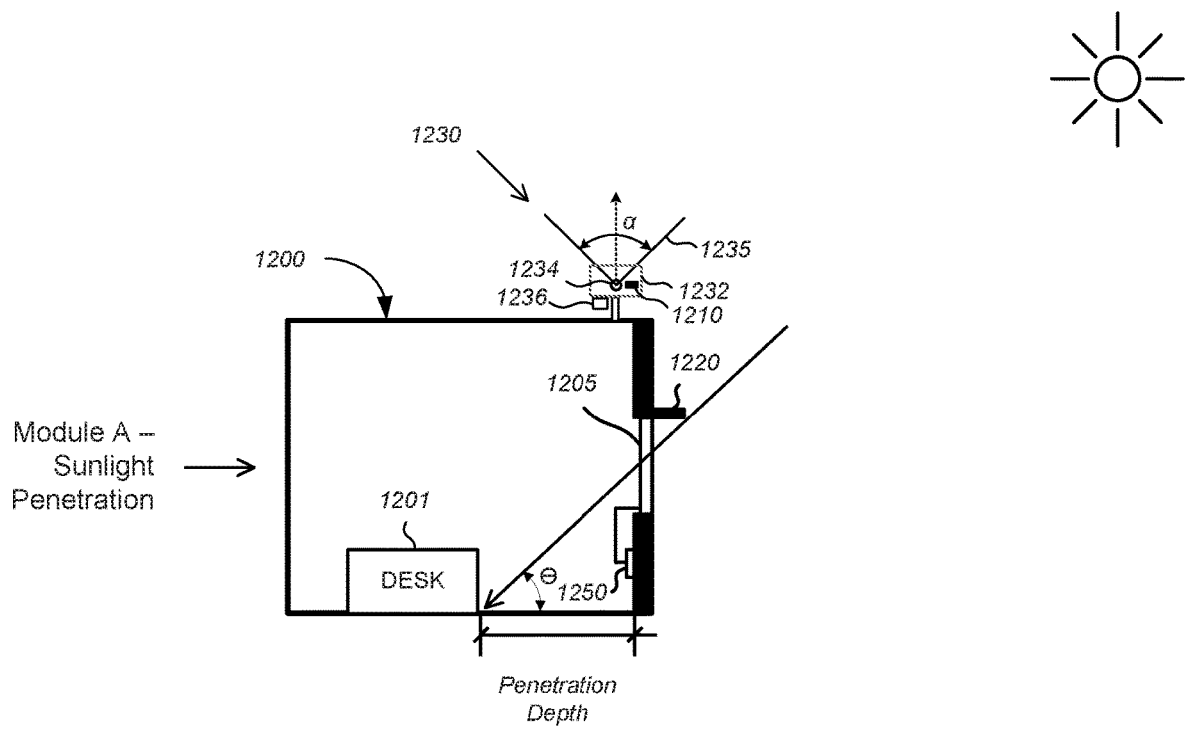
FIG. 11A shows the penetration depth of direct sunlight into a room through an electrochromic window between the exterior and the interior of a building, which includes the room, according to an implementation.
Figure 11B:
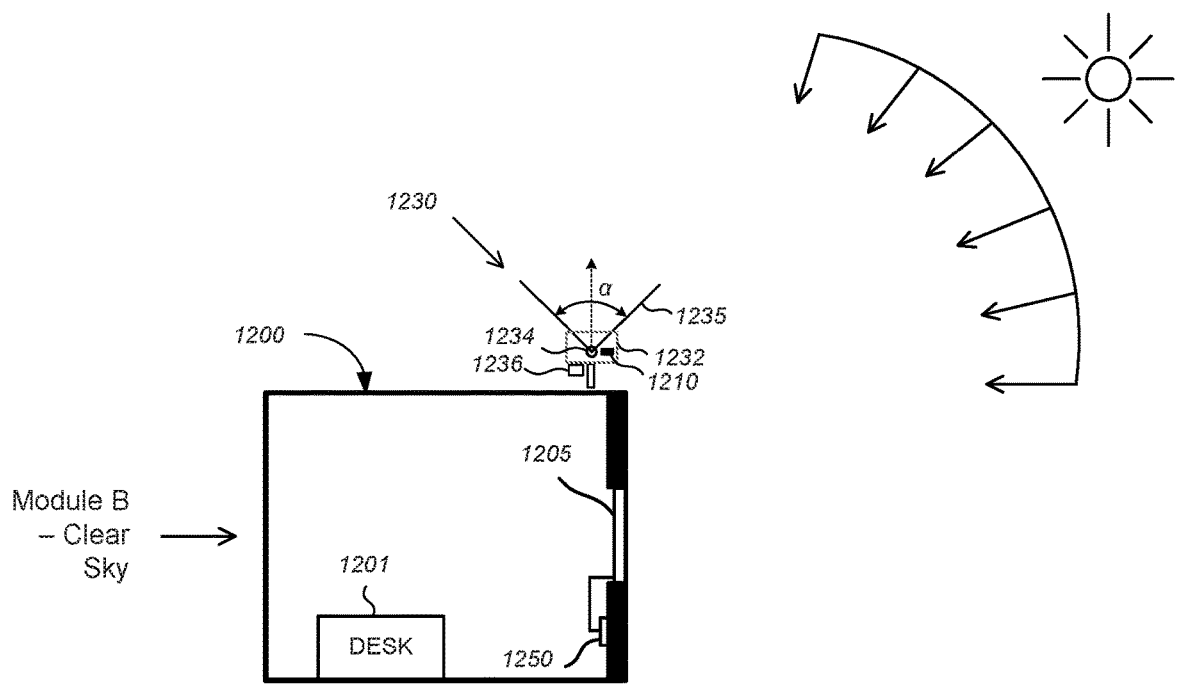
FIG. 11B shows direct sunlight and radiation under clear sky conditions entering the room through the electrochromic window, according to an implementation.
Figure 11C:
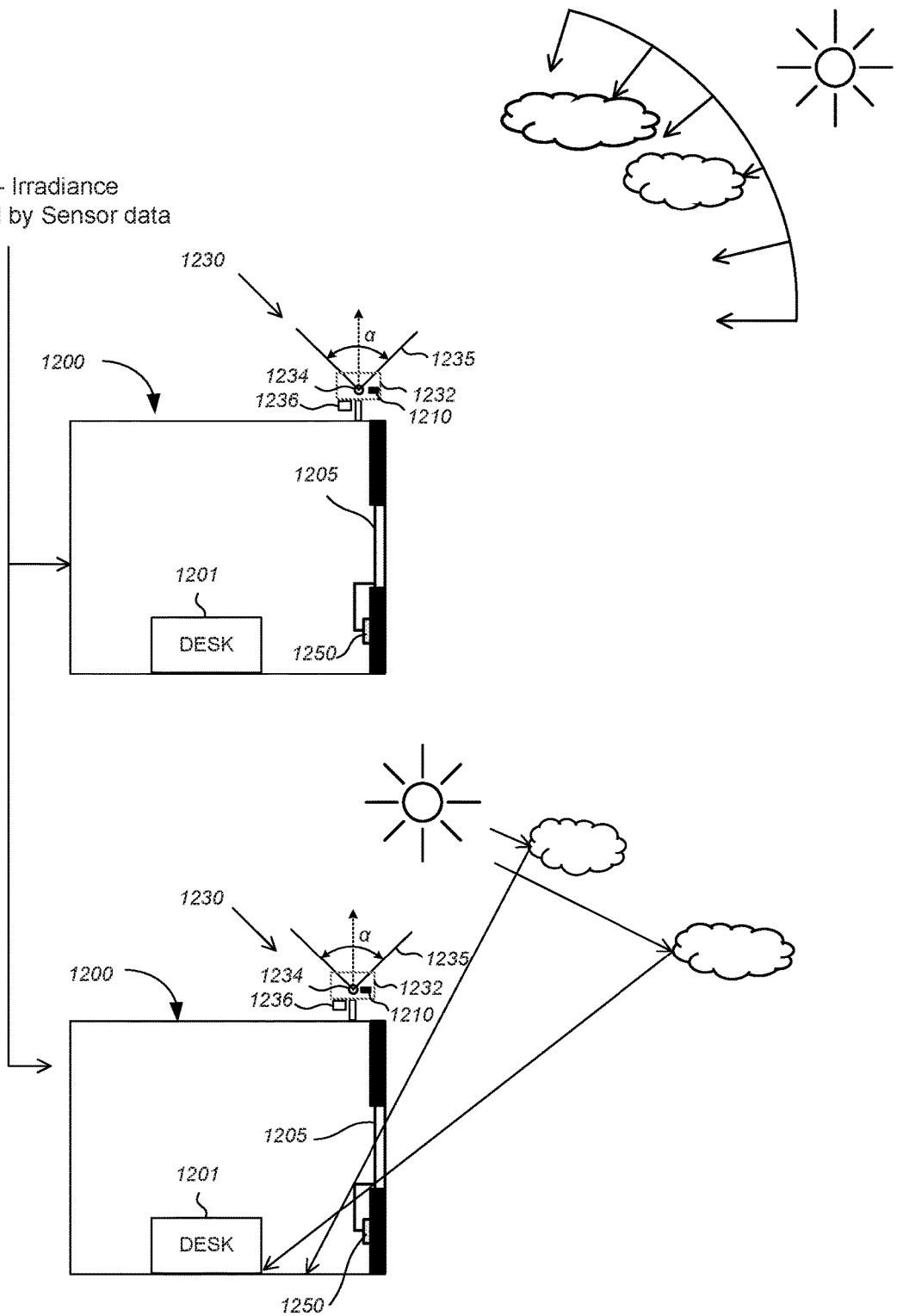
FIG. 11C shows radiant light from the sky as may be obstructed by or reflected from objects such as, for example, clouds and other buildings, according to an implementation.

FIGS. 11A-11C include diagrams depicting some general input to each of three logic Modules A, B, and C of an exemplary control logic of disclosed implementations. Each diagram depicts a schematic side view of a room 1200 of a building having a desk 1201 and an electrochromic window 1205 located between the exterior and the interior of the building. The diagram also depicts an infrared cloud detector system in accordance with one example. In other implementations, another example of an infrared cloud detector system described herein can be used. In the illustrated example, the infrared cloud detector system includes an infrared cloud detector 1230 located on the roof of the building. The infrared cloud detector 1230 comprises a housing 1232 having a cover made of light-diffusing material, an infrared sensor 1234 and a photosensor 1210 within the enclosure of the housing 1232, and an ambient temperature sensor 1236 located on a shaded surface of the housing 1232. The infrared sensor 1234 is configured to take temperature readings, $T_{IR}$, based on infrared radiation received form the region of sky within its conical field-of-view 1235. The ambient temperature sensor 1236 is configured to take ambient temperature readings, $T_A$, of the ambient air surrounding the infrared cloud detector 1230. The infrared sensor 1234 includes an imaginary axis that is perpendicular to the sensing surface of the infrared sensor 1234 and passes through its center. The infrared sensor 1234 is directed so that its sensing surface faces upward and can receive infrared radiation from a region of the sky within its field-of-view 1235. The ambient temperature sensor 1236 is located on a shaded surface to avoid direct sunlight from impinging its sensing surface. Although not shown, the infrared cloud detector 1230 also includes one or more structures that hold its components within the housing 1232.

The infrared cloud detector system also includes a local window controller 1250 with a processor that can execute instructions stored in memory (not shown) for implementing the control logic to control the tint level of the electrochromic window 1205. The controller 1250 is in communication with the electrochromic window 1205 to send control signals. The controller 1250 is also in communication with (wirelessly or wired) the infrared sensor 1234 and the ambient temperature sensor 1236 to receive signals with temperature readings. The controller 1250 is also in communication with (wirelessly or wired) the photosensor 1210 to receive signals with visible light intensity readings.

According to certain aspects, power/communication lines extend from the building or another structure to the infrared cloud detector 1230. In one implementation, the infrared cloud detector 1230 includes a network interface that can couple the infrared cloud detector 1230 to a suitable cable. The infrared cloud detector 1230 can communicated data through the network interface to the controller 1250 or another controller (e.g., network controller and/or master controller) of the building. In some other implementations, the infrared cloud detector 1230 can additionally or alternatively include a wireless network interface enabling wireless communication with one or more external controllers. In some aspects, the infrared cloud detector 1230 can also include a battery within or coupled with its housing to power the sensors and electrical components within. The battery can provide such power in lieu of or in addition to the power from a power supply (for example, from a building power supply). In one aspect, the infrared cloud detector 1230 further includes at least one photovoltaic cell, for example, on an outer surface of the housing. This at least one photovoltaic cell can provide power in lieu of or in addition to the power provided by any other power supply.

FIG. 11A shows the penetration depth of direct sunlight into a room 1200 through an electrochromic window 1205 between the exterior and the interior of a building, which includes the room 1200. Penetration depth is a measure of how far direct sunlight will penetrate into the room 1200. As shown, penetration depth is measured in a horizontal direction away from the sill (bottom) of window 1205. Generally, the window defines an aperture that provides an acceptance angle for direct sunlight. The penetration depth is calculated based upon the geometry of the window (e.g., window dimensions), its position and orientation in the room, any fins or other exterior shading outside of the window, and the position of the sun (e.g. angle of direct sunlight for a particular time of day and date). Exterior shading to an electrochromic window 1205 may be due to any type of structure that can shade the window such as an overhang, a fin, etc. In FIG. 11A, there is an overhang 1220 above the electrochromic window 1205 that blocks a portion of the direct sunlight entering the room 1200 thus shortening the penetration depth.

Module A can be used to determine a tint level that considers occupant comfort from direct sunlight through the electrochromic window 1205 onto an occupant or their activity area. The tint level is determined based on a calculated penetration depth of direct sunlight into the room and the space type (e.g., desk near window, lobby, etc.) in the room at a particular instant in time (time of day and day of year). In some cases, the tint level may also be based on providing sufficient natural lighting into the room. In some cases, the penetration depth is the value calculated at a time in the future to account for glass transition time (the time required for the window to tint, e.g. to 80%, 90% or 100% of the desired tint level). The issue addressed in Module A is that direct sunlight may penetrate so deeply into the room 1200 as to show directly on an occupant working at a desk or other work surface in a room. Publicly available programs can provide calculation of the sun's position and allow for easy calculation of penetration depth.

FIGS. 11A-11C also shows a desk 1201 in the room 1200 as an example of a space type associated with an activity area (i.e. desk) and location of the activity area (i.e. location of desk). Each space type is associated with different tint levels for occupant comfort. For example, if the activity is a critical activity such as work in an office being done at a desk or computer, and the desk is located near the window, the desired tint level may be higher than if the desk were further away from the window. As another example, if the activity is non-critical, such as the activity in a lobby, the desired tint level may be lower than for the same space having a desk.

FIG. 11B shows direct sunlight and radiation under clear sky conditions entering the room 1200 through the electrochromic window 1205, according to an implementation. The radiation may be from sunlight scattered by molecules and particles in the atmosphere. Module B determines a tint level based on calculated values of irradiance under clear sky conditions flowing through the electrochromic window 1205 under consideration. Various software, such as open source RADIANCE program, can be used to calculate clear sky irradiance at a certain latitude, longitude, time of year, and time of day, and for a given window orientation.

FIG. 11C shows radiant light from the sky as may be obstructed by or reflected from objects such as, for example, clouds and other buildings, according to an implementation. These obstructions and reflections are not accounted for in the clear sky radiation calculations. The radiant light from the sky is determined based on sensor data from sensors such as, for example, the infrared sensor 1234, the photosensor 1210, and the ambient temperature sensor 1236 of the infrared cloud detector system. The tint level determined by Module C is based on the sensor data. In many cases, the tint level is based on a cloud cover condition determined using sensor data from the sensors. Generally, the operations of Module B will determine a tint level that darkens (or does not change) the tint level determined by Module A and the operations of Module C will determine a tint level that lightens (or does not change) the tint level determined by Module B.

The control logic may implement one or more of the logic Modules A, B and C separately for each electrochromic window 1205 in the building. Each electrochromic window 1205 can have a unique set of dimensions, orientation (e.g., vertical, horizontal, tilted at an angle), position, associated space type, etc. A configuration file with this information and other information can be maintained for each electrochromic window 1205. The configuration file may be stored in a computer readable medium of the local window controller 1250 of the electrochromic window 1205 or in the building management system ("BMS") described later in this disclosure. The configuration file can include information such as a window configuration, an occupancy lookup table, information about an associated datum glass, and/or other data used by the control logic. The window configuration may include information such as the dimensions of the electrochromic window 1205, the orientation of the electrochromic window 1205, the position of the electrochromic window 1205, etc. The occupancy lookup table describes tint levels that provide occupant comfort for certain space types and penetration depths. That is, the tint levels in the occupancy lookup table are designed to provide comfort to occupant(s) that may be in the room 1200 from direct sunlight on the occupant(s) or their workspace. The space type is a measure to determine how much tinting will be required to address occupant comfort concerns for a given penetration depth and/or provide comfortable natural lighting in the room. The space type parameter may take into consideration many factors. Among these factors is the type of work or other activity being conducted in a particular room and the location of the activity. Close work associated with detailed study requiring great attention might be at one space type, while a lounge or a conference room might have a different space type. Additionally, the position of the desk or other work surface in the room with respect to the window is a consideration in defining the space type. For example, the space type may be associated with an office of a single occupant having a desk or other workspace located near the electrochromic window 1205. As another example, the space type may be a lobby.

In certain embodiments, one or more modules of the control logic can determine desired tint levels while accounting for energy conservation in addition to occupant comfort. These modules may determine energy savings associated with a particular tint level by comparing the performance of the electrochromic window 1205 at that tint level to a datum glass or other standard reference window. The purpose of using this reference window can be to ensure that the control logic conforms to requirements of the municipal building code or other requirements for reference windows used in the locale of the building. Often municipalities define reference windows using conventional low emissivity glass to control the amount of air conditioning load in the building. As an example of how the reference window 1205 fits into the control logic, the logic may be designed so that the irradiance coming through a given electrochromic window 1205 is never greater than the maximum irradiance coming through a reference window as specified by the respective municipality. In disclosed embodiments, control logic may use the solar heat gain coefficient (SHGC) value of the electrochromic window 1205 at a particular tint level and the SHGC of the reference window to determine the energy savings of using the tint level. Generally, the value of the SHGC is the fraction of incident light of all wavelengths transmitted through the window. Although a datum glass is described in many embodiments, other standard reference windows can be used. Generally the SHGC of the reference window (e.g., datum glass) is a variable that can be different for different geographical locations and window orientations, and is based on code requirements specified by the respective municipality.

Generally, buildings are designed to have a heating, ventilation, and air conditioning ("HVAC") system with the capacity to fulfill the maximum expected heating and/or air-conditioning loads required at any given instance. The calculation of required capacity may take into consideration the datum glass or reference window required in a building at the particular location where the building is being constructed. Therefore, it is important that the control logic meet or exceed the functional requirements of the datum glass in order to allow building designers to confidently determine how much HVAC capacity to put into a particular building. Since the control logic can be used to tint the window to provide additional energy savings over the datum glass, the control logic could be useful in allowing building designers to have a lower HVAC capacity than would have been required using the datum glass specified by the codes and standards.

Particular embodiments described herein assume that energy conservation is achieved by reducing air conditioning load in a building. Therefore, many of the implementations attempt to achieve the maximum tinting possible, while accounting for occupant comfort level and perhaps lighting load in a room having with the window under consideration. However, in some climates, such as those at far northern and for southern latitudes, heating may be more of a concern than air conditioning. Therefore, the control logic can be modified, specifically, road reversed in some matters, so that less tinting occurs in order to ensure that the heating load of the building is reduced.

Figure 12:
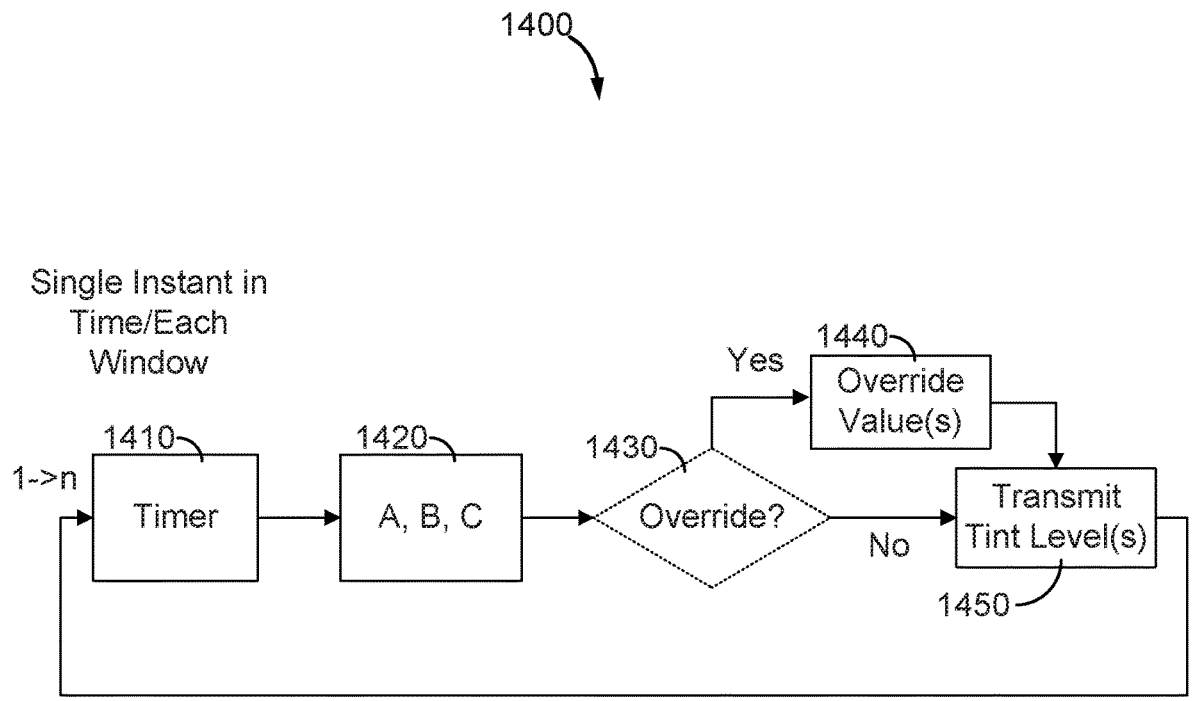
FIG. 12 depicts a flowchart showing general control logic for a method of controlling one or more electrochromic windows in a building, according to embodiments.

FIG. 12 depicts a flowchart 1400 showing general control logic for a method of controlling one or more electrochromic windows (e.g., electrochromic window 1205) in a building, according to embodiments. The control logic uses one or more of Modules A, B, and C to calculate tint levels for the window(s) and sends instructions to transition the window(s) to the tint levels. The calculations in the control logic are run 1 to n times at intervals timed by the timer at operation 1410. For example, the tint level can be recalculated 1 to n times by one or more of the Modules A, B, and C and calculated for instances in time $t_i = t_1, t_2 \ldots t_n$. n is the number of recalculations performed and n can be at least 1. The logic calculations can be done at constant time intervals in some cases. In one cases, the logic calculations may be done every 2 to 5 minutes. However, tint transition for large pieces of electrochromic glass (e.g. up to 6'×10 feet) can take up to 30 minutes or more. For these large windows, calculations may be done on a less frequent basis such as every 30 minutes.

At operation 1420, logic Modules A, B, and C perform calculations to determine a tint level for each electrochromic window at a single instant in time $t_i$. These calculations can be performed by a processor of a controller. In certain embodiments, the control logic calculates how the window should transition in advance of the actual transition. In these cases, the calculations in Modules A, B, and C are based on a future time, for example, around or after transition is complete. For example, the future time used in the calculations may be a time in the future that is sufficient to allow the transition to be completed after receiving the tint instructions. In these cases, the controller can send tint instructions in the present time in advance of the actual transition. By the completion of the transition, the window will have transitioned to a tint level that is desired for that time.

At operation 1430, the control logic allows for certain types of overrides that disengage the algorithm at Modules A, B, and C and define override tint levels at operation 1440 based on some other consideration. One type of override is a manual override. This is an override implemented by an end user who is occupying a room and determines that a particular tint level (override value) is desirable. There may be situations where the user's manual override is itself overridden. An example of an override is a high demand (or peak load) override, which is associated with a requirement of a utility that energy consumption in the building be reduced. For example, on particularly hot days in large metropolitan areas, it may be necessary to reduce energy consumption throughout the municipality in order to not overly tax the municipality's energy generation and delivery systems. In such cases, the building may override the tint level from the control logic described herein to ensure that all windows have a particularly high level of tinting. Another example of an override may be if there is no occupant in the room example weekends in a commercial office building. In these cases, the building may disengage one or more Modules that relate to occupant comfort and all the windows may have a low level of tinting in cold weather and high level of tinting in warm weather.

At operation 1450, the control signals for implementing the tint levels are transmitted over a network to the power supply in electrical communication with the electrochromic device(s) in one or more electrochromic windows in the building. In certain embodiments, the transmission of tint levels to all windows of a building may be implemented with efficiency in mind. For example, if the recalculation of a tint level suggests that no change in tint from the current tint level is required, then there is no transmission of instructions with an updated tint level. As another example, the building may be divided into zones based on window size and/or location in the building. In one case, control logic recalculates tint levels for zones with smaller windows more frequently than for zones with larger windows.

In some embodiments, the control logic in FIG. 12 for implementing the control method(s) for multiple electrochromic windows in an entire building can be on a single device, for example, a single master window controller. This device can perform the calculations for each and every tintable window in the building and also provide an interface for transmitting tint levels to one or more electrochromic devices in individual electrochromic windows, for example, in multi-zone windows or on multiple EC lites of an insulated glass unit. Some examples of multi-zone windows can be found in PCT application No. PCT/US14/71314 titled "MULTI-ZONE EC WINDOWS," which is hereby incorporated by reference in its entirety.

Also, there may be certain adaptive components of the control logic of embodiments. For example, the control logic may determine how an end user (e.g. occupant) tries to override the algorithm at particular times of day and makes use of this information in a more predictive manner to determine desired tint levels. In one case, the end user may be using a wall switch to override the tint level provided by the control logic at a certain time each day to an override value. The control logic may receive information about these instances and change the control logic to change the tint level to the override value at that time of day.

Figure 13:
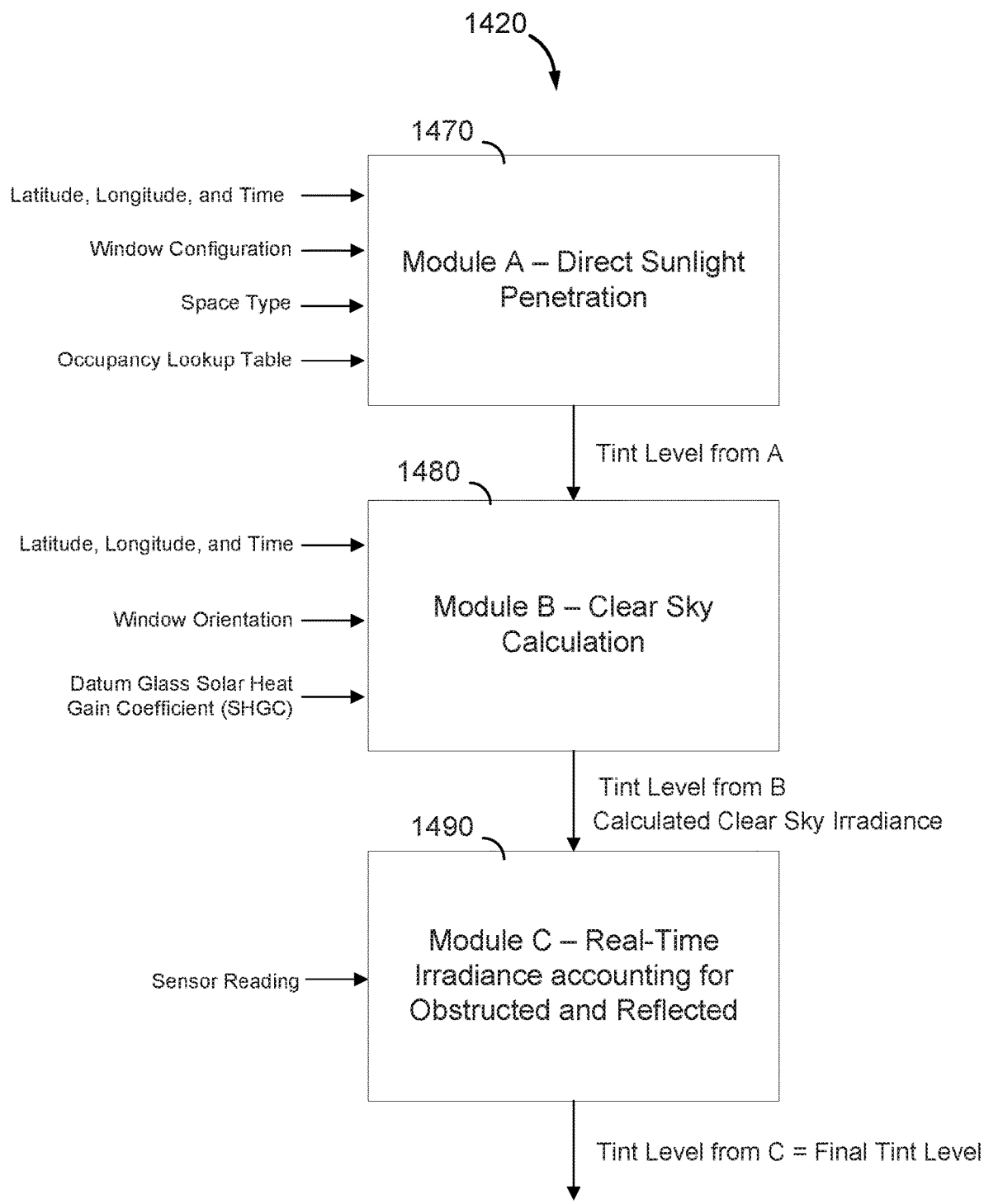
FIG. 13 is a diagram showing a particular implementation of one of the blocks from FIG. 12, according to an implementation.

FIG. 13 is a diagram showing a particular implementation of block 1420 from FIG. 12. This diagram shows a method of performing all three Modules A, B, and C in sequence to calculate a final tint level of a particular electrochromic window for a single instant in time $t_i$. The final tint level may be the maximum permissible transmissivity of the window under consideration. FIG. 13 also shows some exemplary inputs and outputs of Modules A, B, and C. The calculations in Modules A, B, and C are performed by the processor of a local window controller, a network controller, or a master controller. Although certain examples describe all three Modules A, B, and C being used, other implementations may use one or more of the Modules A, B, and C or may use additional/different modules.

At operation 1470, the processor uses Module A to determine a tint level for occupant comfort to prevent direct glare from sunlight penetrating the room. The processor uses Module A to calculate the penetration depth of direct sunlight into the room based on the sun's position in the sky and the window configuration from the configuration file. The position of the sun is calculated based on the latitude and longitude of the building and the time of day and date. The occupancy lookup table and space type are input from a configuration file for the particular window. Module A outputs the Tint level from A to Module B. The goal of Module A is generally to ensure that direct sunlight or glare does not strike the occupant or his or her workspace. The tint level from Module A is determined to accomplish this purpose. Subsequent calculations of tint level in Modules B and C can reduce energy consumption and may require even greater tint. However, if subsequent calculations of tint level based on energy consumption suggest less tinting than required to avoid interfering with the occupant, the logic prevents the calculated greater level of transmissivity from being executed to assure occupant comfort.

At operation 1480, the tint level calculated in Module A is input into Module B. Generally Module B determines a tint level that darkens (or does not change) the tint level calculated in Module B. A tint level is calculated based on calculations of irradiance under clear sky conditions (clear sky irradiance). The processor of the controller uses Module B to calculate clear sky irradiance for the electrochromic window based on window orientation from the configuration file and based on latitude and longitude of the building. These calculations are also based on a time of day and date. Publicly available software such as the RADIANCE program, which is an open-source program, can provide the calculations for calculating clear sky irradiance. The SHGC of the datum glass is also input into Module B from the configuration file. The processor uses Module B to determine a tint level that is darker than the tint level in A and transmits less heat than the datum glass is calculated to transmit under maximum clear sky irradiance. Maximum clear sky irradiance is the highest level of irradiance for all times calculated for clear sky conditions.

At operation 1490, a tint level from Module B and the calculated clear sky irradiance are input to Module C. Sensor readings are input to Module C based on measurements taken by the infrared sensor(s), the ambient temperature sensor(s), and the photosensor(s). The processor uses Module C to determine the cloud cover condition based on the sensor readings and the actual irradiance. The processor also uses Module C to calculate irradiance transmitted into the room if the window were tinted to the Tint level from Module B under clear sky conditions. The processor uses Module C to find the appropriate tint level if the actual irradiance through the window with this tint level is less than or equal to the irradiance through the window with the Tint level from Module B based on the determined cloud cover condition from the sensor readings. Generally the operations of Module C will determine a tint level that lightens (or does not change) the tint level determined by the operations of Module B. The tint level determined in Module C is the final tint level in this example.

Much of the information input to the control logic is determined from fixed information about the latitude and longitude, time of day and date. This information describes where the sun is with respect to the building, and more particularly with respect to the window for which the control logic is being implemented. The position of the sun with respect to the window provides information such as the penetration depth of direct sunlight into the room assisted with the window. It also provides an indication of the maximum irradiance or solar radiant energy flux coming through the window. This calculated level of irradiance can be based on sensor input which might indicated that there is a reduction based on the determined cloud cover condition or another obstruction between the window and the sun.

A program such as the open source program Radiance, is used to determine clear sky irradiance based on window orientation and latitude and longitude coordinates of the building for both a single instant in time $t_i$ and a maximum value for all times. The datum glass SHGC and calculated maximum clear sky irradiance are input into Module B. Module B increases the tint level calculated in Module A in steps and picks a tint level where the Inside radiation is less than or equal to the Datum Inside Irradiance where: Inside Irradiance=Tint level SHGC×Clear Sky Irradiance and Datum Inside Irradiance=Datum SHGC×Maximum Clear Sky Irradiance. However, when Module A calculates the maximum tint of the glass, module B doesn't change the tint to make it lighter. The tint level calculated in Module B is then input into Module C. The calculated clear sky irradiance is also input into Module C.

Figure 14A:
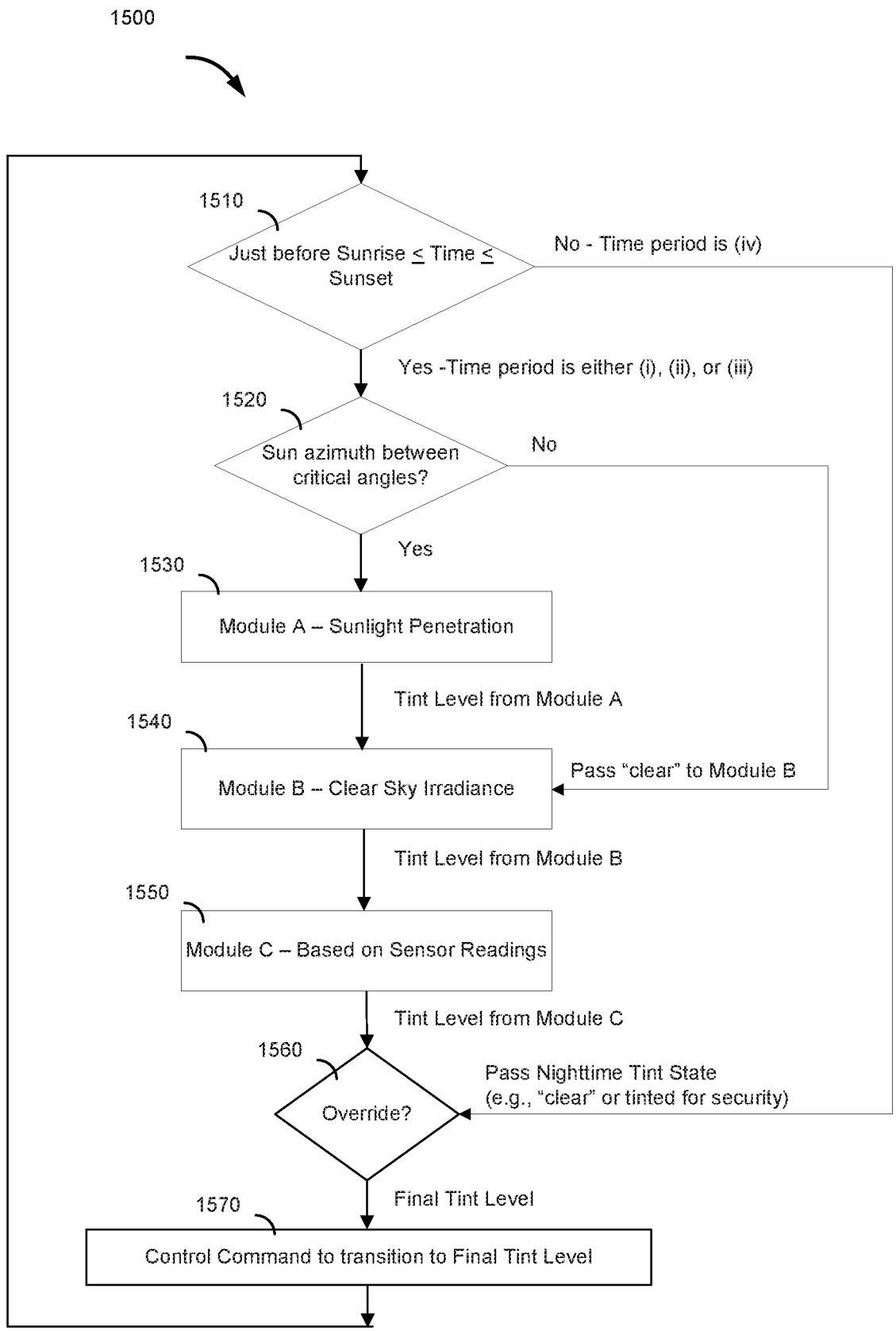
FIG. 14A is a flowchart depicting a particular implementation of the control logic of an operation shown in FIG. 13, according to an implementation.

Example of Control Logic for Making Tinting Decisions Using an Infrared Cloud Detector System with a Photosensor FIG. 14A is a flowchart 1500 depicting a particular implementation of the control logic of operation 1420 shown in FIG. 13, according to an implementation. Although this control logic is described with respect to a single window, it would be understood that control logic can be used to control multiple windows or a zone of one or more windows.

At operation 1510, the control logic determines whether the time of day is during one of the following time periods: (i) a time period starting shortly before sunrise (e.g., starting at a first time of 45 minutes before sunrise, 30 minutes before sunrise, 20 minutes before sunrise, or other suitable amount of time before sunrise) and up to slightly after sunrise (e.g., starting at a second time of 45 minutes after sunrise, 30 minutes after sunrise, 20 minutes after sunrise, or other suitable amount of time after sunrise) and (iii) a time period shortly before sunset (dusk) (e.g., starting at a third time of 45 minutes before sunset, 30 minutes before sunset, 20 minutes before sunset, or other suitable amount of time before sunset) and up until sunset, or (ii) after (i) and before (iii). In one case, the time of sunrise can be determined from measurements taken by the visible wavelength photosensor. For example, the time period (i) may end at the point where a visible light wavelength photosensor begins to measure direct sunlight i.e. an intensity reading of the visible light photosensor is at or above a minimum intensity value. In addition or alternatively, the time period (iii) may be determined to end at the point where the intensity reading from a visible light wavelength photosensor is at or below a minimum intensity value. In another example, the time of sunrise and/or the time of sunset may be calculated using a solar calculator and the day of the year and the time periods (i) and (iii) can be calculated by a defined period of time (e.g., 45 minutes) before and after the calculated times of sunrise/sunset. If it is determined that the time of day is not during one of the time periods (i), (ii), or (iii) at operation 1510, then the control logic determines the time of day is in the time period (iv) after time period (iii) and before time period (i) i.e. at nighttime. In this case, the control logic passes a nighttime tint state (e.g., "clear") and proceeds to operation 1570 to determine whether there is an override, for example, an override command received in a signal from an operator. If it is determined that there is an override at operation 1560, the override value is the final tint level. If it is determined that there is no override in place, the tint level from Module C is the final tint level. At operation 1570, a control command is sent to over a network or directed to electrochromic device(s) of the window to transition the window to the final tint level, the time of day is updated, and the method returns to operation 1510. If, instead, it is determined at operation 1510 that the time of day is during one of the time periods (i), (ii), or (iii), then the time of day is between just before sunrise and sunset and the control logic goes on to determine whether the sun azimuth is between critical angles of the tintable window at operation 1520.

If it is determined by the control logic at operation 1520 that the sun azimuth is outside the critical angles, then Module A is bypassed, and a "clear" tint level is passed to Module B, and Module B is used to make calculations at operation 1540. If it is determined at operation 1520 that the sun azimuth is between the critical angles, the control logic in Module A is used to calculate penetration depth and an appropriate tint level based on penetration depth at operation 1530. The tint level determined from Module A is then input to Module B and Module B is used to make calculations at operation 1540.

At operation 1540, the control logic from Module B determines a tint level that darkens (or does not change) the tint level from Module A. The tint level is calculated based on calculations of irradiance under clear sky conditions (clear sky irradiance). Module B is used to calculate clear sky irradiance for the window based on window orientation from the configuration file and based on latitude and longitude of the building. These calculations are also based on a time of day and date. Publicly available software such as the RADIANCE program, which is an open-source program, can provide calculations for determining clear sky irradiance. The SHGC of the datum glass is also input into Module B from the configuration file. The processor uses the control logic of Module B to determine a tint level that is darker than the tint level from Module A and transmits less heat than the datum glass is calculated to transmit under maximum clear sky irradiance. Maximum clear sky irradiance is the highest level of irradiance for all times calculated for clear sky conditions.

At operation 1550, a tint level from Module B, the calculated clear sky irradiance and sensor readings from an infrared sensor(s), an ambient temperature sensor(s), and a photosensor(s) are input to Module C. The control logic of Module C determines the cloud cover condition based on the sensor readings and determines the actual irradiance based on the cloud cover condition. The control logic of Module C also calculates an irradiance level that would be transmitted into the room if the window were tinted to the Tint level from Module B under clear sky conditions. The control logic in Module C decreases the tint level if the determined actual irradiance through the window based on the cloud cover condition is less than or equal to the calculated irradiance through the window when tinted to the tint level from Module B. Generally the operations of Module C will determine a tint level that lightens (or does not change) the tint level determined by the operations of Module B.

At operation 1550, the control logic determines a tint level from Module C based on sensor readings and then proceeds to operation 1560 to determine whether there is an override in place, for example, an override command received in a signal from an operator. If it is determined that there is an override at operation 1560, the override value is the final tint level. If it is determined that there is no override in place, the tint level from Module C is the final tint level. At operation 1570, a control command is sent to over a network or directed to electrochromic device(s) of the window to transition the window to the final tint level, the time of day is updated, and the method returns to operation 1510.

Figure 14B:
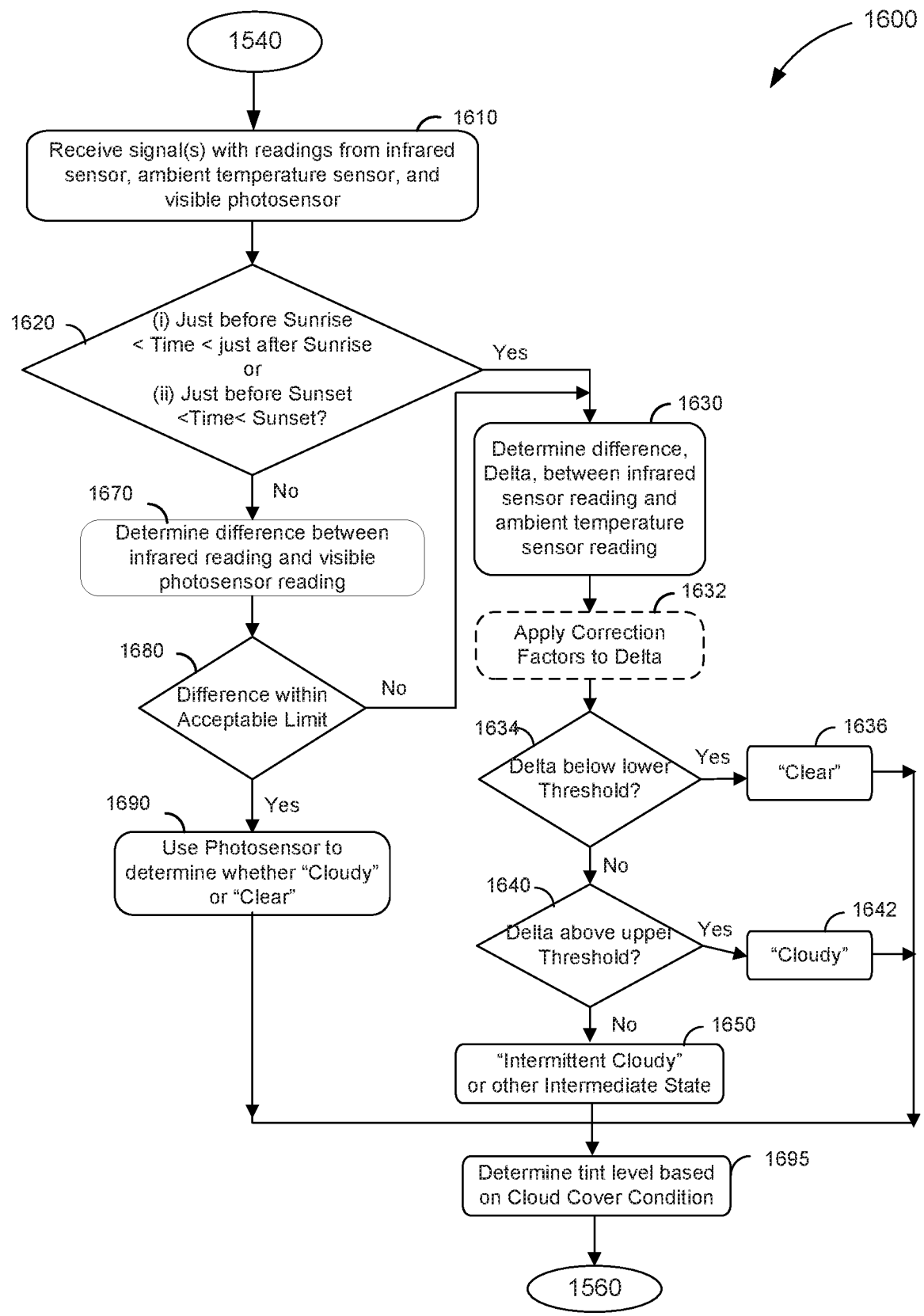
FIG. 14B is a flowchart depicting a particular implementation of the control logic of an operation shown in FIG. 14A, according to an implementation.

FIG. 14B is a flowchart 1600 depicting a particular implementation of the control logic of operation 1550 shown in FIG. 14A. At operation 1610, one or more signals are received, at the processor, with a temperature reading, $T_{IR}$, taken by an infrared sensor at a particular sample time, a temperature reading, $T_A$, taken by the ambient temperature sensor at the sample time, and an intensity reading taken by the photosensor at the sample time. Signals from the infrared sensor, ambient temperature sensor, and photosensor are received wirelessly and/or via wired electrical connections. The infrared sensor takes temperature readings based on infrared radiation received within its field-of-view. The infrared sensor is usually oriented toward a region of sky of interest, for example, a region above a building. The ambient temperature sensor is configured to be exposed to the outside environment to measure the ambient temperature. The sensing surface of the photosensor is usually also oriented toward the region of sky of interest and direct sunlight is blocked or diffused from impinging the sensing surface.

If it is determined at operation 1620 that the time of day is during either of the time periods (i) or (iii), then the processor calculates the difference, delta (Δ), between the temperature reading, $T_{IR}$, taken by the infrared sensor and the temperature reading, $T_A$, taken by an ambient temperature sensor at a sample time (operation 1630). Optionally (denoted by dotted line), correction factors are applied to the calculated delta (Δ) (operation 1630). Some examples of correction factors that may be applied include humidity, sun angle/elevation, and site elevation.

In one embodiment, the processor also determines at operation 1620 whether the infrared readings are oscillating at a frequency greater than a second defined level. If the processor determines at operation 1620 that the time of day is either within the time period (i) or (iii) and the infrared readings are oscillating at a frequency greater than a second defined level, then the processor applies operation 1690 to use the photosensor readings to determine the cloud condition. For example, the processor may determine a "clear" condition if the photosensor reading is above a certain minimum intensity level and determine a "cloudy" condition if the photosensor reading is at or below minimum intensity level. If the system is still in operation, the method increments to the next sample time and returns to operation 1610.

At operation 1634, the processor determines whether the calculated delta (Δ) value is below a lower threshold value (e.g., −5 degrees Celsius, −2 degrees Celsius, etc.). If it is determined that the calculated delta (Δ) value is below the lower threshold value, the cloud cover condition is determined to be a "clear" condition (operation 1636). During operation of the infrared cloud detector, the method then increments to the next sample time and returns to operation 1610.

If it is determined that the calculated delta (Δ) is above the lower threshold value, then the processor determines whether the calculated delta (Δ) is above an upper threshold value (e.g., 0 degrees Celsius, 2 degrees Celsius, etc.) at operation 1640. If it is determined that the calculated delta (Δ) is above the upper threshold value at operation 1640, then the processor determines the cloud cover condition to be a "cloudy" condition (operation 1642).

At operation 1695, the control logic determines the actual irradiance based on the cloud cover condition and calculates an irradiance level that would be transmitted into the room if the window were tinted to the Tint level from Module B under clear sky conditions. The control logic in Module C decreases the tint level from Module B if the irradiance based on the cloud cover condition is less than or equal to the calculated irradiance through the window when tinted to the tint level from Module B. The control logic then increments to the next sample time and returns to operation 1560.

If it is determined that the calculated delta (Δ) is below the upper threshold value at operation 1640, then the processor determines the cloud cover condition to be "intermittent cloudy" or another intermediate condition (operation 1650) and proceeds to operation 1695 described in detail above.

If it is determined at operation 1620 that the time of day is not during either of the time periods (i) or (iii), then the time of day is during the time period (ii) daytime and the processor calculates the difference between the temperature reading, $T_{IR}$, taken by the infrared sensor and the intensity reading taken by the photosensor at operation 1670. At operation 1680, the processor determines whether the calculated difference is within an acceptable limit. If the processor determines at operation 1680 that the calculated difference is more than the acceptable limit, then the processor applies operation 1630 to calculate the delta (Δ) and uses the calculated delta (Δ) to determine the cloud cover condition as discussed above.

In one embodiment, the processor also determines at operation 1660 whether the infrared readings are oscillating at a frequency greater than a second defined level. If the processor determines at operation 1660 the time of day is within the time period (ii) and that the infrared readings are oscillating at a frequency greater than a second defined level, then the processor applies operation 1690 to use the photosensor readings to determine the cloud condition. For example, the processor may determine a "clear" condition if the photosensor reading is above a certain minimum intensity level and determine a "cloudy" condition if the photosensor reading is at or below minimum intensity level. The control logic then proceeds to operation 1695 described in detail above.

If the processor determines at operation 1680 that the calculated difference is within the acceptable limit, the photosensor reading is used to determine the cloud cover condition (operation 1690). For example, the processor may determine a "clear" condition if the photosensor reading is above a certain minimum intensity level and determine a "cloudy" condition if the photosensor reading is at or below minimum intensity level. The control logic then proceeds to operation 1695 described in detail above.

In one embodiment, the processor also determines at operation 1670 whether the photosensor readings are oscillating at a frequency greater than a first defined level and whether the infrared readings are oscillating at a frequency greater than a second defined level. If the processor determines at operation 1680 that the calculated difference is within the acceptable limit and the processor determines that the photosensor readings are oscillating at a frequency greater than the first defined level, then the processor applies operation 1630 to calculate the delta (Δ) and use the calculated delta (Δ) is used determine the cloud cover condition as discussed above. If the processor determines at operation 1680 that the calculated difference is not within the acceptable limit and the processor determines that the infrared readings are oscillating at a frequency greater than the second defined level, then the processor applies operation 1690 to use the photosensor readings to determine the cloud condition. For example, the processor may determine a "clear" condition if the photosensor reading is above a certain minimum intensity level and determine a "cloudy" condition if the photosensor reading is at or below minimum intensity level. The control logic then proceeds to operation 1695 described in detail above.

Although a single infrared sensor is described as included in the infrared cloud detector of certain implementations, two or more infrared sensors can be used, according to another implementation, for redundancy in case one malfunctions and/or is obscured by, for example, bird droppings or another environmental agent. In one aspect, two or more infrared sensors can be included that face different orientations to capture infrared radiation from different fields-of-view and/or at different distances from the building/structure. If two or more infrared sensors are located within a housing of the infrared cloud detector, the infrared sensors are typically offset from one another by a distance sufficient to reduce the likelihood that an obscuring agent would affect all the infrared sensors. For example, the infrared sensors may be separated by at least about one inch or at least about two inches.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

Although the foregoing disclosed embodiments have been described in some detail to facilitate understanding, the described embodiments are to be considered illustrative and not limiting. It will be apparent to one of ordinary skill in the art that certain changes and modifications can be practiced within the scope of the appended claims.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

What is claimed is:

1. An infrared cloud detector system comprising:
   an infrared sensor configured to measure a sky temperature based on infrared radiation received within its field-of-view;
   an ambient temperature sensor configured to measure an ambient temperature; and
   logic configured to determine a cloud condition based on a difference between the measured sky temperature and the measured ambient temperature.

2. The infrared cloud detector system of claim 1, wherein the logic applies one or more correction factors to the difference between the measured sky temperature and the measured ambient temperature before determining the cloud condition.

3. The infrared cloud detector system of claim 2, wherein the correction factors comprise factors associated with humidity, sun angle/elevation, and site elevation.

4. The infrared cloud detector system of claim 1, wherein the infrared sensor is one of an infrared thermometer, an infrared radiometer, an infrared pyrgeometer, and an infrared pyrometer.

5. The infrared cloud detector system of claim 1, wherein the infrared sensor is configured to detect infrared radiation having wavelengths above 5 µm.

6. The infrared cloud detector system of claim 1, further comprising a light diffusing material between the infrared sensor and an outside environment.

7. The infrared cloud detector system of claim 1, wherein the logic is also configured to determine a tint state for one or more electrochromic windows of a building based on the determined cloud condition and configured to send a control signal to transition the one or more electrochromic windows to the determined tint state.

8. The infrared cloud detector system of claim 7, wherein the infrared cloud detector system is located on a rooftop of the building.

9. The infrared cloud detector system of claim 1, wherein the logic is further configured to determine the cloud condition as "clear" if the difference is below a lower threshold value and as "cloudy" if the difference is above an upper threshold value.

10. An infrared cloud detector system comprising:
    an infrared sensor configured to measure a sky temperature based on infrared radiation received within its field-of-view;
    an ambient temperature sensor configured to measure an ambient temperature;
    a photosensor configured to measure an intensity of visible light; and
    logic configured to determine a cloud condition,
      wherein if a time of day is determined to be between a first time before a sunrise time and a second time after the sunrise time or between a third time before a sunset time and the sunset time, the cloud condition is determined based on a difference between the measured sky temperature and the measured ambient temperature,
      wherein if the time of day is determined to be between the second time after the sunrise time and before the third time before the sunset time, the cloud condition is determined based on the measured intensity of visible light from the photosensor.

11. The infrared cloud detector system of claim 10, wherein the logic configured to determine the cloud condition based on the difference between the measured sky temperature and the measured ambient temperature is configured to determine that the cloud condition is "clear" if the difference is below a lower threshold value and that the cloud condition is "cloudy" if the difference is above an upper threshold value.

12. The infrared cloud detector system of claim 11, wherein the logic applies one or more correction factors to the difference between the measured sky temperature and the measured ambient temperature before determining the cloud condition.

13. The infrared cloud detector system of claim 10, wherein the logic configured to determine the cloud condition based on the measured intensity of visible light from the photosensor is conigured to determine the cloud condition is "clear" if the measured intensity of visible light is above a minimum value and determining that the cloud condition is "cloudy" if the measured intensity of visible light is below the minimum value.

14. The infrared cloud detector system of claim 10, wherein the infrared sensor is one of an infrared thermometer, an infrared radiometer, an infrared pyrgeometer, and an infrared pyrometer.

15. The infrared cloud detector system of claim 10, wherein the infrared sensor is configured to detect infrared radiation having wavelengths in a range between 8 µm and 14 µm.

16. The infrared cloud detector system of claim 10, further comprising a light diffusing material between the infrared sensor and an outside environment.

17. The infrared cloud detector system of claim 10, wherein the logic is also configured to determine a tint state for one or more electrochromic windows of a building based on the determined cloud condition and configured to send a control signal to transition the one or more electrochromic windows to the determined tint state.

18. The infrared cloud detector system of claim 17, wherein the infrared cloud detector system is located on a rooftop of the building.

19. An infrared cloud detector method comprising:
    receiving a sky temperature reading from an infrared sensor and an ambient temperature reading from an ambient temperature sensor;
    calculating a difference between the sky temperature reading and the ambient temperature reading; and
    determining a cloud condition based on the calculated difference between the sky temperature reading and the ambient temperature reading.

20. The infrared cloud detector method of claim 19, further comprising:
    determining that the cloud condition is "clear" if the calculated difference is below a lower threshold value; and
    determining that the cloud condition is "cloudy" if the calculated difference is above an upper threshold value.

21. The infrared cloud detector method of claim 20, further comprising determining that the cloud condition is an intermediate condition if the calculated difference is above the lower threshold value and below the upper threshold value.

22. The infrared cloud detector method of claim 20, wherein the lower threshold value is in a range of −5 degrees Celsius to −10 degrees Celsius.

23. The infrared cloud detector method of claim 22, wherein the upper threshold value is in a range of above −5 degrees Celsius to 0 degrees Celsius.

24. The infrared cloud detector method of claim 19, further comprising:
determining an end tint state for one or more electrochromic windows of a building based on the determined cloud condition; and
sending a control signal via a network to transition the one or more electrochromic windows to the determined tint state.

25. The infrared cloud detector method of claim 24, wherein the infrared sensor and the ambient temperature sensor are located on a rooftop of the building.

26. An infrared cloud detector method comprising:
receiving a sky temperature reading from an infrared sensor, an ambient temperature reading from an ambient temperature sensor, and an intensity reading from a photosensor;
determining whether a time of day is:
   (i) between a first time before a sunrise time and a second time after the sunrise time or between a third time before a sunset time and the sunset time;
   (ii) between the second time after the sunrise time and before the third time before the sunset time;
   (iii) after (i) and before (iii); or
   (iv) after (iii) and before (i); and
if the time of day is (i), (iii), or (iv), determining a cloud condition based on a difference between the sky temperature reading and the ambient temperature reading; and
if the time of day is (iii), determining the cloud condition based on the intensity reading received from the photosensor.

27. The infrared cloud detector method of claim 26, further comprising:
calculating the difference between the sky temperature reading and the ambient temperature reading;
determining that the cloud condition is "clear" if the calculated difference is below a lower threshold value; and
determining that the cloud condition is "cloudy" if the calculated difference is above an upper threshold value.

28. The infrared cloud detector method of claim 27, further comprising determining that the cloud condition is an intermediate condition if the calculated difference is above the lower threshold value and below the upper threshold value.

29. The infrared cloud detector method of claim 27, wherein the lower threshold value is in a range of −5 degrees Celsius to −10 degrees Celsius.

30. The infrared cloud detector method of claim 29, wherein the upper threshold value is in a range of above −5 degrees Celsius to 0 degrees Celsius.

31. The infrared cloud detector method of claim 27, wherein determining the cloud condition based on the intensity reading received from the photosensor comprises:
determining that the cloud condition is "clear" if the intensity reading is above a minimum value; and
determining that the cloud condition is "cloudy" if the intensity reading is below the minimum value.

32. The infrared cloud detector method of claim 31, further comprising:
determining the end tint state for the one or more electrochromic windows of the building based on the determined cloud condition; and
sending a control signal to transition the one or more electrochromic windows to the determined tint state.

33. The infrared cloud detector method of claim 32, wherein determining the end tint state for the one or more electrochromic windows of the building based on the determined cloud condition comprises:
determining a first tint state based on one or more of a calculated clear sky irradiance and a calculated penetration depth of direct sunlight into a room with the one or more electrochromic windows;
if the time of day is determined in (iv), determining that the end tint state is a nighttime tint setting;
if the time of day determined in (i), (ii), or (iii) and the cloud condition is determined as "cloudy," determining that the end tint state is higher than the first tint state; and
if the time of day determined in (i), (ii), or (iii) and the cloud condition is determined as "clear," determining that the end tint state is the first tint state.

* * * * *